United States Patent
MacDavitt et al.

(10) Patent No.: US 12,511,512 B1
(45) Date of Patent: Dec. 30, 2025

(54) VERIFICATION OF RFID ACTIVATION USING ACTIVATABLE INLAY

(71) Applicant: Zebra Technologies Corporation, Lincolnshire, IL (US)

(72) Inventors: Sean MacDavitt, Locust Valley, NY (US); Mohannad Abdo, Clifton, NJ (US); Eric W. Liberato, Pequannock, NJ (US); Anthony J. Cecchin, Kildeer, IL (US)

(73) Assignee: ZEBRA TECHNOLOGIES CORPORATION, Lincolnshire, IL (US)

( * ) Notice: Subject to any disclaimer, the term of this patent is extended or adjusted under 35 U.S.C. 154(b) by 0 days.

(21) Appl. No.: 18/884,590

(22) Filed: Sep. 13, 2024

(51) Int. Cl.
*G06K 7/00* (2006.01)
*G06K 19/077* (2006.01)

(52) U.S. Cl.
CPC ... *G06K 19/0775* (2013.01); *G06K 19/07715* (2013.01); *G06K 19/07773* (2013.01)

(58) Field of Classification Search
CPC ......... G06K 19/0723; G06K 19/07749; G06K 7/10366; G06K 19/0717; G06K 19/0716; G06K 19/0775; G06K 19/07715; G06K 19/07773
USPC ....................... 235/439, 462.46, 472.02, 492
See application file for complete search history.

(56) References Cited

U.S. PATENT DOCUMENTS

| | | | |
|---|---|---|---|
| 9,830,484 B1 * | 11/2017 | Zerlina | G06Q 10/08 |
| 10,997,545 B1 * | 5/2021 | Bhagwat | G06K 19/0716 |
| 11,423,278 B1 * | 8/2022 | Koepp | H01L 21/76802 |
| 2014/0044609 A1 | 2/2014 | Prusik et al. | |
| 2016/0364642 A1 * | 12/2016 | Viala | G06K 7/10346 |
| 2019/0279062 A1 * | 9/2019 | Hung | H01H 37/761 |
| 2019/0392283 A1 * | 12/2019 | Finn | G06K 19/0723 |
| 2020/0218861 A1 * | 7/2020 | Bolton | G06K 19/0772 |
| 2022/0151266 A1 | 5/2022 | Bushman | |
| 2022/0327295 A1 * | 10/2022 | Mei | G06K 19/07749 |

FOREIGN PATENT DOCUMENTS

| | | | | |
|---|---|---|---|---|
| EP | 3614704 | * | 2/2020 | G06F 16/9554 |
| JP | 2015535976 | * | 12/2015 | G06K 19/07 |

\* cited by examiner

*Primary Examiner* — Daniel St Cyr
(74) *Attorney, Agent, or Firm* — K&L Gates LLP

(57) ABSTRACT

Devices and methods for Verification of Activation for Activatable RFID tags Using Activatable Inlays are disclosed herein. An example includes a radiofrequency (RF) tag, including an antenna, an integrated circuit, an activation circuit connecting the integrated circuit to the antenna. The integrated circuit is configured, responsive to the RF tag being interrogated by an interrogation signal in a predetermined radiofrequency range which is received by the antenna, to cause the antenna to emit a response signal when the activation circuit is closed but not emit a response signal when the activation circuit is open. The RF tag further includes an activation indicator component forming at least a portion of the activation circuit, the activation indicator component having a component conductive state and a component nonconductive state, such that the activation circuit is closed when the activation indicator component is in the component conductive state and the activation circuit is open when the activation indicator component is in the component nonconductive state.

21 Claims, 24 Drawing Sheets

VERIFICATION OF RFID ACTIVATION USING ACTIVATABLE INLAY

BACKGROUND

Environmental indicators may be configured to indicate the occurrence of an environmental exposure to a host product. Prior to the association between the host product and the indicator, the same level of care must often be paid to the indicator to prevent an exposure to the environmental condition which the indicator is configured to indicate, so that the indicator is not triggered prematurely and rendered unusable for use with the host product. For example, high temperature exposure indicators may need to be kept in deep freeze or refrigerated conditions, complicating the component supply chains for the products they are used with.

Radio Frequency ID (RFID) tags are commonly used to track products throughout their lifecycle. Combinations of environmental indicators with RF tags have been previously proposed.

SUMMARY

In an embodiment, the technology of the present disclosure is provided by a radiofrequency (RF) tag, including an antenna, an integrated circuit, an activation circuit connecting the integrated circuit to the antenna. The integrated circuit is configured, responsive to the RF tag being interrogated by an interrogation signal in a predetermined radiofrequency range which is received by the antenna, to cause the antenna to emit a response signal when the activation circuit is closed but not emit a response signal when the activation circuit is open. The RF tag further includes an activation indicator component forming at least a portion of the activation circuit, the activation indicator component having a component conductive state and a component nonconductive state, such that the activation circuit is closed when the activation indicator component is in the component conductive state and the activation circuit is open when the activation indicator component is in the component nonconductive state. The activation indicator component transitions from the component nonconductive state to the component conductive state responsive to an application of an activation action to the RF tag. The RF tag further includes an indicator circuit electrically connected to the integrated circuit. When the indicator circuit is open, the response signal is a first distinct response signal, and when the indicator circuit is closed, the response signal is a second distinct response signal. The rF tag further includes an activatable environmental exposure indicator coupled to the indicator circuit and having an indicator conductive state and an indicator nonconductive state, such that the indicator circuit is closed when the activatable environmental exposure indicator is in the indicator conductive state and the indicator circuit is open when the activatable environmental exposure indicator is in the indicator nonconductive state. The activatable environmental exposure indicator becomes environmentally sensitive responsive to the activation action, such that when the RF tag is subsequently exposed to a predetermined environmental exposure, the activatable environmental exposure indicator transitions from a first of the indicator nonconductive state and the indicator conductive state to a second of the indicator nonconductive state and the indicator conductive state.

In a variation of this embodiment, the activation indicator component includes a plurality of microcapsules, each having a frangible shell containing a conductive material.

In a variation of this embodiment, each frangible shell of the plurality of microcapsules includes a material selected from a group consisting of a protein, a gel, a polyurea formaldehyde, a polymelamine formaldehyde, a wax material, an emulsion, other polymeric materials, and combinations thereof.

In a variation of this embodiment, the conductive material includes at least one selected from a group consisting of a plurality of conductive particles suspended in a fluid, and a conductive fluid.

In a variation of this embodiment, the fluid includes a material selected from a group consisting of a side-chain crystallizable polymer, an alkane, a wax, an alkane wax, esters, other polymeric materials, and combinations thereof.

In a variation of this embodiment, the plurality of conductive particles is selected from a group consisting of particles containing copper, particles containing silver, particles containing graphite, particles containing carbon black, particles containing graphene, particles containing graphene oxide, particles containing other functionalized graphenes, particles containing conductive metals, particles containing conductive non-metal materials, and combinations thereof.

In a variation of this embodiment, the application of the activation action activates the plurality of microcapsules such that the conductive material is released from the frangible shells of the plurality of microcapsules, and the conductive material facilitates a formation of an electrical connection across the activation indicator component, transitioning the activation indicator component to the component conductive state and closing the activation circuit.

In a variation of this embodiment, the activatable environmental exposure indicator includes a plurality of activable microcapsules, each having a frangible shell containing a liquefiable material configured to liquefy responsive to a predetermined environmental exposure.

In a variation of this embodiment, the liquefiable material includes a material selected from a group consisting of a side-chain crystallizable polymer, an alkane, a wax, an alkane wax, esters, other polymeric materials, and combinations thereof.

In a variation of this embodiment, the application of the activation action activates the plurality of activable microcapsules such that the liquefiable material is released from the frangible shells of the plurality of activable microcapsules.

In a variation of this embodiment, the activatable environmental exposure indicator is initially in the indicator nonconductive state, and the predetermined environmental exposure causes the liquefiable material to liquefy, such that the liquefiable material facilitates a formation of an electrical connection across the activatable environmental exposure indicator, transitioning the activatable environmental exposure indicator to the indicator conductive state, and closing indicator circuit.

In a variation of this embodiment, the electrical connection is formed by one selected from a group consisting of a plurality of conductive particles embedded in a matrix formed by the liquefiable material in a solid state, and the liquefiable material including a liquefiable conductive material.

In a variation of this embodiment, the plurality of conductive particles is selected from a group consisting of particles containing copper, particles containing silver, particles containing graphite, particles containing carbon black, particles containing graphene, particles containing graphene oxide, particles containing other functionalized graphenes, particles containing conductive metals, particles containing conductive non-metal materials, and combinations thereof.

In a variation of this embodiment, an electrical connection is initially provided across the activatable environmental exposure indicator by a plurality of conductive particles disposed proximately to a wick, such that the activatable environmental exposure indicator is initially in the indicator conductive state, and the predetermined environmental exposure causes the liquefiable material to liquefy, such that the liquefiable material draws the plurality of conductive particles into the wick, disengaging the electrical connection, transitioning the activatable environmental exposure indicator to the indicator nonconductive state and opening the indicator circuit.

In a variation of this embodiment, the plurality of conductive particles is selected from a group consisting of particles containing copper, particles containing silver, particles containing graphite, particles containing carbon black, particles containing graphene, particles containing graphene oxide, particles containing other functionalized graphenes, particles containing conductive metals, particles containing conductive non-metal materials, and combinations thereof.

In a variation of this embodiment, the first distinct response signal is transmitted in a first radiofrequency band, and the second distinct response signal is transmitted in a second radiofrequency band.

In a variation of this embodiment, the integrated circuit contains a memory, and the first distinct response signal contains a first data stored in the memory.

In a variation of this embodiment, the second distinct response signal contains a second data stored in the memory.

In a variation of this embodiment, the RF tag is a passive RF tag, and the interrogation signal received by the antenna powers the integrated circuit to emit the response signal.

In a variation of this embodiment, the RF tag further includes a battery, wherein the integrated circuit is electrically connected to the battery and powered by the battery.

In a variation of this embodiment, the activation action is thermal stress with a predetermined activation threshold selected from a group consisting of a temperature exceeding 35 degrees Celsius (C), a temperature exceeding 40 degrees C., a temperature exceeding 45 degrees C., a temperature exceeding 50 degrees C., a temperature exceeding 55 degrees C., a temperature exceeding 60 degrees C., a temperature exceeding 65 degrees C., a temperature exceeding 70 degrees C., a temperature exceeding 75 degrees C., a temperature exceeding 80 degrees C., a temperature exceeding 85 degrees C., a temperature exceeding 90 degrees C., a temperature exceeding 95 degrees C., and a temperature exceeding 100 degrees C.

In a variation of this embodiment, the activation action is a compression stress with a predetermined activation threshold selected from a group consisting of a stress exceeding 0.1 pounds per square inch (psi) a stress exceeding 0.5 psi, a stress exceeding 1 psi, a stress exceeding 2 psi, a stress exceeding 5 psi, a stress exceeding 10 psi, and a stress exceeding 15 psi.

In a variation of this embodiment, the activation action is a shear stress with a predetermined activation threshold selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi.

In a variation of this embodiment, the predetermined environmental exposure is selected from a group consisting of a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time.

In a variation of this embodiment, a transition of the activation circuit from the component conductive state to the component conductive state is irreversible.

In a variation of this embodiment, a transition of the activatable environmental exposure indicator from the first of the indicator conductive state and the indicator nonconductive state to a second of the indicator conductive state and the indicator nonconductive state is irreversible.

In another embodiment, the technology of the present disclosure is provided by an RF tag, including, an antenna, an integrated circuit connected by an activation circuit to the antenna, an activation indicator component forming a portion of the activation circuit, the activation indicator component having a component conductive state and a component nonconductive state, such that the activation circuit is closed when the activation indicator component is in the component conductive state and the activation circuit is open when the activation indicator component is in the component nonconductive state. The activation indicator component includes a first plurality of microcapsules, each having a nonconductive frangible shell containing a conductive material. The RF tag further includes an indicator circuit electrically connected to the integrated circuit, and an activatable environmental exposure indicator coupled to the indicator circuit and having an indicator conductive state and an indicator nonconductive state, such that the indicator circuit is closed when the activatable environmental exposure indicator is in the indicator conductive state and the indicator circuit is open when the activatable environmental exposure indicator is in the indicator nonconductive state. The activatable environmental exposure indicator includes a second plurality of activable microcapsules, each having a nonconductive frangible shell containing a liquefiable material. The liquefiable material is configured to liquefy responsive to a predetermined environmental exposure. The frangible shells of the first plurality of microcapsules and the frangible shells of the second plurality of activable microcapsules are configured to rupture in response to an application of an activation action exceeding a predetermined activation threshold, releasing the conductive material and the liquefiable material respectively. When the conductive material is released from the frangible shells of the first plurality of microcapsules, the conductive material facilitates a formation of a first electrical connection across the activation indicator component, transitioning the activation indicator component to the component conductive state, and closing the activation circuit. When the liquefiable material liquefies responsive to the predetermined environmental exposure after the liquefiable material is released from the frangible shells of the second plurality of activable microcapsules, the liquefiable material facilitates a formation of a second electrical connection across the activatable environmental exposure indicator, transitioning the activatable environmental exposure indicator to the indicator conductive state, and closing indicator circuit, and integrated circuit is configured, responsive to the antenna receiving an interrogation signal in a predetermined radiofrequency range, to cause the antenna to emit a response signal when the activation circuit is closed, and not to cause the antenna to emit the response signal when the activation circuit is open. When the indicator circuit is open, the response signal is a first distinct response signal, and when the indicator circuit is closed, the response signal is a second distinct response signal.

In a variation of this embodiment, the conductive material includes at least one selected from a group consisting of a first plurality of conductive particles suspended in a fluid, and a conductive fluid.

In a variation of this embodiment, the fluid includes a material selected from a group consisting of a side-chain crystallizable polymer, an alkane, a wax, an alkane wax, esters, other polymeric materials, and combinations thereof.

In a variation of this embodiment, the first plurality of conductive particles is selected from a group consisting of particles containing copper, particles containing silver, particles containing graphite, particles containing carbon black, particles containing graphene, particles containing graphene oxide, particles containing other functionalized graphenes, particles containing conductive metals, particles containing conductive non-metal materials, and combinations thereof.

In a variation of this embodiment, the liquefiable material includes at least one selected from a group consisting of a second plurality of conductive particles embedded in a matrix formed by the liquefiable material when it is in a solid state, and a liquefiable conductive material.

In a variation of this embodiment, the liquefiable material includes a material selected from a group consisting of a side-chain crystallizable polymer, an alkane, a wax, an alkane wax, esters, other polymeric materials, and combinations thereof.

In a variation of this embodiment, the second plurality of conductive particles are selected from a group consisting of particles containing copper, particles containing silver, particles containing graphite, particles containing graphene, particles containing graphene oxide, particles containing other functionalized graphenes, particles containing conductive metals, particles containing conductive non-metal materials, and combinations thereof.

In yet another embodiment, the technology of the present disclosure is provided by an RF tag, including, an antenna, an integrated circuit, an activation circuit connecting the integrated circuit to the antenna, an activation indicator component forming a portion of the activation circuit, the activation indicator component having a component conductive state and a component nonconductive state. The activation circuit is closed when the activation indicator component is in the component conductive state and the activation circuit is open when the activation indicator component is in the component nonconductive state. The activation indicator component transitions from the component nonconductive state to the component conductive state responsive to an application of an activation action to the RF tag. The RF tag is configured, responsive to the antenna receiving an interrogation signal in a predetermined radiofrequency range, to emit a response signal via the antenna when the activation circuit is closed, and not emit the response signal when the activation circuit is open. The RF tag further includes an electrical circuit electrically connected to the integrated circuit, a variable capacitance structure included as a portion of the electrical circuit, including a plurality of parallel paths, an indicator path included as one of the plurality of parallel paths, and an activatable environmental exposure indicator included as a portion of the indicator path, wired in series with a first capacitor having a first capacitance. The activatable environmental exposure indicator has an indicator conductive state and an indicator nonconductive state, such that when the activatable environmental exposure indicator is in the indicator conductive state the indicator path is closed and the indicator path has the first capacitance, and when the activatable environmental exposure indicator is in the indicator nonconductive state, the indicator path is open and the indicator path has no capacitance. When the indicator path has the first capacitance, the response signal is a first distinct response signal, and when the indicator path has no capacitance, the response signal is a second distinct response signal. The activatable environmental exposure indicator becomes environmentally sensitive responsive to the activation action, such that when the RF tag is subsequently exposed to a predetermined environmental exposure, the activatable environmental exposure indicator transitions from a first of the indicator nonconductive state and the indicator conductive state to a second of the indicator nonconductive state and the indicator conductive state.

In a variation of this embodiment, the variable capacitance structure includes a constant capacitance path, parallel to the indicator path, having a second capacitor of a constant capacitance.

In a variation of this embodiment, the activatable environmental exposure indicator is initially in the indicator nonconductive state, and transitions to the indicator conductive state responsive to the predetermined environmental exposure occurring after the application of the activation action, the activatable environmental exposure indicator configured not to transition prior the activation action even if the predetermined environmental exposure has occurred.

In a variation of this embodiment, the activatable environmental exposure indicator is initially in the indicator conductive state, and transitions to the indicator nonconductive state responsive to the predetermined environmental exposure occurring after the application of the activation action, the activatable environmental exposure indicator configured not to transition prior the activation action even if the predetermined environmental exposure has occurred.

In yet another embodiment, the technology of the present disclosure is provided by an RF tag, including an antenna, an integrated circuit, an activation circuit connecting the integrated circuit to the antenna, and an activation indicator component forming a portion of the activation circuit, the activation indicator component having a component conductive state and a component nonconductive state. The activation circuit is closed when the activation indicator component is in the component conductive state and the activation circuit is open when the activation indicator component is in the component nonconductive state. The activation indicator component transitions from the component nonconductive state to the component conductive state responsive to an application of an activation action to the RF tag. The RF tag is configured, responsive to the antenna receiving an interrogation signal in a predetermined radiofrequency range, to emit a response signal via the antenna when the activation circuit is closed, and not emit the response signal when the activation circuit is open. The RF tag further includes an electrical circuit electrically connected to the integrated circuit, a variable capacitance structure, forming a portion of the electrical circuit, an activatable environmental exposure indicator, included in the variable capacitance structure, having an unexposed state and an exposed state, the activatable environmental exposure indicator configured to become environmentally sensitive responsive to the activation action, such that when the RF tag is exposed to a predetermined environmental exposure subsequent to the activation action, the activatable environmental exposure indicator transitions from the unexposed state to the exposed state, the activatable environmental exposure indicator configured to not transition from the unexposed state to the exposed state prior to the activation action. The variable capacitance structure has a first capacitive state when the activatable environmental exposure indicator is in the unexposed state, and a second capacitive state when the activatable environmental exposure indicator is in the exposed state. The integrated circuit is configured, responsive to the antenna receiving an interrogation signal in a predetermined radiofrequency range, to cause the antenna to emit a response signal which varies depending on whether the variable capacitance structure is in the first capacitive state or the second capacitive state.

In yet another embodiment, the technology of the present disclosure is provided by a method for verifying activation of an RF tag having an activation indicator component and an activatable environmental exposure indicator, the activation indicator component configured to close an activation circuit between an integrated circuit of the RF tag with an antenna of the RF tag responsive to an activation action, and the activatable environmental exposure indicator configured to close an indicator circuit electrically connected to the integrated circuit responsive to a predetermined environmental exposure occurring subsequent to the activation action, the method including, providing a media process path including a first process point and a second process point, the second process point downstream of the first process point, providing, at the first process point, the RF tag, interrogating, at the first process point, the RF tag with an interrogation signal in a predetermined radiofrequency range, confirming, at the first process point, that the RF tag does not emit a response signal responsive to the interrogation signal, applying, at the second process point, the activation action to the RF tag, interrogating, at the second process point, the RF tag with an interrogation signal in a predetermined radiofrequency range, and confirming the activatable environmental exposure indicator has been activated, at the second process point, based on the RF tag emitting the response signal responsive to the interrogation signal.

In a variation of this embodiment, the activation action is thermal stress with a predetermined activation threshold selected from a group consisting of a temperature exceeding 35 degrees Celsius (C), a temperature exceeding 40 degrees C., a temperature exceeding 45 degrees C., a temperature exceeding 50 degrees C., a temperature exceeding 55 degrees C., a temperature exceeding 60 degrees C., a temperature exceeding 65 degrees C., a temperature exceeding 70 degrees C., a temperature exceeding 75 degrees C., a temperature exceeding 80 degrees C., a temperature exceeding 85 degrees C., a temperature exceeding 90 degrees C., a temperature exceeding 95 degrees C., and a temperature exceeding 100 degrees C.

In a variation of this embodiment, activation action is a compression stress with a predetermined activation threshold selected from a group consisting of a stress exceeding 0.1 pounds per square inch (psi) a stress exceeding 0.5 psi, a stress exceeding 1 psi, a stress exceeding 2 psi, a stress exceeding 5 psi, a stress exceeding 10 psi, and a stress exceeding 15 psi.

In a variation of this embodiment, activation action is a shear stress with a predetermined activation threshold selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi.

In a variation of this embodiment, the method further includes confirming, at the second process point, that the response signal is a first predetermined response signal, distinct from a second predetermined response signal.

In a variation of this embodiment, the first predetermined response signal indicates that the activatable environmental exposure indicator has not been exposed to the predetermined environmental exposure, and the second predetermined response signal indicates that the activatable environmental exposure indicator has been exposed to the predetermined environmental exposure.

In a variation of this embodiment, the predetermined environmental exposure is selected from a group consisting of a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time.

In a variation of this embodiment, the activation action is applied by a thermal printer.

In yet another embodiment, the technology of the present disclosure is provided by method of forming an RF tag, the method including forming an activation circuit including an activation indicator component having a conductive component state and a nonconductive component state, the activation circuit defining an activation open circuit between an integrated circuit and an antenna in the nonconductive component state and an activation closed circuit between the integrated circuit and the antenna in the conductive component state, the integrated circuit is configured, responsive to being interrogated by an interrogation signal in a predetermined radiofrequency range which is received by the antenna, to cause the antenna to emit a response signal when the activation circuit forms the activation closed circuit but not emit the response signal when the activation circuit forms the activation open circuit, and forming an indicator circuit connected with the integrated circuit, the indicator circuit including an activatable environmental exposure indicator configured to define a first indicator electrical state for the indicator circuit and a second indicator electrical state for the indicator circuit, the response signal from the integrated circuit is a first distinct response signal when the indicator circuit is in the first indicator electrical state and is a second distinct response signal when the indicator circuit is in the second indicator electrical state.

In a variation of this embodiment, the first indicator electrical state is an indicator nonconductive state for which the indicator circuit forms an open circuit with the integrated circuit in and the second indicator electrical state is an indicator conductive state for which the indicator circuit forms a closed circuit with the integrated circuit.

In a variation of this embodiment, the first indicator electrical state is a first capacitance of the indicator circuit, and the second indicator electrical state is a second capacitance of the indicator circuit.

In a variation of this embodiment, forming the activation circuit includes depositing a first plurality of microcapsules at a first location on a substrate proximate to a first trace configured to electrically couple the integrated circuit and the antenna, each microcapsule in the first plurality of microcapsules including a frangible shell containing a conductive material that is responsive to an activation action to transition the activation circuit from the activation open circuit to the activation closed circuit, and forming the indicator circuit includes depositing a second plurality of microcapsules at a second location on the substrate proximate to a second trace configured to form a closed loop with the integrated circuit, each of the second plurality of microcapsules including a frangible shell containing a liquefiable material that is responsive to the activation action to cause the indicator circuit to be environmentally sensitive to a predetermined environmental exposure.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed technology and explain various principles and advantages of those embodiments.

Figure 1:
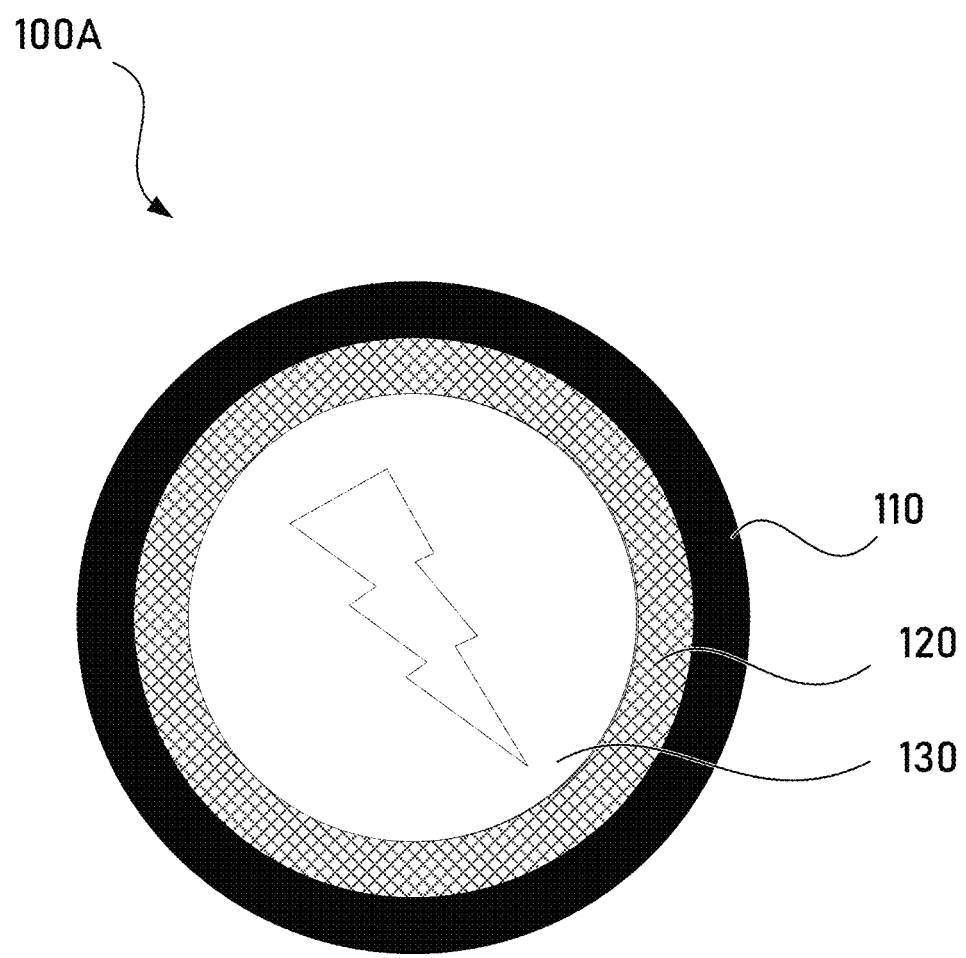
FIG. 1 illustrates a first embodiment of a microcapsule 100, according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present technology.

The apparatus and method components have been represented where appropriate by conventional symbols in the drawings, showing only those specific details that are pertinent to understanding the embodiments of the present technology so as not to obscure the disclosure with details that will be readily apparent to those of ordinary skill in the art having the benefit of the description herein.

DETAILED DESCRIPTION

The technology of the present disclosure is related to an activatable indicator platform using microencapsulation technology combined with a radiofrequency (RF) tag (e.g., an radiofrequency identification or RFID tag, a near-field communication or NFC tag). Environmental indicators (e.g., indicators incorporating an indicator material that liquifies in response to a predetermined environmental exposure) may be configured to indicate the occurrence of such a predetermined environmental exposure to a host product, (e.g., by changing appearance or by changing an electrical property of the indicator which may be detected by an appropriate circuit or computer). The change in electrical property may allow an indicator included in an RF tag to indicate exposure either by causing an alteration in a signal transmitted by the RF tag, or simply by allowing a previously inactive RF tag to transmit when interrogated, or alternatively by preventing a normally responsive RF tag from responding when interrogated. Prior to the association between the host product and the indicator, the same level of care must be paid to the indicator to prevent an exposure to the environmental condition of which the indicator is configured to indicate, such that the indicator is not spent prematurely and rendered unusable with the host product. Said differently, if a thermal indicator is to be installed on a host product, the indicator may need to be held below the temperature at which the thermal indicator is configured to indicate prior to installation of the indicator on or with a monitored host product. If a sufficient thermal exposure were to occur prior to pairing with the host product, the indicator would transition to an indicative state prior to installation, and, provided the indicator is an irreversible indicator, the indicator would be expended prior to use. For example, indicators configured for use with refrigerated items, (e.g., indicators showing when host products have warmed above a refrigerator temperature), the indicators generally need to be refrigerated prior to being paired with a host product, which results in an additional cost and more complicated inventory management and manufacturing process for the user. Using an indicator that requires an activation before it becomes sensitive to environmental exposure may help avoid these problems.

In some instances, it may be desirable to determine not only whether an activatable indicator on an RF tag has been exposed to the environmental condition, but whether the activatable indicator has actually been activated, (e.g., by an interrogation of the RF tag). This may be used, for example, to improve quality control in a manufacturing process that includes pairing activable indicators with host products and then activating them prior to their distribution. The technology of the present disclosure employs separate activation indicator components which have the same activation conditions as the activatable environmental exposure indicator of a given RF tag, but that do not change their state responsive to the environmental conditions which would trigger the associated environmental indicator. The activation indicators are associated with or incorporated in with RF tag in a manner and are configured to change the response behavior of the RF tag, such that a state of activation of the activatable environmental exposure indicator may be determined by interrogating the RF tag. For example, the RF tag may have a first response behavior corresponding to a state prior to activation (e.g., unactivated state), a second response behavior corresponding to a second state prior to the environmental exposure, but subsequent to activation (e.g., activated and unexposed state), and a third response behavior corresponding to a third state subsequent to both activation and the environmental exposure (e.g., activated and exposed state).

The discussion contained in the following detailed description has been organized as follows:
Section I: Some Relevant Materials and Notable Properties Thereof.
Section II: Embodiments of Activatable Environmental Exposure Indicators.
Section III: Embodiments of Activation Indicator Components.
Section IV: Embodiments of Activatable Environmentally Sensitive RF tags.
Section V: Methods of Confirming Activation of RF tags.

Section I: Some Relevant Materials and Notable Properties Thereof

Liquefiable Materials

Various embodiments of activatable environmental exposure indicators discussed herein utilize a liquefiable material that can be configured to react to an environmental exposure temperature above a predetermined threshold relatively quickly. This is because the liquefiable material of some embodiments is configured or selected to have a sharp melting point, such that liquefaction happens very quickly over a small temperature range. Thus, exposure to a predetermined environmental exposure, (e.g., a peak temperature exceeding the melting point of the liquefiable material), causes a quick state change. However, notwithstanding a relatively quick response by the liquefiable material to heat, some indicators discussed herein exhibit a time-dependent response that halts when conditions return below the environmental exposure temperature threshold and resumes again in an additive manner. Again, in some embodiments, this is due to the liquefiable material having a sharp transition between a liquid phase and a solid phase.

In other words, where an indicator is configured to signal a response after an exposure of about 30 minutes at and/or above the environmental exposure temperature threshold, a 20-minute exposure will not trigger a response, but if the indicator is again exposed to a temperature at and/or above the environmental exposure temperature threshold, only about ten more minutes of exposure will yield a response. In some embodiments as noted above, this behavior is achieved because the liquefiable solid (such as a side-chain crystalline polymer) readily solidifies within a narrow temperature range. Once the environmental exposure temperature has been exceeded, a drop in temperature below the environmental exposure will cause almost immediate cessation of the time-dependent response. The response will resume once the environmental exposure temperature threshold is again exceeded.

As used herein, the terms "predetermined environmental exposure" and "environmental exposure temperature threshold" have an understood meaning in the art and include a temperature, usually a temperature above 0° C. (though temperatures below 0° C. are also contemplated), that can cause damage or harm to a product, such as a food or a vaccine that may require refrigeration to avoid spoilage or maintain efficacy for extended periods. The term "environmental exposure temperature threshold," then, can include any predetermined temperature that is above a desired storage temperature of a perishable product, though in some cases exposure for short periods of time may not damage or harm a particular product. Thus, some embodiments disclosed herein are configured to provide signal of exposure to temperatures at and/or above an environmental exposure temperature threshold only after a specified amount of time even if exposure occurs at different times.

In some embodiments, the liquefiable material has a "sharp" liquefaction point, meaning that the transition from solid to liquid happens very quickly over a very small temperature range. In some embodiments, liquefaction temperature and solidification temperature of the liquefiable solid are identical. In some embodiments, the liquefaction and solidification temperatures are within about 0.1° C., within about 0.5° C., within about 1.0° C., within about 1.5° C., within about 2° C., within about 2.5° C., within about 3.0° C., within about 3.5° C., within about 4.0° C., within about 4.5° C., within about 5° C., or within about 10° C. of each other.

As used herein, the term "solid phase" may refer to a material in a non-liquid state such that the material is incapable of fluid flow. In some examples "solid phase" may refer to a gelled state, a highly viscous state, a true solid state, and the like. Similarly, the terms "solidification" and "solidify" are used to describe the transition in which a material not in the solid phase enters the solid phase. The terms "solidification point" and "solidification temperature" are used to describe a temperature, or temperature range, at or in which a material may undergo solidification.

As used herein, the term "liquid phase" is used to describe a state of a material in which the material is capable of fluid flow. Similarly, the terms "liquefaction" and "liquefy" are used to describe the transition in which a material not in the liquid phase enters the liquid phase. The terms "liquefaction point" and "liquefaction temperature" are used to describe a temperature, or temperature range, at or in which a material may undergo liquefaction.

Suitable liquefiable materials include synthetic polymeric materials that are solid below the threshold temperature and are, or can become, a flowing amorphous solid or a viscous liquid when at and/or above a threshold temperature. Such synthetic polymeric materials are liquefiable. Useful synthetic polymers can also be hydrophobic, if desired. Suitable liquefiable materials include side-chain crystallizable polymers (e.g., various methacrylates, such as poly(hexadecyl-methacrylate); a polymer or a copolymer having at least one crystallizable side chain selected from the group consisting of a C4-30 aliphatic group; a C6-30 aromatic group; a linear aliphatic group having at least 10 carbon atoms; a combination of at least one aliphatic group and at least one aromatic group, the combination having from 7 carbon atoms to about 30 carbon atoms; a C10-C22 acrylate; a C10-C22 methacrylate; an acrylamide; a methacrylamide; a vinyl ether; a vinyl ester; a fluorinated aliphatic group having at least 6 carbon atoms; and a p-alkyl styrene group wherein the alkyl group has from about 8 carbon atoms to about 24 carbon atoms).

As used herein, the term "polymer", and its linguistic variations, refers to copolymers, and higher order polymers, as well as homopolymers, unless the context indicates otherwise, for example, by describing or referencing one or more specific homopolymers.

When solid, the synthetic polymeric material can be crystalline or partially crystalline. Crystalline or partially crystalline synthetic polymeric materials can have desirably sharp transitions from a solid state to a liquid state.

Side chain (liquid) crystalline polymers (abbreviated as SCC hereafter) are particularly suitable liquefiable materials, though other suitable materials such as waxes could readily be used. SCC polymers have a conventional polymer backbone and side chains that can co crystallize. Typically, they are chains that have six or more carbons with a crystallization temperature that is, therefore, adjustable. In some embodiments, the side chains "melt" independently of the main polymer chain so that the phenomenon can be used to release other materials that have been encapsulated within the overall polymer structure. Another advantage of SCC polymers is that their molecular weight and degree of crosslinking can be adjusted to control their physical properties including their permeability and in turn provide an approach to tailor the time delay.

Some examples of SCC polymers include poly(dodecylacrylate), poly(tetradecylacrylate), poly(hexadecylacrylate), poly(octadecylacrylate), copolymer of hexylacrylate and dodecylacrylate, copolymer of hexylacrylate and docosylacrylate, copolymer of decylacrylate and tetradecylacrylate, copolymer of decylacrylate and octadecylacrylate, copolymer of decylacrylate and octadecylacrylate, copolymer of decylacrylate and octadecylacrylate, copolymer of dodecylacrylate and docosylacrylate, copolymer of dodecylacrylate and docosylacrylate, copolymer of dodecylacrylate and docosylacrylate, copolymer of tetradecylacrylate and octadecylacrylate, copolymer of tetradecylacrylate and octadecylacrylate, copolymer of tetradecylacrylate and octadecylacrylate, poly(dodecylmethacrylate), poly(tetradecylmethacrylate), poly(hexadecylmethacrylate), poly(octadecylmethacrylate), copolymer of tetradecylmethacrylate and methyl methacrylate, copolymer of octadecylmethacrylate and methyl methacrylate.

For example, the liquefiable material may be a side-chain crystallizable polymer combined with an alkane wax. Some side-chain crystallizable (SCC) polymers useful in the practice of the present disclosure, alone or in combination, and methods that can be employed for preparing them, are described in O'Leary et al. "Copolymers of poly(n-alkyl acrylates): synthesis, characterization, and monomer reactivity ratios" in Polymer 2004 45 pp 6575-6585 ("O'Leary et al." herein), and in Greenberg et al. "Side Chain Crystallization of n-Alkyl Polymethacrylates and Polyacrylates" J. Am. Chem. Soc., 1954, 76 (24), pp. 6280-6285 ("Greenberg et al." herein). The disclosure of each of O'Leary et al. and Greenberg et al. is incorporated by reference herein for all purposes.

Side-chain crystallizable polymers, sometimes called "comb-like" polymers, are well-known and available commercially. These polymers are reviewed in J. Polymer Sci. Macromol. Rev. 8:117-253 (1974), the disclosure of which is hereby incorporated by reference. In general, these polymers contain monomer units X of the formula:

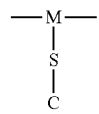

where M is a backbone atom, S is a spacer unit and C is a crystallizable group. These polymers have a heat of fusion ($\Delta H_f$) of at least about 20 Joules/g, preferably at least about 40 Joules/g. The polymers will contain about 50 to 100 percent monomer units represented by "X". If the polymer contains less than 100 percent X, in addition contain monomer units which may be represented by "Y" or "Z", or both, wherein Y is any polar or nonpolar monomer or mixture of polar or nonpolar monomers capable of polymerizing with X and/or Z, and wherein Z is a polar monomer or mixture of polar monomers. Polar groups, (e.g., polyoxyalkylenes, acrylates including hydroxyethylacrylate, acrylamides including methacrylamide) will typically increase adhesion to most substrates. If the polar species "Z" is acrylic acid, it is preferred that it comprise about 1-10 wt. percent of the polymer.

The backbone of the polymer (defined by "M") may be any organic structure (aliphatic or aromatic hydrocarbon, ester, ether, amide, etc.) or an inorganic structure (sulfide, phosphazine, silicone, etc.), and may include spacer linkages which can be any suitable organic or inorganic unit, for example ester, amide, hydrocarbon, phenyl, ether, or ionic salt (e.g., a carboxyl-alkyl ammonium or sulphonium or phosphonium ion pair or other known ionic salt pair).

The side-chain (defined by 'S' and 'C') may be aliphatic or aromatic or a combination of aliphatic and aromatic, but must be capable of entering into a crystal line state. Common examples are linear aliphatic side chains of at least 10 carbon atoms, (e.g., $C_4$-$C_{22}$ acrylates or methacrylates, acrylamides or methacrylamides, vinyl ethers or esters, siloxanes or alpha olefins; fluorinated aliphatic side-chains of at least 6 carbons; and p-alkyl styrene side-chains wherein the alkyl is of 8 to 24 carbon atoms).

The length of the side-chain moiety is usually greater than 5 times the distance between side-chains in the case of acrylates, methacrylates, vinyl esters, acrylamides, methacrylamides, vinyl ethers and alpha olefins. In the extreme case of a fluoroacrylate alternate copolymer with butadiene, the side-chain can be as little as two times the length as the distance between the branches.

In any case, the side-chain units should make up greater than 50 percent of the volume of the polymer, preferably greater than 65 percent of the volume. Specific examples of side-chain crystallizable monomers are the acrylate, fluoroacrylate, methacrylate and vinyl ester polymers described in J. Poly. Sci 10:3347 (1972); J. Poly. Sci 10:1657 (1972); J. Poly. Sci 9:3367 (1971); J. Poly. Sci 9:3349 (1971); J. Poly. Sci. 9:1835 (1971); J.A.C.S. 76:6280 (1954); J. Poly, Sci 7:3053 (1969); Polymer J. 17:991 (1985), corresponding acryl amides, substituted acrylamide and maleimide polymers (J. Poly. Sci: Poly. Physics Ed. 18:2197 (1980); polyalphaolefin polymers such as those described in J. Poly. 5,156,911 7 Sci. Macromol. Rey, 8:117-253 (1974) and Macromolecules 13:12 (1980), polyalkylvinylethers, polyalkylethylene oxides such as those described in Macromolecules 13:15 (1980), alkylphosphazene polymers, polyamino acids such as those described in Poly. Sci. USSR 21:241, Macromolecules 18:2141, polyisocyanates such as those described in Macromolecules 12:94 (1979), polyurethanes made by reacting amine- or alcohol-containing monomers with long-chain alkyl isocyanates, polyesters and polyethers, polysiloxanes and polysilanes such as those described in Macromolecules 19:611 (1986), and p-alkylstyrene polymers such as those described in J.A.C.S. 75:3326 (1953) and J. Poly. Sci 60:19 (1962). Of specific utility are polymers which are both relatively polar and capable of crystallization, but wherein the crystallizing portion is not affected by moisture. For example, incorporation of polyoxyethylene, polyoxy propylene, polyoxybutylene or copolyoxyalkylene units in the polymer will make the polymer more polar.

In a particularly preferred embodiment herein, in the above structure, —C is selected from the group consisting of —($CH_2$)—$CH_3$ and —($CF_2$)$_n$—$CF_2H$, where n is an integer in the range of 8 to 20 inclusive, —S— is selected from the group consisting of —O—, —$CH_2$—, —(CO)—, —O(CO)— and —NR— where R is hydrogen or lower alkyl (1-6C), and -M- is —[($CH_2$)$_m$—CH]— where m is 0 to 2.

Typical "Y" units include linear or branched alkyl or aryl acrylates or methacrylates, alpha olefins, linear or branched alkyl vinyl ether or vinyl esters, maleicesters or itaconic acid esters, acrylamides, styrenes or substituted styrenes, acrylic acid, methacrylic acid and hydrophilic monomers as detailed in WO84/0387, cited supra.

Some useful side-chain crystallizable polymers, and monomers for preparing side-chain crystallizable polymers, are also available from commercial suppliers, for example, Scientific Polymer Products, Inc., Ontario, N.Y., Sigma-Aldrich, Saint Louis, Mo., TCI America, Portland Oreg., Monomer-Polymer & Dajac Labs, Inc., Trevose, Pa., San Esters Corp., New York, N.Y., Sartomer USA, LLC, Exton Pa., and Polysciences, Inc. Other materials may be SCCs alone, without SCCs, or alkane waxes blended without SCCs.

Microcapsules

Various embodiments of activatable environmental exposure indicators and activation indicator components discussed herein utilize microcapsules having frangible shells, which are employed to microencapsulate a payload of other materials (e.g., liquefiable materials and conductive particles), forming a microcapsule. The frangible shells are rupturable, such that the frangible shells rupture and release the payload when subjected to an activation action.

The microcapsules may be any size, but in one such embodiment, has an outer diameter length between 50 to 750 μm. The frangible shell may be any size smaller than or equal to the outer diameter of the microcapsule. In some embodiments, the shell 110 has a thickness of between 5 to 25 micrometers (μm). The payload ratio, or the ratio of the total weight of the payload within the microcapsule to the entire weight of the microcapsule including the contents contained within the microcapsule, can range from 50 percent to 90 percent. A variety of microcapsule frangible shell materials may be chosen, depending on the application, the mode of rupture, and the nature of the contents of the microcapsule. In general, the microcapsules should resist the passage, whether by flow, diffusion, or migration, of the contents of the microcapsule prior to rupturing.

For example, the frangible shell may be formed in whole or in part by a wax, (e.g., an alkane wax), or other acid resistant compound having a relatively high melting point, (e.g., fatty acid amide, an ester or Elvax EVA resin). For example, the melting point may be in a range of about 50 degrees Celsius (C) to about 300 degrees C., from about 100 degrees C. to about 300 degrees C., from about 150 degrees C. to about 300 degrees C., from about 200 degrees C. to about 300 degrees C., from about 250 degrees C. to about 300 degrees C. Generally, the shell should have a higher melting point than the maximum temperature the microcapsule is expected to be exposed to in normal use, to prevent it from rupturing or melting prematurely.

In another example, the frangible shell may be formed in whole or in part by a polymer coating having a high glass transition temperature ($T_g$) (e.g. Polysulfone). For example, the glass transition temperature may be in a range of about 50 degrees C. to about 300 degrees C., from about 100 degrees C. to about 300 degrees C., from about 150 degrees C. to about 300 degrees C., from about 200 degrees C. to about 300 degrees C., from about 250 degrees C. to about 300 degrees C. For example, Polysulfone, with a $T_g$ of about 190 C may be used. In additional examples, the microcapsules 100 may be one of Styrene Maleic Anhydride (SMA), Polyphenylene Ether (PPE), Cellulose Acetate, Cellulose Diacetate, Polyacrylate, Polyamide, Polycarbonate, polyether ether ketone, Polyether Sulfone, PET, PFA, polymethyl methacrylate (PMMA) or Polyimide.

In another example, the frangible shell may be formed in whole or in part by a low molecular weight polymer gel having a high melting point, (e.g., fatty acid amide, an ester or Elvax EVA resin). For example, the melting point may be in a range of about 100 degrees C. to about 300 degrees C., from about 150 degrees C. to about 300 degrees C., from about 200 degrees C. to about 300 degrees C., from about 250 degrees C. to about 300 degrees C. Additionally, in some examples, the polymer gel has a molecular weight in a range from about 1 grams per mole (g/mol) to 100,000 g/mol, from about 3,500 g/mol to 6,000 g/mol and from about 200 g/mol to 2,000 g/mol.

Alternatively, the frangible shell may be formed in whole or in part by a gel, gelatin, protein, polyurea formaldehyde, polymelamine formaldehyde, wax material, melamine, or an emulsion. The microcapsules may be available in wet and dry formulations. Polymelamine and polyurea formaldehyde can both be used for encapsulations via interfacial polymerization, which uses two immiscible phases. Once separated in the same vessel, a reaction is initiated at the interface of the two immiscible phases in the presence of an initiator and the material to be encapsulated. As polymerization occurs, microcapsules form around the core material. The microcapsule releases the contents of the microcapsule upon rupturing.

The microcapsule is initially in an unruptured form, capable of being configured to transition to a ruptured form when ruptured by exposure to an activation action, (e.g., the application of heat, pressure, and/or a combination of heat and pressure exceeding a predetermined threshold). In the unruptured form, the frangible shell of the microcapsule maintains separation between the contents of the microcapsule and any external environmental stimuli and/or contains a phase change of the contents of the microcapsule in response to any external environmental stimuli.

The frangible shell may be ruptured by applying an activation action to the microcapsule exceeding a predetermined activation threshold. The activation action may cause the frangible shell to fracture, melt, break, dissolve, sublime, become porous, or otherwise disengage, allowing the release of the contents of the frangible shell, generally referred to herein as "rupturing".

According to some embodiments, the activation action may be an application of at least one of an activation heat and an activation pressure. In some examples, the temperature threshold for activation may be from about 0 degrees C. to 300 degrees C., from about 90 degrees C. to 110 degrees C., from about 100 degrees C. to 200 degrees C., from about 100 degrees C. to 300 degrees C., and from about 200 degrees C. to 300 degrees C.

In some examples, where the activation action is a thermal stress, the temperature threshold for activation may be a temperature exceeding about 35 degrees C., a temperature exceeding about 40 degrees C., a temperature exceeding about 45 degrees C., a temperature exceeding about 50 degrees C., a temperature exceeding about 55 degrees C., a temperature exceeding about 60 degrees C., a temperature exceeding about 65 degrees C., a temperature exceeding about 70 degrees C., a temperature exceeding about 75 degrees C., a temperature exceeding about 80 degrees C., a temperature exceeding about 85 degrees C., a temperature exceeding about 90 degrees C., a temperature exceeding about 95 degrees C., and a temperature exceeding about 100 degrees C. The activation heat ranges given are purely exemplary and the microcapsules can be formed to respond to other temperature ranges.

Rupturing the microcapsule may be achieved by applying a high temperature for a very short interval, (e.g., a few milliseconds). For example, the mass or heat of fusion of the indicator may be much greater than the mass or heat of fusion of a barrier that needs to be removed, allowing a short exposure to high temperature to remove or alter the microcapsule without significantly affecting the contents of the microcapsule.

In some cases, pressure may also contribute to rupturing the microcapsule, either alone or in combination with elevated temperature. In such embodiments, the activation action is a compressive stress, or a shearing stress, where the predetermined activation threshold is a stress exceeding about 0.1 pounds per square inch (psi), a stress exceeding about 0.5 psi, a stress exceeding about 1 psi, a stress exceeding about 2 psi, a stress exceeding about 5 psi, a stress exceeding about 10 psi, or a stress exceeding about 15 psi.

The activation action may include the application of heat to reach an activation temperature, the application of an activation pressure, or a combination thereof. As a non-limiting example, media including the microcapsules can be processed by a thermal printer, where a thermal printhead of the thermal printer can provide the activation action, (e.g., the activation temperature, the activation pressure, or combination thereof). In some examples, the temperature threshold for activation may be from about −40° C. to 100° C., from about 5° C. to 35° C., from about 0° C. to 300° C., from about 90° C. to 110° C., from about 100° C. to 200° C., from about 100° C. to 300° C., and from about 200° C. to 300° C. Rupture of the microcapsules may be achieved by applying a high temperature for a very short interval, (e.g., a few milliseconds). In this manner, even if the temperature needed to activate the device exceeds the temperature that a temperature exposure indicator is configured to indicate, the exposure may be so short that the indicator itself is not affected. For example, the mass or heat of fusion of the indicator may be much greater than the mass or heat of fusion of a barrier that needs to be removed, allowing a short exposure to high temperature to remove or alter the microcapsule without significantly affecting the contents of the microcapsule. Typical thermal printheads have temperatures in the range from about 100° C. to 300° C., which may be tuned downward for select applications to from about 100° C. to 200° C. They are typically exposed to thermal printheads for a brief period of time, for example a few milliseconds. The microcapsule itself responds when it reaches a temperature of in a range from about −40° C. to 100° C., from about 5° C. to 35° C., from about 0° C. to 300° C., from about 90° C. to 110° C., from about 100° C. to 200° C., from about 100° C. to 300° C., and from about 200° C. to 300° C. The activation temperature ranges given are purely exemplary and other ranges may be sufficient to rupture the microcapsules, where such pressure ranges may vary based on a composition of the frangible shell, a thickness of the frangible shell, a ratio between the shell thickness or weight to volume or weight of the indicator material, a diameter of the microcapsules, a temperature applied to the shells, etc. In some cases, pressure may also contribute to the rupturing the microcapsules, either alone like an impact printer, or in combination with elevated temperature. In some examples, the activation pressure required to rupture the microcapsules may be from about 1.5 to 8 pounds per square inch or from about 4 to 15 pounds per square inch. The activation pressure ranges given are purely exemplary and other ranges may be sufficient to rupture the microcapsules, where such pressure ranges may vary based on a composition of the frangible shell, a thickness of the frangible shell, a ratio between the shell thickness or weight to volume or weight of the indicator material, a diameter of the microcapsules, a temperature applied to the shells, etc.

In some examples, the microcapsules may be ruptured or weakened by a source of internal pressure, where the activation action is configured to trigger expansion of a material within the frangible shell (e.g., a thermally expansive material, thermally expandable microsphere) which increases the internal pressure of the microcapsule, which ruptures or weakens the frangible shell.

According to some embodiments, the frangible shell is electrically nonconductive, insulative, resistive, or otherwise resists, and may substantially prevent the conduction of electricity through the microcapsule.

According to some embodiments, the microcapsules may be configured to rupture in response to thermal and pressure stresses applied by a thermal printer.

Section II: Embodiments of Activatable Environmental Exposure Indicators

Section II discusses various embodiments of activatable environmental exposure indicators 200, which may employ one or more embodiments of microcapsules 100 in one or more mechanisms to indicate an exposure of the activatable environmental exposure indicator 200 to a predetermined environmental exposure which occurs after the application of an activation action to the activatable environmental exposure indicator 200. Of particular importance in the present disclosure are activatable environmental exposure indicators which change electrical properties, such as going from nonconductive to conductive, or vice versa, changing resistance, capacitance, or other detectable electrical property. These sorts of indicators are suitable for incorporation in electrical circuits, (e.g., those in an RF tag), in order to cause a change in electrical behavior of such circuits responsive to the change of electrical property of indicator.

Each embodiment of the activatable environmental exposure indicator 200 has a respective initial or first stage corresponding to when the activation action has not been applied to the activatable environmental exposure indicator 200, a respective second stage corresponding to a time after the activation action has been applied to the activatable environmental exposure indicator 200 and prior to the predetermined environmental exposure, and at least a respective third stage corresponding to a time after the activatable environmental exposure indicator 200 has been exposed to the predetermined environmental exposure subsequent to the application of the activation action. In some embodiments of the activatable environmental exposure indicator 200, the third stage corresponds to a time immediately, or very soon after the exposure to the predetermined environmental exposure. In some cases, the activatable environmental exposure indicator 200 has a fourth stage which corresponds to a time at least a predetermined amount of time has passed after the exposure to the predetermined environmental exposure or may have multiple states or a continuous range of states in response to exposure over time.

According to some embodiments, each activatable environmental exposure indicator 200 has a respective unexposed state and a respective exposed state, such that the transition from the unexposed state to the exposed state indicates that the activatable environmental exposure indicator 200 has been exposed to the predetermined environmental exposure, after the indicator has been activated.

According to some embodiments, the unexposed state may be an indicator conductive state, in which the activatable environmental exposure indicator 200 facilitates an electrical connection, or a flow of electrical current, through the activatable environmental exposure indicator 200.

According to some embodiments, the unexposed state may be an indicator nonconductive state, in which the indicator blocks, resists, impedes, or otherwise prevents the flow of electrical current through the activatable environmental exposure indicator 200.

According to some embodiments, the unexposed state may be a state in which the activatable environmental exposure indicator 200 has a first distinct electrical property, such as a first capacitance, a first resistance, a first impedance, a first inductance, a first conductivity, or a first value of a similar property.

According to some embodiments, the exposed state may be an indicator conductive state, in which the activatable environmental exposure indicator 200 facilitates an electrical connection, or a flow of electrical current, through the activatable environmental exposure indicator 200.

According to some embodiments, the exposed state may be an indicator nonconductive state, in which the indicator blocks, resists, impedes, or otherwise prevents the flow of electrical current through the activatable environmental exposure indicator 200.

According to some embodiments, the exposed state may be a state in which the activatable environmental exposure indicator 200 has a second distinct electrical property, such as a second capacitance, a second resistance, a second impedance, a second inductance, a second conductivity, or a second value of the similar property.

Microcapsule: First Embodiment

FIG. 1 illustrates a cross-sectional view of a first embodiment of a microcapsule 100A, according to embodiments of the present disclosure. The microcapsule 100A may be a component employed in various embodiments of the activatable environmental exposure indicator 200, including the first embodiment of the activatable environmental exposure indicator 200A, the second embodiment of the activatable environmental exposure indicator 200B, and the third embodiment of the activatable environmental exposure indicator 200C, according to embodiments of the present disclosure. According to some embodiments the microcapsule 100A (e.g. microsphere) includes a conductive particle 130 embedded in a liquefiable material 120. The conductive particle 130 and liquefiable material 120 are collectively microencapsulated in a shell 110. The shell 110 of the microcapsule 100A may include any of the features and properties of the frangible shells discussed above in Section I.

The conductive particle 130 is smaller in relation to the microcapsule 100A, and multiple conductive particles 130 may be embedded in the liquefiable material 120 in a single microcapsule 100A, either as a single integrated piece, or each with their own separate portion of the liquefiable material 120.

The microcapsule 100A may be any size, but in one such embodiment, has an outer diameter length between 50 to 750 μm. The shell 110 may be any size smaller than or equal to the outer diameter of the microcapsule 100A. In some embodiments, the shell 110 has a thickness of between 5 to 25 micrometers (μm). The payload, or the ratio of the total weight of the contents (e.g. conductive particle 130, liquefiable material 120) within the microcapsule 100A to the entire weight of the microcapsule 100A including the contents contained within the microcapsule 100A, can range from 50 percent to 90 percent. A variety of microcapsule shell 110 materials may be chosen, depending on the application, the mode of rupture, and the nature of the contents of the microcapsule 100A. In general, the shells 110 should resist the passage, whether by flow, diffusion, or migration, of the contents of the microcapsule 100A, prior to rupturing.

The microcapsule 100A is initially in an unruptured form, capable of being configured to transition to a ruptured form when ruptured through exposure to an activation action, (e.g., the application of heat, pressure, and/or heat and pressure exceeding a predetermined threshold). In the unruptured form, the shell 110 of the microcapsule 100A maintains separation between the payload and any external environmental stimuli and/or contains a phase change of the payload of the microcapsule 100A in response to any external environmental stimuli.

According to some embodiments, the microcapsule 100A is configured to rupture responsive to an activation action. The activation action may be one, or a combination of one or more activation actions as described above in Section I.

The microcapsule 100A includes a liquefiable material 120, according to embodiments of the present disclosure. The liquefiable material 120 may be any such material capable liquefying from a substantially solid phase (e.g., solid, semi-solid, highly viscous, and/or gelled state) to a liquid phase (e.g., fluid, relatively less viscous state) upon the occurrence of a predetermined environmental exposure. In some examples, the liquefiable material 120 may include any of the features and properties of the liquefiable materials described above in Section I.

The liquefiable material 120 is configured to liquefy responsive to a predetermined environmental exposure. The shell 110 of the microcapsule 100A may be utilized in order to prevent wicking or migration of the liquefiable material 120 prior to subjection to an activation action even when the liquefiable material 120 encapsulated in the microcapsules is exposed to the predetermined environmental exposure. Alternatively, the microcapsule 100A may insulate the payload from the predetermined environmental exposure.

According to some embodiments, the predetermined environmental exposure may be one of a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time, combinations thereof, and the like.

In one embodiment, the liquefiable material 120 is a meltable solid configured to melt in response to a temperature above a predetermined threshold, forming a liquid. In another embodiment, the liquefiable material 120 is a gel configured to, in response to a predetermined environmental exposure above a predetermined threshold, change viscosity such that the gel is substantially liquefied and is capable of fluid flow.

According to some embodiments, the liquefiable material 120 is electrically nonconductive, insulative, resistive, or otherwise resists or substantially prevents the conduction of electricity through the liquefiable material 120. In some examples, the liquefiable material 120 is electrically conductive, and facilitates the conduction of electricity through the liquefiable material 120. In some examples, the liquefiable material 120 is electrically nonconductive when in one of the liquid phase and the solid phase, and is electrically conductive when in the other of the liquid phase and the solid phase. In some examples the carrier material has a first electrical conductivity when in one of the solid phase, the liquid phase, and a first viscous state, and has a second electrical conductivity in another of the solid phase, the liquid phase, and a second viscous state.

According to some embodiments, the microcapsule 100A includes a conductive particle 130. In some examples the microcapsule 100A includes a plurality of conductive particles 130. Conductive particles 130 may include particles of conductive metals, such as copper, silver, gold, aluminum, zinc, tin, similar metals, and alloys thereof. The conductive particles 130 may also or alternatively include particles of graphene, graphite, carbon black, graphene oxides, and other functionalized graphenes, and/or particles containing other conductive non-metals. The conductive particles 130 may be formed in whole or in part by any electrically conductive substance or material operable to be particlized to a sufficient size to fit within the shell 110 of the microcapsule 100A.

FIGS. 2A-4C illustrate several embodiments of activatable environmental exposure indicators 200 which employ the first embodiment of the activatable microcapsule 100, microcapsule 100A, as discussed in reference to FIG. 1.

Activatable Environmental Exposure Indicator: First Embodiment

Figure 2A:
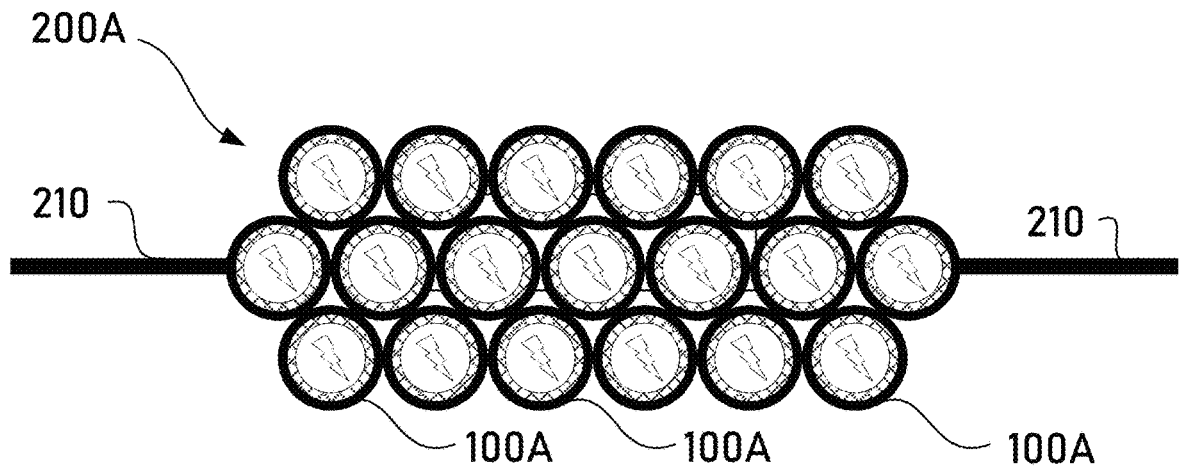
FIGS. 2A-2C illustrate various stages of a first embodiment of an activatable environmental exposure indicator employing the microcapsule of FIG. 1, according to embodiments of the present disclosure.
Figure 2B:
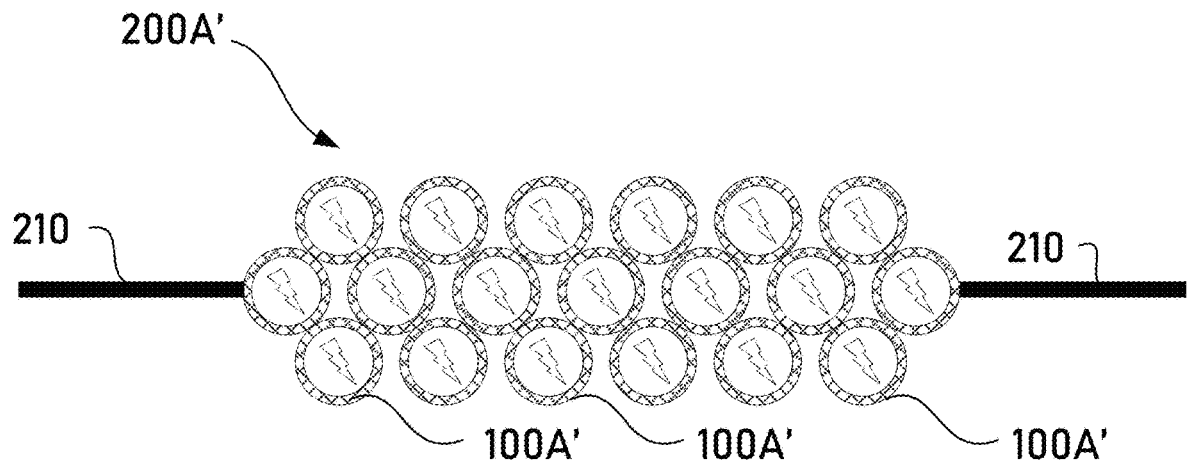
Figure 2C:
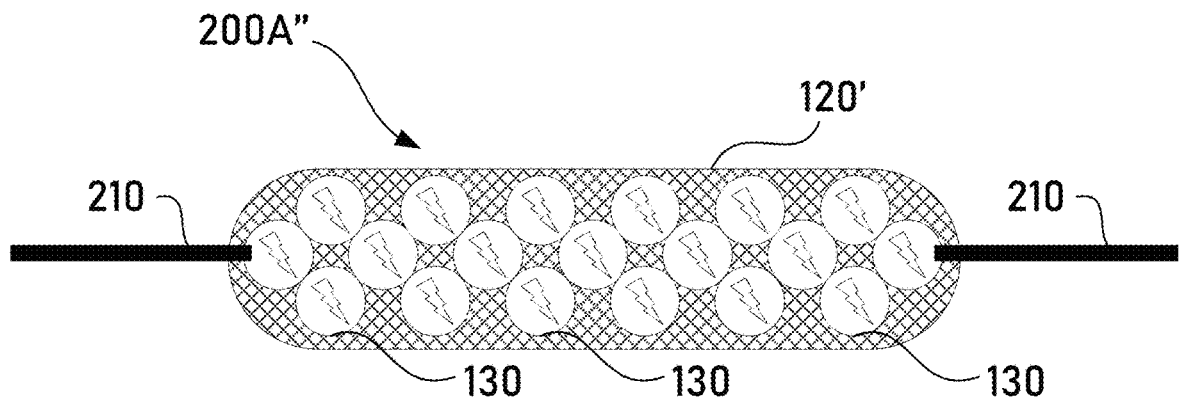

FIGS. 2A-2C illustrate a first embodiment of the activatable environmental exposure indicator 200A, according to embodiments of the present disclosure. The activatable environmental exposure indicator 200A is configured to transition from a nonconductive state a conductive state, responsive to a predetermined environmental exposure occurring subsequent to the application of an activation action.

As illustrated in FIG. 2A, the first embodiment of the activatable environmental exposure indicator 200A, among other embodiments of the activatable environmental exposure indicator 200 may include a plurality of microcapsules 100A, each microcapsule 100A including a conductive particle 130 contained (e.g., suspended, embedded in a solid matrix) within a liquefiable material 120, microencapsulated in a shell 110. The activatable environmental exposure indicator 200A forms a portion of (e.g., physically couples two sections of) a wire/trace 210. The unexposed state of the activatable environmental exposure indicator 200A is a nonconductive state (e.g., indicator nonconductive state), and the exposed state of the activatable environmental exposure indicator 200A is a conductive state (e.g., indicator conductive state). When the activatable environmental exposure indicator 200A is in the indicator nonconductive state, the activatable environmental exposure indicator 200A does not conduct electricity through the wire/trace 210. According to some embodiments, when in the indicator nonconductive state, the activatable environmental exposure indicator 200A blocks, impedes, resists or otherwise prevents the conduction of electricity and electrical signals through the wire/trace 210. When the activatable environmental exposure indicator 200A is in the indicator conductive state, the activatable environmental exposure indicator 200A forms an electrical connection across the wire/trace 210, and electricity flows through the activatable environmental exposure indicator 200A and through the wire/trace 210. Said differently, the activatable environmental exposure indicator 200A is an electrical switch that is operable to be opened or closed in response to exposure to a predetermined environmental condition after an activation action. When the activatable environmental exposure indicator 200A is in the indicator conductive state, the switch is closed, and when the activatable environmental exposure indicator 200A is in the indicator nonconductive state, the switch is open.

FIG. 2A illustrates the first embodiment of the activatable environmental exposure indicator 200A in the first stage, prior to the application of the activation action and prior to the predetermined environmental exposure. In the first stage, the shells 110 of the microcapsules 100A are intact, and the liquefiable material 120 and conductive particles 130 are contained. In the first stage, the activatable environmental exposure indicator 200A is in the nonconductive state (e.g., the switch is open). Furthermore, the liquefiable material 120 and the conductive particles 130 are isolated from the environment, so environmental sensing cannot yet occur.

FIG. 2B illustrates the first embodiment of the activatable environmental exposure indicator 200A' in the second stage, after the application of the activation action, and prior to the predetermined environmental exposure, according to embodiments of the present disclosure. As illustrated in FIG. 2B, the microcapsules 100A' have been ruptured responsive to the application of the activation action, and the liquefiable material 120 is now exposed to the environment. The activatable environmental exposure indicator 200A' remains in the nonconductive state, as the conductive particles 130 remain embedded in a solid matrix of the liquefiable material 120 and are thus blocked from contact with one another. In some examples, the liquefiable material 120 may be non-conductive in the solid phase, and electrical connection across the wire/trace 210 and through the activatable environmental exposure indicator 200 is still substantially prevented by the liquefiable material 120. Because the liquefiable material 120 is exposed to the environment, the activatable environmental exposure indicator 200A is activated, and primed to transition to the conductive state responsive to the predetermined environmental exposure. When the activatable environmental exposure indicator 200A' is activated, environmental sensing begins.

FIG. 2C illustrates the first embodiment of the activatable environmental exposure indicator 200A" in the third stage, after the application of the activation action and after the predetermined environmental exposure, according to embodiments of the present disclosure. In the third stage, the liquefiable material 120 liquefies, and releases the conductive particles 130, such that the conductive particles 130 are no longer blocked from migration. Once released, the conductive particles 130 form an electrical connection (e.g., first electrical connection, second electrical connection). In some examples, the conductive particles 130 may be drawn together, by magnetic, mechanical, chemical, and/or electrical forces, to form the electrical connection across the wire/trace 210, transitioning the activatable environmental exposure indicator 200A" to the conductive state. In this manner, the activatable environmental exposure indicator 200A" may be employed to indicate the occurrence of the predetermined environmental exposure following activation.

Activatable Environmental Exposure Indicator: Second Embodiment

FIGS. 3A-3D illustrate a second embodiment of the activatable environmental exposure indicator 200B, according to embodiments of the present disclosure. The activatable environmental exposure indicator 200B is configured to transition from a nonconductive state to a conductive state, responsive to a predetermined environmental exposure occurring subsequent to the application of an activation action.

As illustrated in FIGS. 3A-3D, the second embodiment of the activatable environmental exposure indicator 200B, among other embodiments of the activatable environmental exposure indicator 200 may include a plurality of microcapsules 100A, each microcapsule 100A including a conductive particle 130 contained (e.g., suspended, embedded in a solid matrix) within a liquefiable material 120, microencapsulated in a shell 110. The activatable environmental exposure indicator 200B further includes a first type of wick 220A. The activatable environmental exposure indicator 200B forms a portion of (e.g., physically couples two sections of) a wire/trace 210. The unexposed state of the activatable environmental exposure indicator 200D is a nonconductive state (e.g., indicator nonconductive state) and the exposed state of the activatable environmental exposure indicator 200B is a conductive state (e.g., indicator conductive state). When the activatable environmental exposure indicator 200B is in the nonconductive state, the activatable environmental exposure indicator 200B does not conduct electricity through the wire/trace 210. According to some embodiments, when in the nonconductive state, the activatable environmental exposure indicator 200B blocks, impedes, resists, or otherwise prevents the conduction of electricity and electrical signals through the wire/trace 210. When the activatable environmental exposure indicator 200B is in the conductive state, the activatable environmental exposure indicator 200B forms an electrical connection across the wire/trace 210, and electricity flows through the activatable environmental exposure indicator 200B and through the wire/trace 210. Said differently, the activatable environmental exposure indicator 200B is an electrical switch that is operable to be opened or closed in response to exposure to a predetermined environmental condition after an activation action. When the activatable environmental exposure indicator 200B is in the conductive state, the switch is closed, and when the activatable environmental exposure indicator 200B is in the nonconductive state, the switch is open. The wick 220A may disposed proximately, (e.g., adjacent) to both the wire/trace 210 and the microcapsules 100A. According to some embodiments, the wick 220A is permeable with respect to the liquefiable material 120 when liquefied, and not permeable with respect to the conductive particles 130.

Figure 3A:
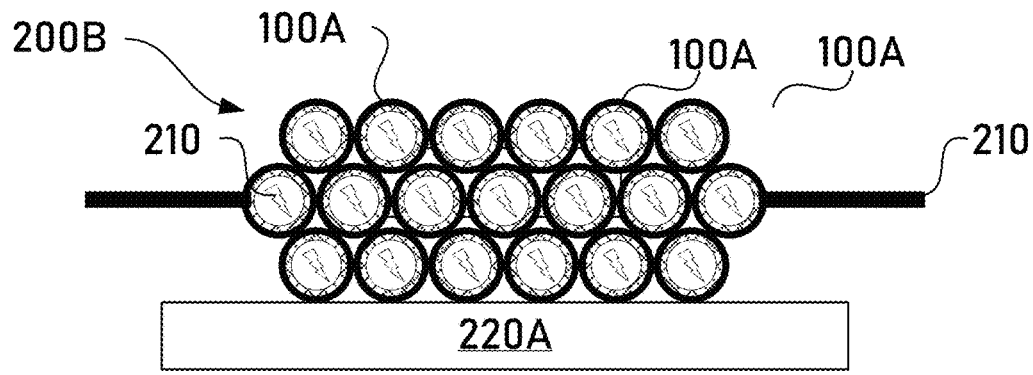
FIGS. 3A-3D illustrate various stages of a second embodiment of an activatable environmental exposure indicator employing the microcapsule of FIG. 1, according to embodiments of the present disclosure.

FIG. 3A illustrates the second embodiment of the activatable environmental exposure indicator 200B in the first stage, prior to the application of the activation action and prior to the predetermined environmental exposure. Prior to the activation action, the shells 110 of the microcapsules 100A are intact, and the liquefiable material 120 and conductive particles 130 are contained. Prior to the application of the activation action, the activatable environmental exposure indicator 200B is in the nonconductive state (e.g., the switch is open). Furthermore, the liquefiable material 120 and the conductive particles 130 are isolated from the environment, so environmental sensing cannot yet occur.

Figure 3B:
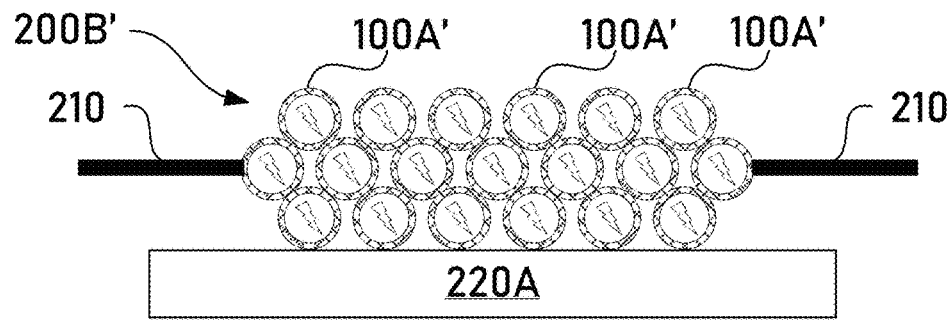

FIG. 3B illustrates the first embodiment of the activatable environmental exposure indicator 200B' in the second stage, after the application of the activation action, and prior to the predetermined environmental exposure, according to embodiments of the present disclosure. As illustrated in FIG. 3B, the microcapsules 100A' have been ruptured responsive to the application of the activation action, and the liquefiable material 120 is now exposed to the environment. The activatable environmental exposure indicator 200B' remains in the nonconductive state, as the conductive particles 130 remain embedded in a solid matrix of the liquefiable material 120 and are thus blocked from contact with one another. In some examples, the liquefiable material 120 may be non-conductive in the solid phase, and electrical connection across the wire/trace 210 and through the activatable environmental exposure indicator 200 is still substantially prevented by the liquefiable material 120. Because the liquefiable material 120 is exposed to the environment, the activatable environmental exposure indicator 200A is activated, and primed to transition to the conductive state responsive to the predetermined environmental exposure. When the activatable environmental exposure indicator 200A' is activated, environmental sensing begins.

Figure 3C:
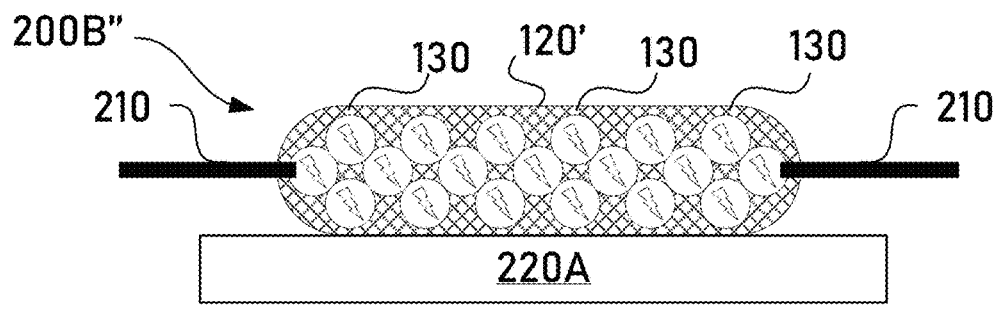

FIG. 3C illustrates the first embodiment of the activatable environmental exposure indicator 200A" in the third stage, after the application of the activation action and immediately after the predetermined environmental exposure, according to embodiments of the present disclosure. After the predetermined environmental exposure, the liquefiable material 120 liquefies to liquefied liquefiable material 120', and releases the conductive particles 130, such that the conductive particles 130 are no longer blocked from migration. Once released, the conductive particles 130 begin to form an electrical connection (e.g., first electrical connection, second electrical connection). In some examples, the conductive particles 130 may be drawn together, by magnetic, mechanical, chemical, and/or electrical forces, to begin to form the electrical connection across the wire/trace 210 and begin to transition the activatable environmental exposure indicator 200A" to the conductive state.

Figure 3D:
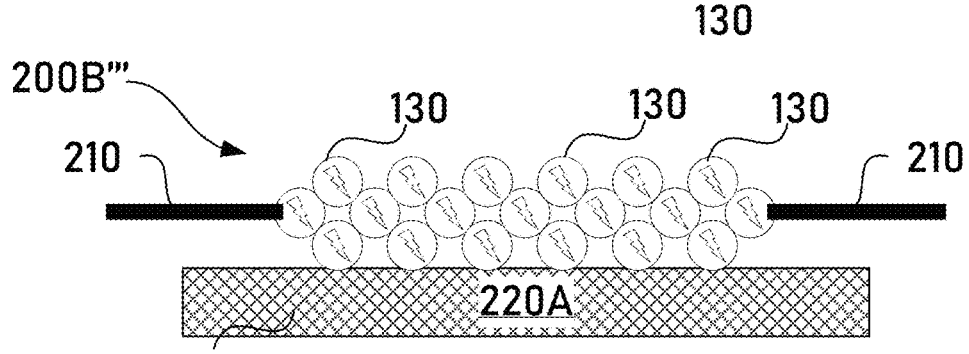

FIG. 3D illustrates the first embodiment of the activatable environmental exposure indicator 200A" in the fourth stage after the application of the activation action and a predetermined period of time after the predetermined environmental exposure, according to embodiments of the present disclosure. The wick 220A draws the liquefied liquefiable material 120' into the wick, leaving the conductive particles 130 on the exterior of the wick 220A, as the wick 220 is impermeable with respect to the conductive particles 130. In some embodiments, the wick 220A may improve the conductive quality of the electrical connection formed by the conductive particles 130. Even after liquefaction, the liquefied liquefiable material 120' may hinder or otherwise obstruct the formation of the electrical connection by the conductive particles 130. The wick 220A draws the liquefied liquefiable material 120' away from the conductive particles 130 into the wick 220A, such that the conductive particles 130 are unhindered in the formation of the electrical connection. By drawing the liquefied liquefiable material 120' into the wick 220A, the transition to the conductive state is made irreversible.

According to some embodiments, the wick 220A may be configured to draw the liquefied liquefiable material 120' into the wick 220A at a predetermined rate, such the second embodiment of the activatable environmental exposure indicator 200B may be employed as a time-sensitive indicator, and the activatable environmental exposure indicator 200B" does not fully transition from the third stage to the fourth stage until a predetermined period of time has passed while the liquefiable material 120 has been liquefied.

Microcapsule: Second Embodiment

Figure 4:
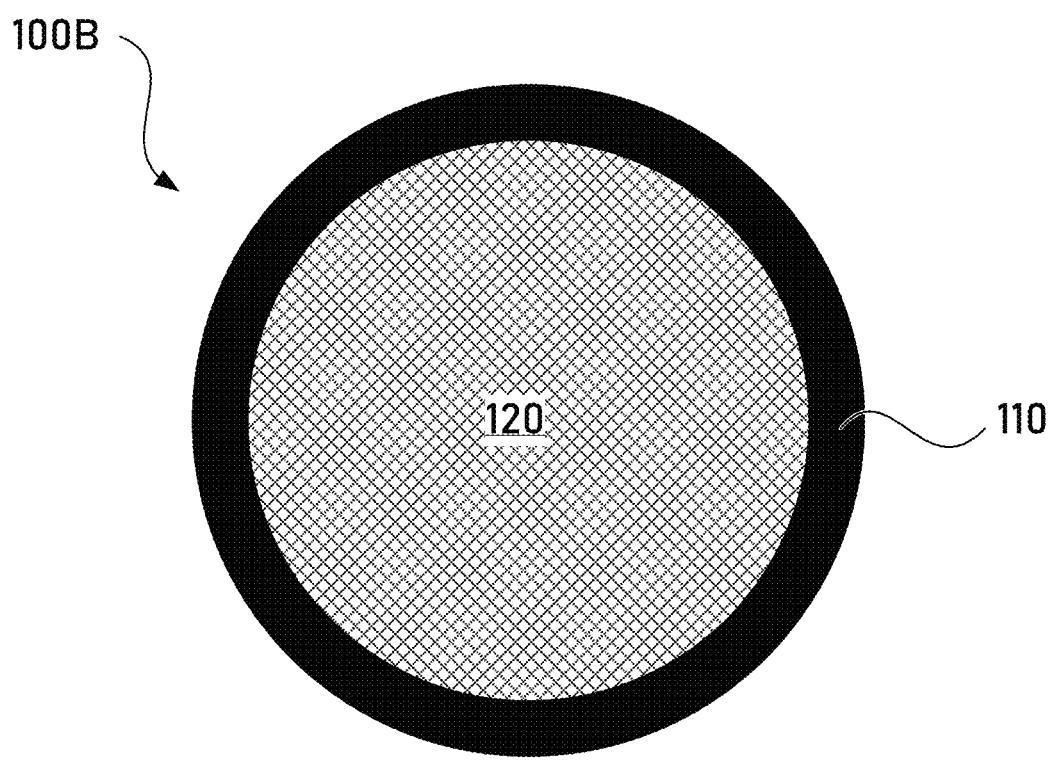
FIG. 4 illustrates a second embodiment of a microcapsule, and a conductive particle, according to embodiments of the present disclosure.

FIG. 4 illustrates a cross-sectional view of a microcapsule 100B, where the microcapsule 100B is a second embodiment of a microcapsule 100, according to embodiments of the present disclosure. As shown in FIG. 4, the microcapsule can be devoid of conductive particles (e.g., conductive particles 130). The microcapsule 100B may be a component employed in various embodiments of the activatable environmental exposure indicator 200, including the fourth embodiment of the activatable environmental exposure indicator 200D, according to embodiments of the present disclosure. According to some embodiments, the microcapsule 100B (e.g. microsphere) contains the liquefiable material 120. The liquifiable material 120 can be electrically nonconductive. The liquefiable material 120 is microencapsulated in a shell 110. The shell 110 of the microcapsule 100B may include any of the features and properties of the frangible shells discussed above in Section I.

FIGS. 5A-6D illustrate several embodiments of activatable environmental exposure indicators 200 which employ the second embodiment of the activatable microcapsule 100, microcapsule 100B, as discussed in reference to FIG. 4.

Activatable Environmental Exposure Indicator: Third Embodiment

Figures 5A, 5B, 5C:
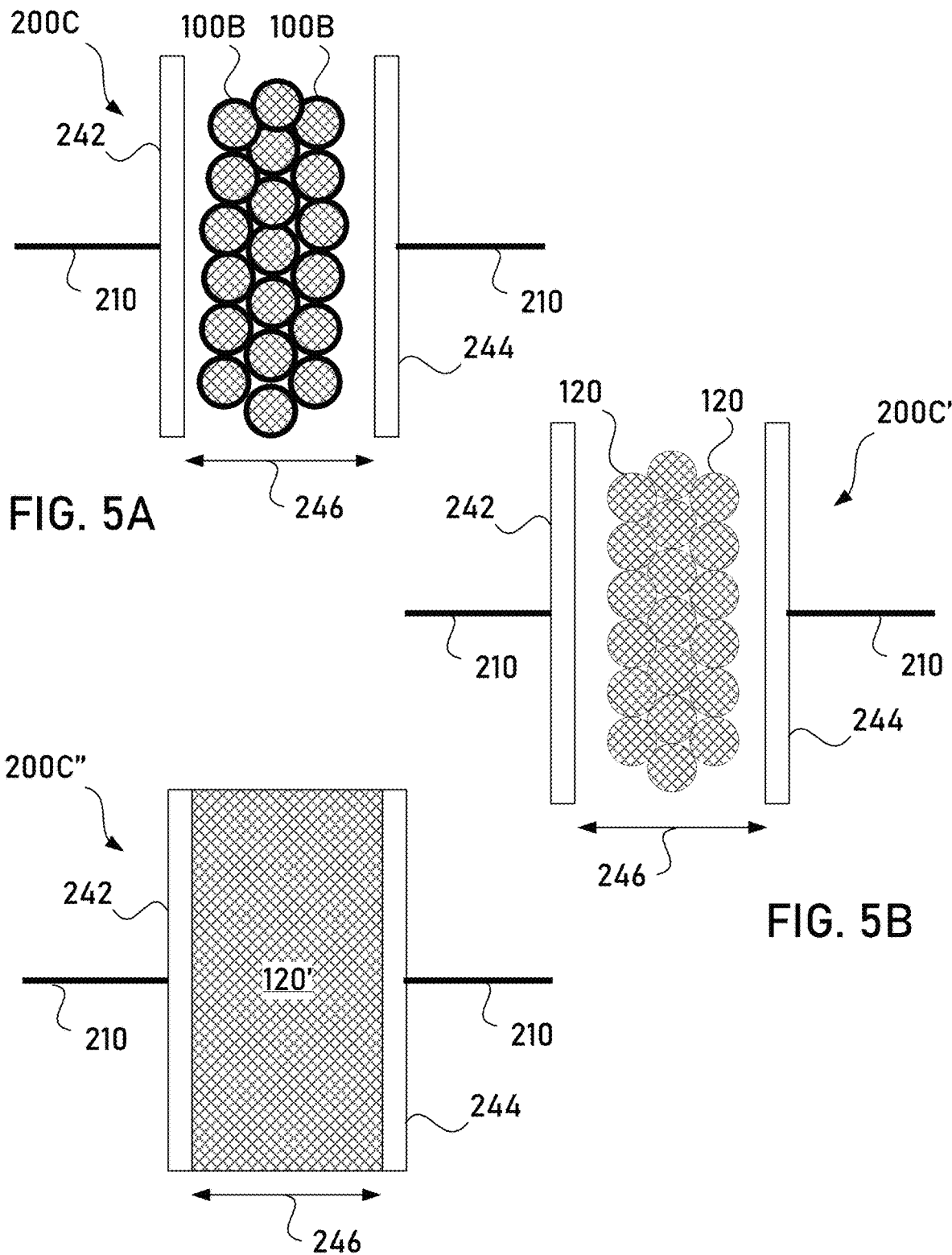
FIGS. 5A-5C illustrate various stages of a third embodiment of an activatable environmental exposure indicator employing the microcapsule of FIG. 4, according to embodiments of the present disclosure.

FIGS. 5A-5C illustrate a third embodiment of the activatable environmental exposure indicator 200C, according to embodiments of the present disclosure. The activatable environmental exposure indicator 200C is configured to transition from an unexposed state in which the activatable environmental exposure indicator 200C has a first capacitance, to an exposed state in which the activatable environmental exposure indicator 200C has a second capacitance, responsive to a predetermined environmental exposure occurring subsequent to the application of an activation action.

The third embodiment of the activatable environmental exposure indicator 200C, among other embodiments of the activatable environmental exposure indicator 200 may include a plurality of microcapsules 100B, each microcapsule 100B including a liquefiable material 120, microencapsulated in a shell 110. In some examples, conductive and/or nonconductive particles can be contained in the microcapsules 100B with the liquefiable material 120. In some examples, the microcapsules 100B can be devoid of conductive and/or nonconductive particles. The activatable environmental exposure indicator 200C includes a first electrical contact 242 (e.g., a first electrode) connected to a first portion of the wire/trace 210, and a second electrical contact 244 (e.g., a second electrode) connected to a second portion of the wire/trace 210, where a gap 246 is formed between the first electrical contact 242 and the second electrical contact 244. The plurality of microcapsules 100B are disposed within the gap 246. The first electrical contact 242 and the second electrical contact 244 form a capacitor, where the plurality of microcapsules 100B form at least a portion of the dielectric of the capacitor. The activatable environmental exposure indicator 200C has a first capacitance in the first state, and a second capacitance in the second state. In some examples, the microcapsules 100B are disposed outside of the gap 246 and after an activation event and exposure to a predetermined environmental condition, the material 120, and if included, the conductive and/or nonconductive particles, migrate into the gap 246, (e.g., via a wick), to change a dielectric value between the first and second electrical contacts 242 and 244 and a capacitance value of the activatable environmental exposure indicator 200C. In some examples, the microcapsules 100B are disposed in the gap 246 and after an activation event and exposure to a predetermined environmental condition, the material 120, and if included the conductive and/or nonconductive particles, migrate out of the gap 246, (e.g., via a wick), to change a dielectric value between the first and second electrical contacts 242 and 244 and a capacitance value of the activatable environmental exposure indicator 200C.

According to some embodiments, the fourth embodiments of the activatable environmental exposure indicator 200C is an environmentally sensitive capacitor. Examples of environmentally sensitive capacitors are disclosed in U.S. Pat. No. 11,913,845 entitled "TUNABLE CAPACITANCE-BASED TEMPERATURE SENSOR" (Bhatia, et al.) filed Feb. 25, 2021, U.S. patent application Ser. No. 17/867,042 entitled "CAPACITANCE-BASED TEMPERATURE SENSOR WITH DELAY" (Abdo, et al) filed Jul. 18, 2022, and U.S. patent application Ser. No. 18/369,506 entitled "USE OF ENCAPSULATED POLAR PROTIC CHEMISTRIES FOR RFID TEMPERATURE MONITORING" (Huffman et. al) filed Sep. 18, 2023. The environmentally sensitive capacitors employed in the activatable environmental exposure indicator 200C may be any of the environmentally sensitive capacitors disclosed in the above referenced publications.

FIG. 5A illustrates the third embodiment of the activatable environmental exposure indicator 200C in the first stage, prior to the application of the activation action and prior to the predetermined environmental exposure. In the first stage, the activatable environmental exposure indicator 200C is in the first state and has a first capacitance.

According to some embodiments, the first capacitance may be in a range of from about 0 picofarads (pF) to about 0.5 pF, from about 0.5 pF to about 1.0 pF, from about 1.0 pF to about 1.5 pF, from about 1.5 pF to about 2.0 pF, from about 2.0 pF to about 2.5 pF, or from about 2.5 pF to about 3.0 pF. The first capacitance may be in a range of from about 30 pF to about 50 pF, from about 50 pF to about 70 pF, from about 70 pF to about 90 pF, from about 90 pF to about 110 pF, from about 110 pF to about 130 pF, or from about 130 pF to about 150 pF. The first capacitance may be zero. In other examples, the first capacitance may have any other suitable capacitance value.

FIG. 5B illustrates the third embodiment of the activatable environmental exposure indicator 200C' in the second stage after the application of the activation action, and prior to the predetermined environmental exposure, according to embodiments of the present disclosure. In the second stage, the microcapsules 100B have been ruptured responsive to the application of the activation action, and the liquefiable material 120 is now exposed to the environment. The activatable environmental exposure indicator 200C' remains in the first state, having the first capacitance. Because the liquefiable material 120 is exposed to the environment, the activatable environmental exposure indicator 200C' is activated, and primed to transition to the third stage responsive to the predetermined environmental exposure. When the activatable environmental exposure indicator 200C' is activated, environmental sensing begins.

FIG. 5C illustrates the third embodiment of the activatable environmental exposure indicator 200C" in the third stage, after the application of the activation action and after the predetermined environmental exposure, according to embodiments of the present disclosure. the liquefiable material 120 liquefies to liquefied liquefiable material 120', and releases the conductive particles 130, such that the conductive particles 130 are no longer blocked from migration. Once released, the conductive particles 130 and the liquefied liquefiable material 120' change the dielectric between the first electrical contact 242 and the second electrical contact 244, such that the activatable environmental exposure indicator 200C" transitions to the second stage, having a second capacitance.

According to some embodiments, the second capacitance may be greater than the first capacitance. According to some embodiments, the second capacitance may be less than the first capacitance. According to some embodiments, the second capacitance may be in a range of from about 0 pF to about 0.5 pF, from about 0.5 pF to about 1.0 pF, from about 1.0 pF to about 1.5 pF, from about 1.5 pF to about 2.0 pF, from about 2.0 pF to about 2.5 pF, or from about 2.5 pF to about 3.0 pF. The second capacitance may be in a range of from about 30 pF to about 50 pF, from about 50 pF to about 70 pF, from about 70 pF to about 90 pF, from about 90 pF to about 110 pF, from about 110 pF to about 130 pF, or from about 130 pF to about 150 pF. The second capacitance may be zero. In other examples, the second capacitance may have any other suitable capacitance value.

Activatable Environmental Exposure Indicator: Fourth Embodiment

FIGS. 6A-6D illustrate various stages of a fourth embodiment of the activatable environmental exposure indicator 200D, according to embodiments of the present disclosure. The activatable environmental exposure indicator 200D is configured to transition from a conductive state a nonconductive state, responsive to a predetermined environmental exposure occurring subsequent to the application of an activation action.

Figure 6A:
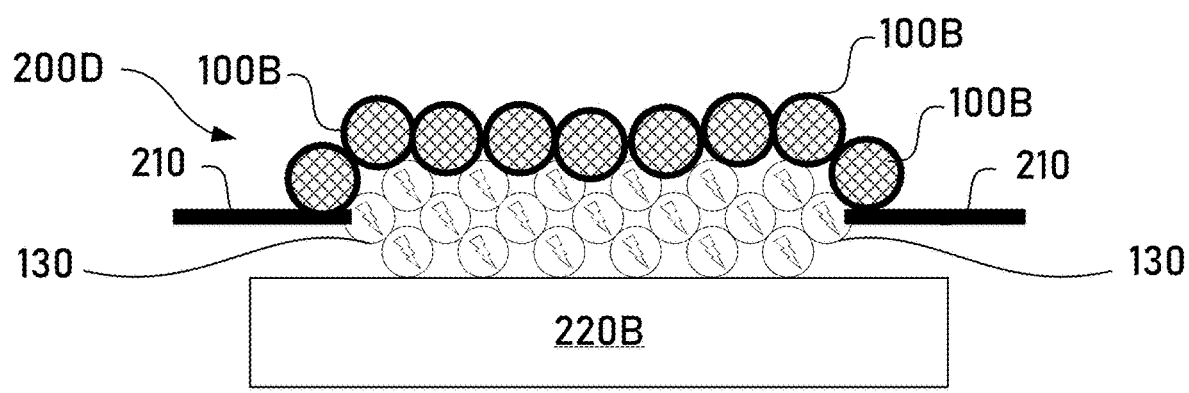
FIGS. 6A-6D illustrate various stages of a fourth embodiment of an activatable environmental exposure indicator employing the microcapsule and conductive particle of FIG. 4.

The fourth embodiment of the activatable environmental exposure indicator 200D among other embodiments of the activatable environmental exposure indicator 200 may include a plurality of microcapsules 100B, each microcapsule 100B including a liquefiable material 120 microencapsulated in a shell 110. The activatable environmental exposure indicator 200D further includes a plurality of conductive particles 130, and a second type of wick 220B. As shown in FIG. 6A, the conductive particles 130 are separate from the microcapsules 100B. The conductive particles 130 may include particles of conductive metals, such as copper, silver, gold, aluminum, zinc, tin, similar metals, and alloys thereof. The conductive particles 130 may also include particles of graphene, graphite, graphene oxides, and other functionalized graphenes, carbon black, and/or particles containing other conductive non-metals. The conductive particles 130 may be formed in whole or in part by any electrically conductive substance or material operable to be particlized. The activatable environmental exposure indicator 200D forms a portion of (e.g., physically couples two sections of) a wire/trace 210. The unexposed state of the activatable environmental exposure indicator 200D is a conductive state (e.g., indicator conductive state), and the exposed state of the activatable environmental exposure indicator 200D is a nonconductive state (e.g., indicator nonconductive state). When the activatable environmental exposure indicator 200A is in the indicator nonconductive state, the activatable environmental exposure indicator 200D does not conduct electricity through the wire/trace 210. According to some embodiments, when in the indicator nonconductive state, the activatable environmental exposure indicator 200D blocks, impedes, resists, or otherwise prevents the conduction of electricity and electrical signals through the wire/trace 210. When the activatable environmental exposure indicator 200D is in the indicator conductive state, the activatable environmental exposure indicator 200D forms an electrical connection across the wire/trace 210, and electricity flows through the activatable environmental exposure indicator 200D and through the wire/trace 210. Said differently, the activatable environmental exposure indicator 200D is an electrical switch that is operable to be opened or closed in response to exposure to a predetermined environmental condition after an activation action. When the activatable environmental exposure indicator 200D is in the indicator conductive state, the switch is closed, and when the activatable environmental exposure indicator 200A is in the indicator nonconductive state, the switch is open.

According to some embodiments, the second type of wick 220B is permeable with respect to both the liquefied liquefiable material 120' and conductive particles 130.

FIG. 6A illustrates the fourth embodiment of the activatable environmental exposure indicator 200D in the first stage, prior to the application of the activation action and prior to the predetermined environmental exposure, according to embodiments of the present disclosure. In the first stage, the activatable environmental exposure indicator 200D is in the unexposed state, and thus in the indicator conductive state. The plurality of conductive particles 130 form an electrical connection through the activatable environmental exposure indicator 200D, such that the electrical switch is closed. The conductive particles 130 are disposed relative to the wire/trace 210 such that the electrical connection therethrough is supported. The plurality of microcapsules 100B are disposed proximately to the plurality of conductive particles 130. The wick 220B is disposed proximately to the plurality of conductive particles 130. According to some embodiments, the plurality of conductive particles 130 is sandwiched between the plurality of microcapsules 100B and the wick 220B. In the first stage, the shells 110 of the microcapsules 100B are intact, and the liquefiable material 120 is isolated from the environment, so environmental sensing cannot yet occur.

Figure 6B:
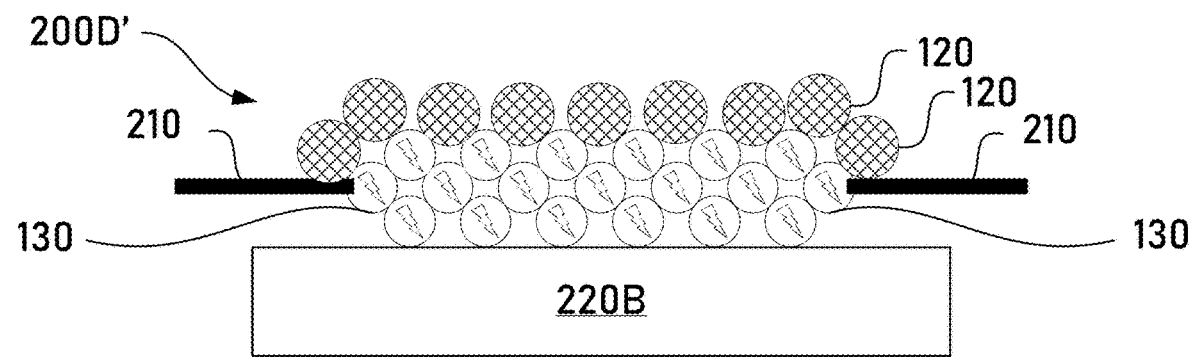

FIG. 6B illustrates the fourth embodiment of the activatable environmental exposure indicator 200B' in the second stage, after the application of the activation action, and prior to the predetermined environmental exposure, according to embodiments of the present disclosure. In the second stage, the microcapsules 100B have been ruptured responsive to the application of the activation action, and the liquefiable material 120 is now exposed to the environment. In the second stage, the activatable environmental exposure indicator 200D' remains in the indicator conductive state, as the conductive particles 130 remain in contact with one another, supporting the electrical connection across the activatable environmental exposure indicator 200D. Because the liquefiable material 120 is exposed to the environment, the activatable environmental exposure indicator 200D' is activated, and primed to transition to the indicator nonconductive state responsive to the predetermined environmental exposure. When the activatable environmental exposure indicator 200D' is activated, environmental sensing begins.

Figure 6C:
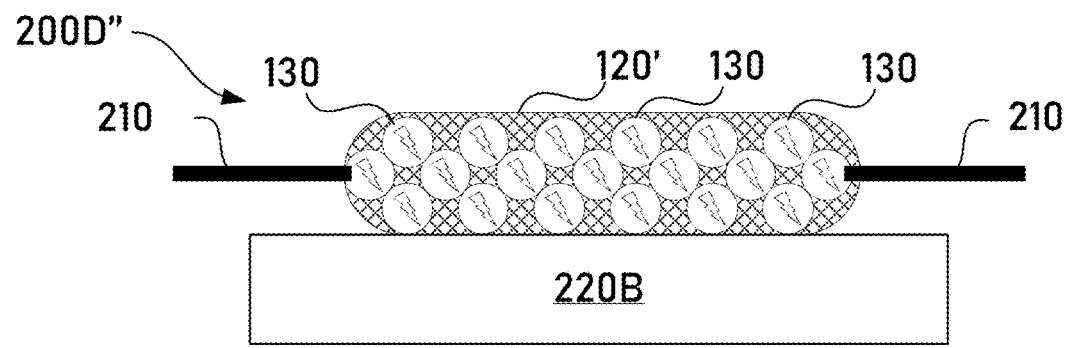

FIG. 6C illustrates the fourth embodiment of the activatable environmental exposure indicator 200D" in the third stage, after the application of the activation action and immediately after the predetermined environmental exposure, according to embodiments of the present disclosure. The liquefiable material 120 liquefies to liquefied liquefiable material 120' and is drawn into the wick 220B and through the plurality conductive particles 130. As the liquefied liquefiable material 120' is drawn into the wick 220B, and the liquefied liquefiable material 120' begins to disrupt electrical conduction formed through the plurality of conductive particles 130. In some examples, the viscosity of the liquefied liquefiable material 120' is sufficient to move the conductive particles 130 and contract the conductive particles 130 into the flow of liquefied liquefiable material 120'. The third stage is when the activatable environmental exposure indicator 200D" begins to transition from the unexposed state to the exposed state. The liquefied liquefiable material 120' may begin to disrupt the electrical connection formed by the conductive particles 130 in the third stage but does not yet disengage the electrical connection entirely or does not displace the conductive particles from their position relative to the wire/trace.

Figure 6D:
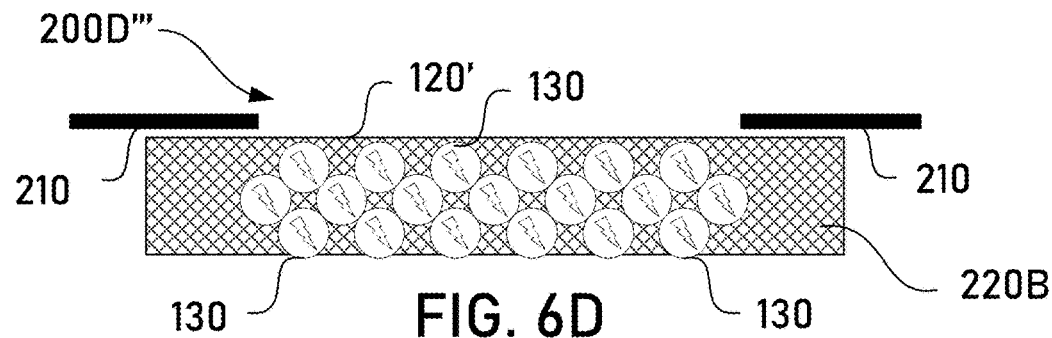

FIG. 6D illustrates the fourth embodiment of the activatable environmental exposure indicator 200D''' in the fourth stage, according to embodiments of the present disclosure. In the fourth stage, the activatable environmental exposure indicator 200D''' fully transitions to the exposed state, where the activatable environmental exposure indicator 200D" is in the indicator nonconductive state. The wick 220B, which is permeable with respect to both the liquefied liquefiable material 120' and the conductive particles 130, draws the liquefied liquefiable material 120' into the wick 220B, and also draws the conductive particles 130 into the wick 220B, as the conductive particles 130 are contracted into the flow of liquefied liquefiable material 120'. When the conductive particles 130 are drawn into the wick 220B by the liquefied liquefiable material 120', the electrical connection through the activatable environmental exposure indicator 200D is disengaged, and the activatable environmental exposure indicator 200D''' is in the indicator nonconductive state.

According to some embodiments, the wick 220B may be configured to draw the liquefied liquefiable material 120' into the wick 220B at a predetermined rate, such the fourth embodiment of the activatable environmental exposure indicator 200D may be employed as a time-sensitive indicator, and the activatable environmental exposure indicator 200D" does not fully transition from the third stage to the fourth stage until a predetermined period of time has passed while the liquefiable material 120 has been liquefied.

Microcapsule: Third Embodiment

Figure 7:
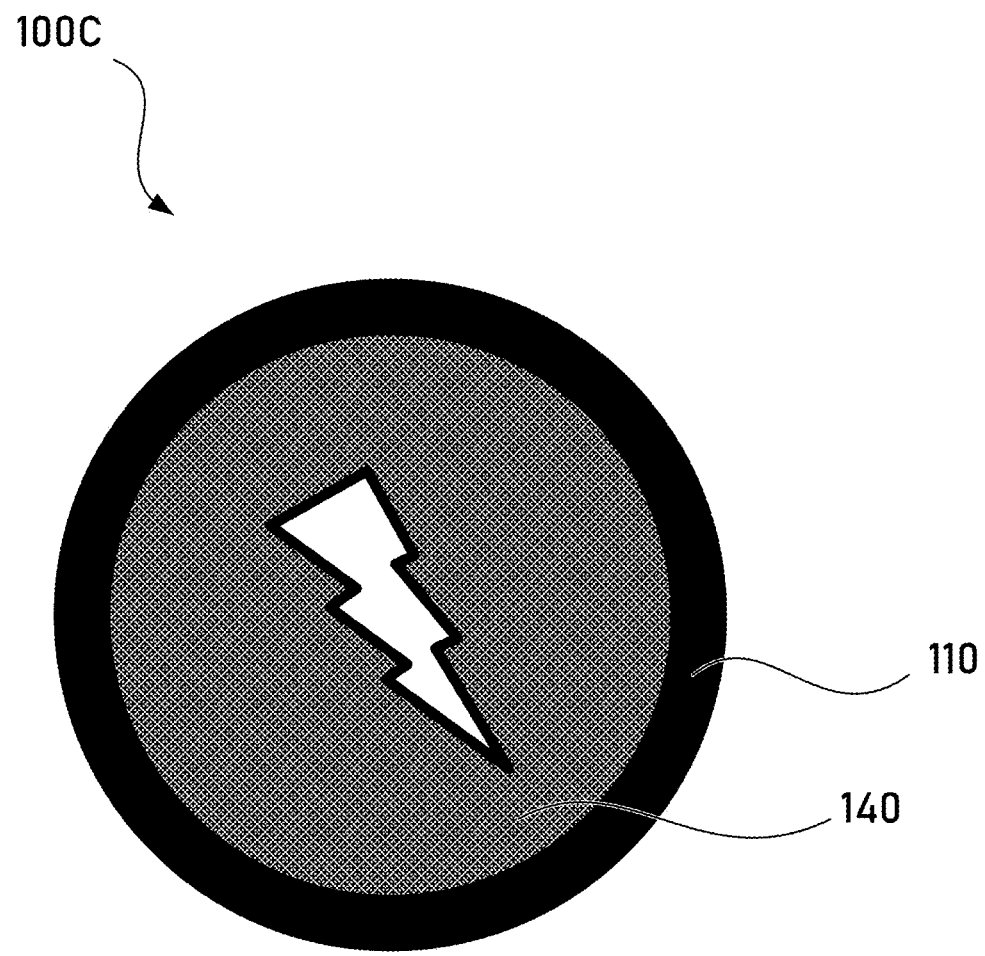
FIG. 7 illustrates a third embodiment of a microcapsule, according to embodiments of the present disclosure.

FIG. 7 illustrates a cross-sectional view of a microcapsule 100C, where the microcapsule 100C is a third embodiment of an microcapsule 100, according to embodiments of the present disclosure. The microcapsule 100C may be a component employed in various embodiments of the activatable environmental exposure indicator 200, including the fifth embodiment of the activatable environmental exposure indicator 200E, according to embodiments of the present disclosure. The microcapsule 100C contains a conductive adhesive 140 microencapsulated in a shell 110. The shell 110 of the microcapsule 100B may include any of the features and properties of the frangible shells discussed above in Section I.

The microcapsule 100C includes a conductive adhesive 140, according to embodiments of the present disclosure. The conductive adhesive 140 may be any such material capable of liquefying from a substantially solid phase (e.g., solid, semi-solid, highly viscous, and/or gelled state) to a liquid phase (e.g., fluid, relatively less viscous state) upon the occurrence of a predetermined environmental exposure. and having conductive properties in both the liquid phase and the solid phase. In some examples, the conductive adhesive 140 includes a liquefiable material 120 blended with conductive materials to form a liquefiable conductive substance. In some examples, the conductive adhesive 140 may include any of the features and properties of the liquefiable materials described above in Section I. Furthermore, the conductive adhesive 140, when transitioned from the liquid phase to the solid phase, may exhibit adhesive properties. In some examples, liquefied conductive adhesive 140' may cure, e.g., permanently transitioning to a solid phase.

The conductive adhesive 140 is configured to liquefy responsive to a predetermined environmental exposure. The shell 110 of the microcapsule 100C may be utilized in order to prevent wicking, or migration, of the conductive adhesive 140 prior to subjection to an activation action even when the conductive adhesive 140 encapsulated in the microcapsules is exposed to the predetermined environmental exposure. Alternatively, the shell 110 may insulate the conductive adhesive 140 from the predetermined environmental exposure.

According to some embodiments, the predetermined environmental exposure may be one of a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time, combinations thereof, and the like.

In one embodiment, the conductive adhesive 140 is a meltable solid configured to melt in response to a temperature above a predetermined threshold, forming a liquid. In another embodiment, the conductive adhesive 140 is a gel configured to, in response to a predetermined environmental exposure above a predetermined threshold, change viscosity such that the gel is substantially liquefied and is capable of fluid flow.

FIGS. 8A-8D illustrate several embodiments of activatable environmental exposure indicators 200 which employ the third embodiment of the microcapsule 100, microcapsule 100C, as discussed in reference to FIG. 7.

Activatable Environmental Exposure Indicator: Fifth Embodiment

FIGS. 8A-8D illustrate various stages of a fifth embodiment of an activatable environmental exposure indicator 200E, according to embodiments of the present disclosure. The activatable environmental exposure indicator 200E is configured to transition from a nonconductive state a conductive state, responsive to a predetermined environmental exposure occurring subsequent to the application of an activation action.

The fifth embodiment of the activatable environmental exposure indicator 200E, among other embodiments of the activatable environmental exposure indicator 200, may include a plurality of microcapsules 100C, each microcapsule 100C including a conductive adhesive 140 microencapsulated in a shell 110. The activatable environmental exposure indicator 200E further includes a third type of wick 220C. The activatable environmental exposure indicator 200E forms a portion of (e.g., physically couples two sections of) a wire/trace 210. The unexposed state of the activatable environmental exposure indicator 200E is a nonconductive state (e.g., indicator nonconductive state), and the exposed state of the activatable environmental exposure indicator 200E is a conductive state, (e.g., indicator conductive state). When the activatable environmental exposure indicator 200E is in the indicator nonconductive state, the activatable environmental exposure indicator 200E does not conduct electricity through the wire/trace 210. According to some embodiments, when in the indicator nonconductive state, the activatable environmental exposure indicator 200E blocks, impedes, resists, or otherwise prevents the conduction of electricity and electrical signals through the wire/trace 210. When the activatable environmental exposure indicator 200E is in the indicator conductive state, the activatable environmental exposure indicator 200E forms an electrical connection across the wire/trace 210, and electricity flows through the activatable environmental exposure indicator 200E and through the wire/trace 210. Said differently, the activatable environmental exposure indicator 200E is an electrical switch that is operable to be opened or closed in response to exposure to a predetermined environmental condition after an activation action. When the activatable environmental exposure indicator 200E is in the indicator conductive state, the switch is closed, and when the activatable environmental exposure indicator 200E is in the indicator nonconductive state, the switch is open.

According to some embodiments, the third type of wick 220C is permeable with respect to the liquefied conductive adhesive 140'. The wick 220C is disposed adjacent to the wire/trace 210, such that the wick 220C bridges the gap between two sections of the wire/trace 210. The microcapsules 100D are disposed adjacent to the wick 220C, opposite from the wire.

Figure 8A:
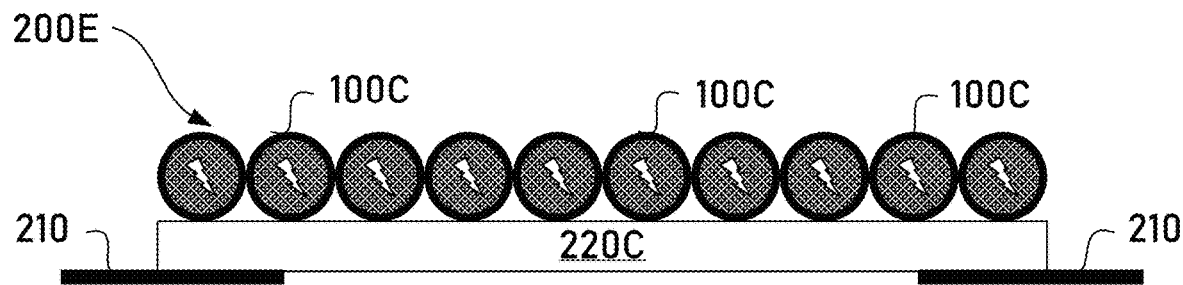
FIGS. 8A-8D illustrate various stages of a fifth embodiment of an activatable environmental exposure indicator, according to embodiments of the present disclosure.

FIG. 8A illustrates the fourth embodiment of the activatable environmental exposure indicator 200E in the first stage, prior to the application of the activation action and prior to the predetermined environmental exposure, according to embodiments of the present disclosure. In the first stage, the shells 110 of the microcapsules 100C are intact, and the conductive adhesive 140 is contained. In the first stage, the activatable environmental exposure indicator 200E is in the indicator nonconductive state (e.g., the switch is open). Furthermore, the conductive adhesive 140 is isolated from the environment, so environmental sensing cannot yet occur.

Figure 8B:
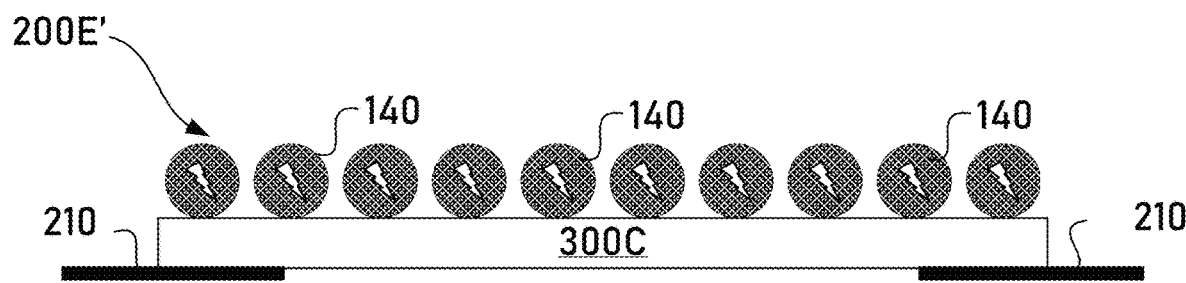

FIG. 8B illustrates the fifth embodiment of the activatable environmental exposure indicator 200E' in the second phase, after the application of the activation action and prior to the predetermined environmental exposure, according to embodiments of the present disclosure. In the second state, the microcapsules 100C have been ruptured responsive to the application of the activation action, and the conductive adhesive 140 is now exposed to the environment. The activatable environmental exposure indicator 200E' remains in the indicator nonconductive state, as the conductive adhesive does not contact the wire/trace 210 in the second state. Because the conductive adhesive 140 is exposed to the environment, the activatable environmental exposure indicator 200E' is activated, and primed to transition to the conductive state responsive to the predetermined environmental exposure. When the activatable environmental exposure indicator 200E' is activated, environmental sensing begins.

Figure 8C:
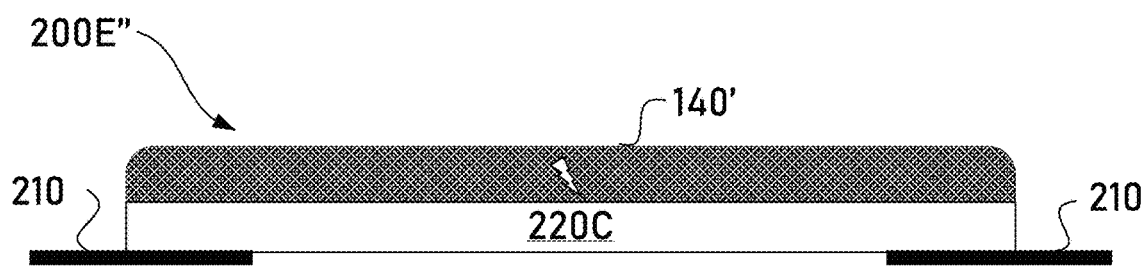

FIG. 8C illustrates the fifth embodiment of the activatable environmental exposure indicator 200E" in the third stage, after the application of the activation action and immediately after the predetermined environmental exposure, according to embodiments of the present disclosure After the predetermined environmental exposure, the conductive adhesive 140 liquefies into liquefied conductive adhesive 140'. The liquefied conductive adhesive 140' is drawn into the wick 220C, where the liquefied conductive adhesive begins to permeate the wick 220C. The conductive adhesive 140 may begin to form an electrical connection through the wick 220C and begin to transition the activatable environmental exposure indicator 200E" to the exposed state.

Figure 8D:
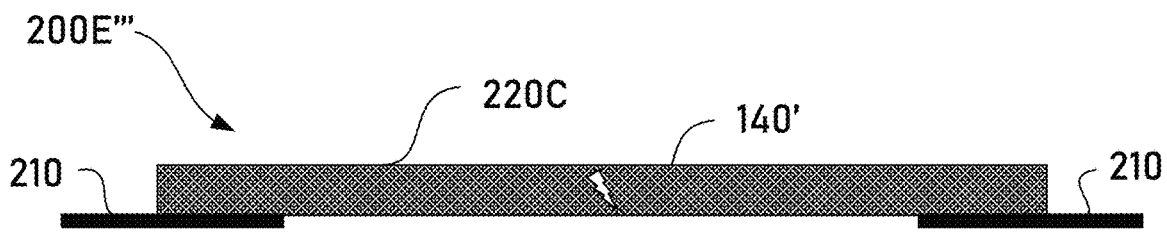

FIG. 8D illustrates the fifth embodiment of the activatable environmental exposure indicator 200E''' in the fourth stage, after the application of the activation action, and at least a predetermined period of time after the exposure to the predetermined environmental exposure, according to embodiments of the present disclosure. In the fourth stage, when the wick 220C is saturated with liquefied conductive adhesive 140', the wick 220C becomes conductive, such that the wick 220C conducts electricity across the wire/trace 210 via the conductive adhesive 140 contained in the wick 220C. When the wick 220C becomes conductive, the activatable environmental exposure indicator 200E''' completes the transition to the exposed state, and the indicator transitions to the indicator conductive state.

According to some embodiments, the wick 220C may be configured to draw the liquefied conductive adhesive 140' into the wick 220C at a predetermined rate, such the fifth embodiment of the activatable environmental exposure indicator 200E may be employed as a time-sensitive indicator, and the activatable environmental exposure indicator 200B''' does not fully transition from the third stage to the fourth stage until a predetermined period of time has passed while the conductive adhesive 140 has been liquefied.

In some embodiments, after a predetermined period of time, or after the cessation of the predetermined environmental exposure, the conductive adhesive 140' may cure, such that the wick 220C is secured to the wire/trace 210 by the conductive adhesive 140, and the transition to the indicator conductive state is made substantially permanent.

Section III: Embodiments of Activation Indicator Components

Section III discusses various embodiments of activation indicator components 300, which may employ one or more embodiments of microcapsules 100 in one or more mechanisms to indicate an application of an application action to the activation indicator component 300.

Each embodiment of the activation indicator component 300 has a respective unactivated state corresponding to when the activation action has not been applied to the activation indicator component 300, a respective activated state corresponding to when the activation action has been applied to the activation indicator component 300.

According to some embodiments, each activation indicator component 300 has a respective unactivated state and a respective activated state, such that the transition from the unactivated state to the activated state indicates that the activation action has been applied to the activation indicator component 300.

According to some embodiments, the unactivated state may be a component conductive state, in which the activation indicator component 300 facilitates an electrical connection, or a flow of electrical current, through the activation indicator component 300.

According to some embodiments, the unactivated state may be a component nonconductive state, in which the indicator blocks, resists, impedes, or otherwise prevents the flow of electrical current through the activation indicator component 300.

According to some embodiments, the unactivated state may be a state in which the activation indicator component 300 has a first distinct electrical property, such as a first measured capacitance, a first measured resistance, a first measured impedance, a first measured inductance, a first measured conductivity, or a similar property.

According to some embodiments, the activated state may be an component conductive state, in which the activation indicator component 300 facilitates an electrical connection, or a flow of electrical current, through the activation indicator component 300.

According to some embodiments, the activated state may be a component nonconductive state, in which the indicator blocks, resists, impedes, or otherwise prevents the flow of electrical current through the activation indicator component 300.

According to some embodiments, the activated state may be a state in which the activation indicator component 300 has a second distinct electrical property, such as a second measured capacitance, a second measured resistance, a second measured impedance, a second measured inductance, a second measured conductivity, or a similar property.

Microcapsule: Fourth Embodiment

Figure 9:
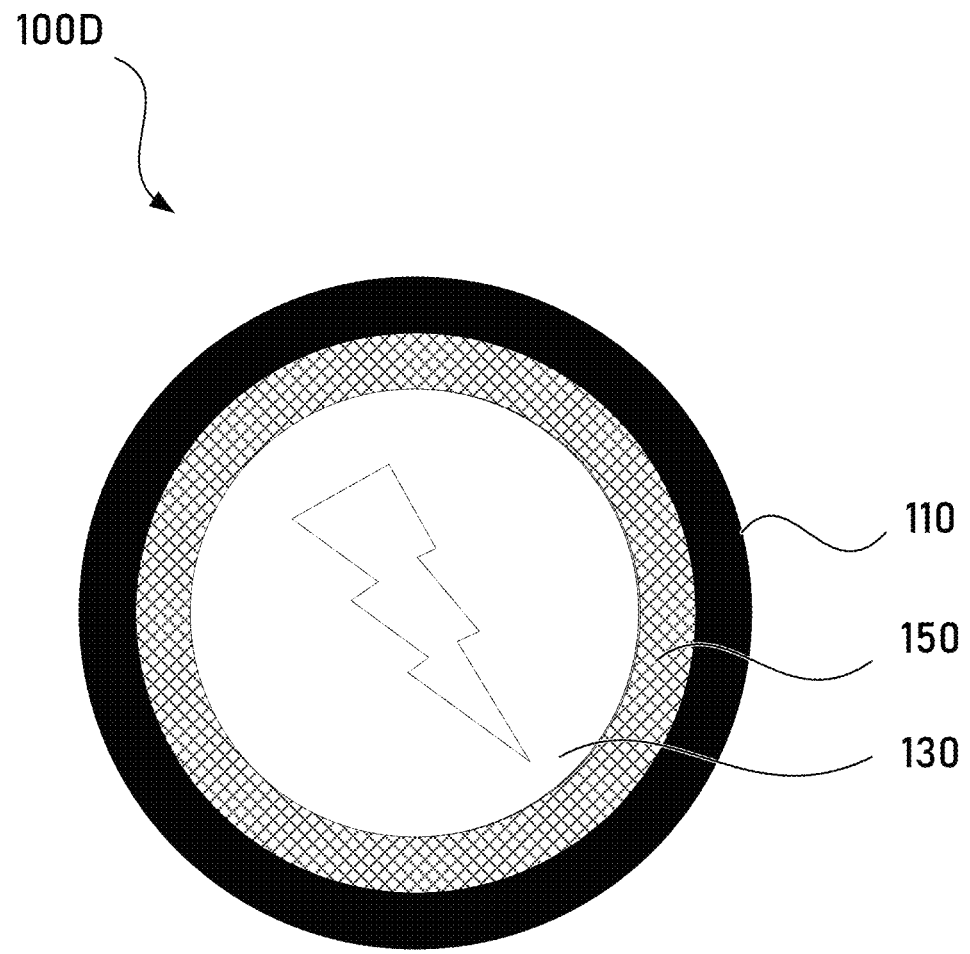
FIG. 9 illustrates a fourth embodiment of a microcapsule, according to embodiments of the present disclosure.

FIG. 9 illustrates a cross-sectional view of a microcapsule 100D, where the microcapsule 100D is a fourth embodiment of a microcapsule 100, according to embodiments of the present disclosure. The microcapsule 100D may be a component employed in various embodiments of the activation indicator component 300, including the first embodiment of the activation indicator component 300A, the second embodiment of the activation indicator component 300B, and the third embodiment of the activation indicator component 300C, according to embodiments of the present disclosure. According to some embodiments the microcapsule 100D (e.g. microsphere) includes a conductive particle 130 suspended in a fluid 150. The conductive particle 130 and fluid 150 are collectively microencapsulated in a shell 110. The shell 110 of the microcapsule 100D may include any of the features and properties of the frangible shells discussed above in Section I.

The microcapsule 100D includes a fluid 150, according to embodiments of the present disclosure. The fluid 150 may be any such fluid of sufficiently low viscosity as to facilitate the movement of the conductive particles 130 therethrough.

In some examples, the fluid 150 may be a liquefiable material, such as the liquefiable materials discussed in Section I, where the liquefiable material is configured to be in a liquid phase throughout the expected range of temperatures of operation of the activation indicator component 300.

According to some embodiments, the fluid 150 is electrically nonconductive, insulative, resistive, or otherwise resists or substantially prevents the conduction of electricity through the fluid 150. In some examples, the fluid 150 is electrically conductive, and facilitates the conduction of electricity through the fluid 150. The shell 110 of the microcapsule 100D may be utilized in order to prevent wicking, or migration, of the fluid 150 prior to the application of the activation action.

According to some embodiments, the microcapsule 100D includes a conductive particle 130.

FIGS. 10A-12B illustrate several embodiments of activation indicator components 300 which employ the fourth embodiment of the microcapsule 100, microcapsule 100D, as discussed in reference to FIG. 9.

Activation Indicator Component: First Embodiment

Figure 10A:
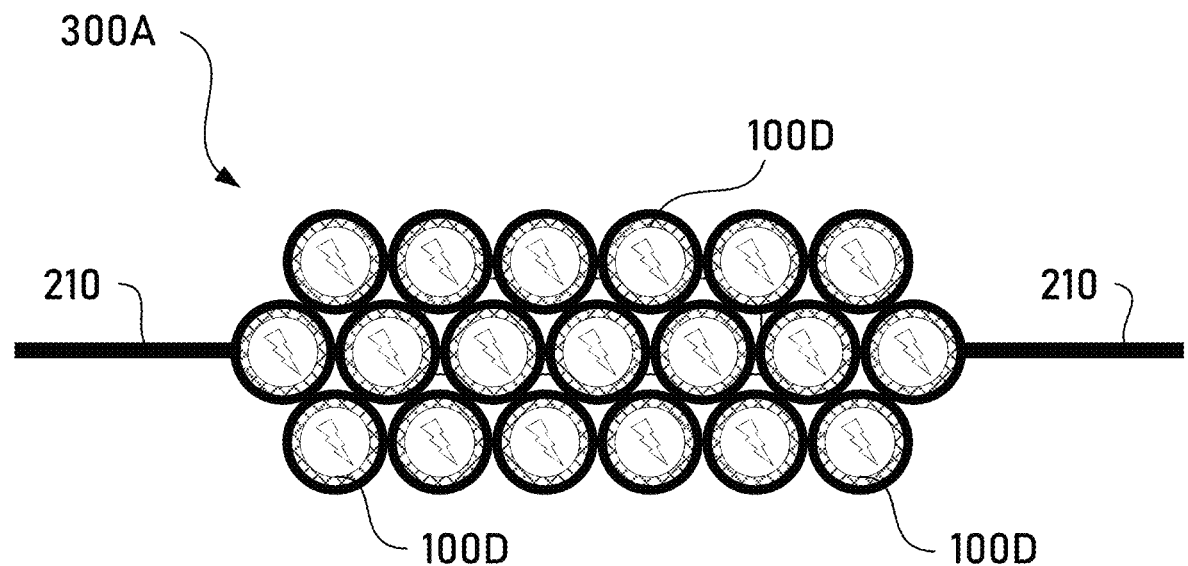
FIGS. 10A-10B illustrate various stages of a first embodiment of an activation indicator component employing the microcapsule of FIG. 9, according to embodiments of the present disclosure.
Figure 10B:
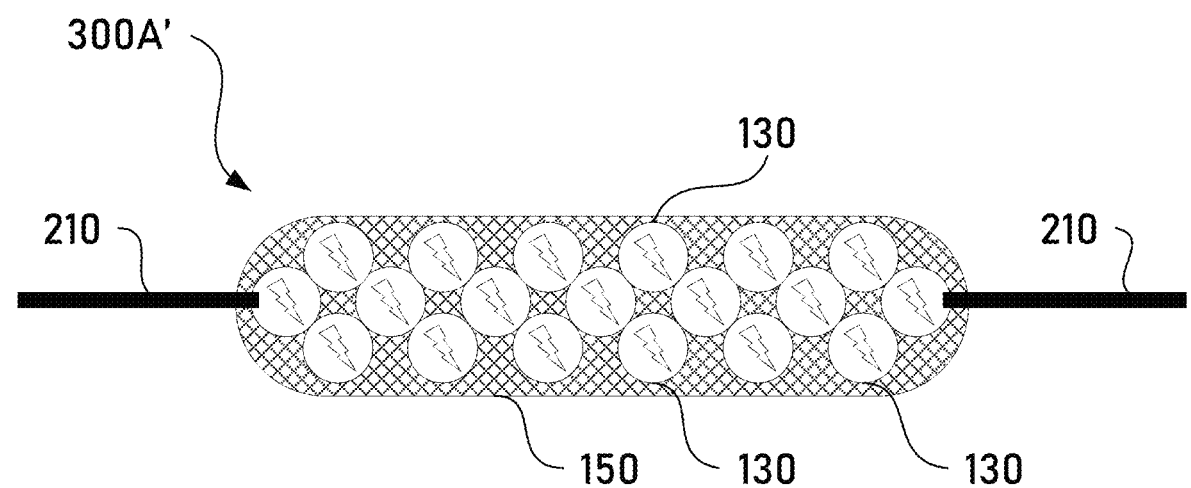

FIGS. 10A-10B illustrate a first embodiment of the activation indicator component 300A, according to embodiments of the present disclosure. The activation indicator component 300A is configured to transition from a nonconductive state to a conductive state, responsive to the application of an activation action.

As illustrated in FIG. 10A, the first embodiment of the activation indicator component 300A, among other embodiments of the activation indicator component 300 may include a plurality of microcapsules 100D, each microcapsule 100D including a conductive particle 130 suspended in a fluid 150, microencapsulated in a shell 110. The activation indicator component 300A forms a portion of (e.g., physically couples two sections of) a wire/trace 210. The unactivated state of the activation indicator component 300A is a nonconductive state (e.g., component nonconductive state), and the activated state of the activation indicator component 300A is a conductive state (e.g., component conductive state). When the activation indicator component 300A is in the component nonconductive state, the activation indicator component 300A does not conduct electricity through the wire/trace 210. According to some embodiments, when in the component nonconductive state, the activation indicator component 300A blocks, impedes, resists or otherwise prevents the conduction of electricity and electrical signals through the wire/trace 210. When the activation indicator component 300A is in the component conductive state, the activation indicator component 300A forms an electrical connection across the wire/trace 210, and electricity flows through the activation indicator component 300A and through the wire/trace 210. Said differently, the activation indicator component 300A is an electrical switch that is operable to be opened or closed in response to an activation action. When the activation indicator component 300A is in the component conductive state, the switch is closed, and when the activation indicator component 300A is in the component nonconductive state, the switch is open.

FIG. 10A illustrates the first embodiment of the activation indicator component 300A in the unactivated state, prior to the application of the activation action. In the first stage, the shells 110 of the microcapsules 100A are intact, and the fluid 150 and conductive particles 130 are contained. In the unactivated state, the activation indicator component 300A is in the nonconductive state (e.g., the switch is open).

FIG. 10B illustrates the first embodiment of the activation indicator component 300A' in the activated state, after the application of the activation action, according to embodiments of the present disclosure. In the activated state, the shells 110 of the microcapsules 100D have been ruptured responsive to the application of the activation action. The fluid 150 and the conductive particles 130 are released from the microcapsules 100D, such that the conductive particles 130 are no longer blocked from migration. Once released, the conductive particles 130 form an electrical connection (e.g., first electrical connection, second electrical connection). In some examples, the conductive particles 130 may be drawn together, by magnetic, mechanical, chemical, and/or electrical forces, to form the electrical connection across the wire/trace 210, transitioning the activation indicator component 300A' to the conductive state. In this manner, the activation indicator component 300A' may be employed to indicate the application of the activation action.

Activation Indicator Component: Second Embodiment

Figure 11A:
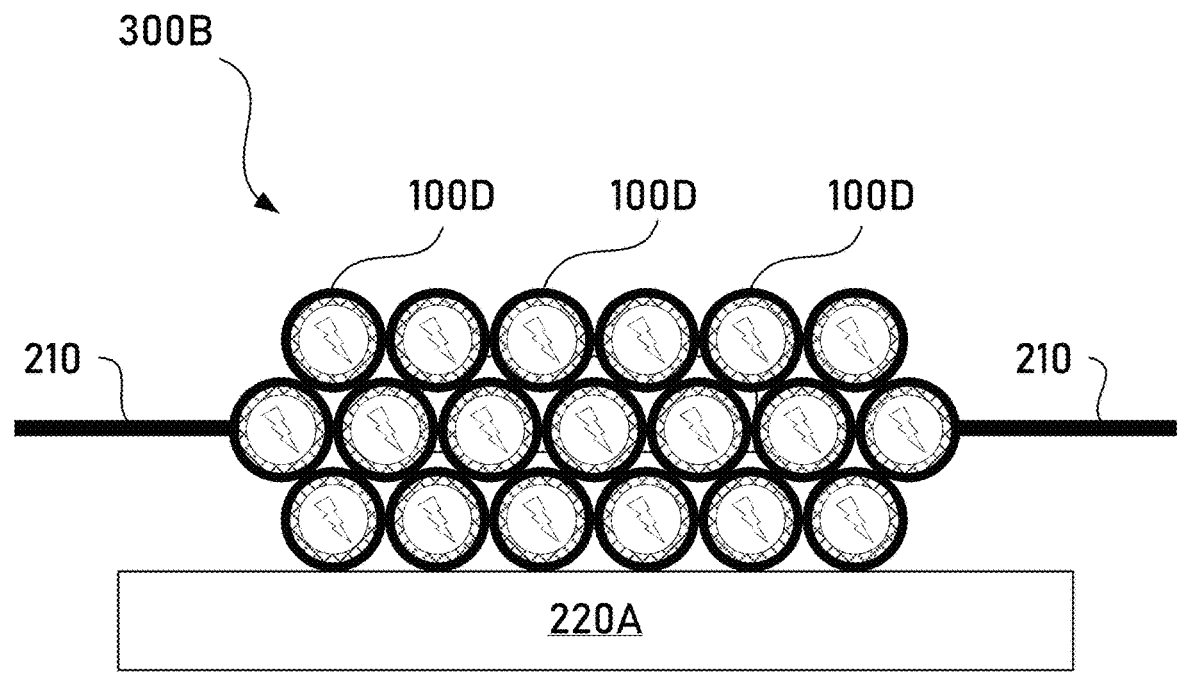
FIGS. 11A-11B illustrate various stages of a second embodiment of an activation indicator component employing the microcapsule of FIG. 9, according to embodiments of the present disclosure.
Figure 11B:
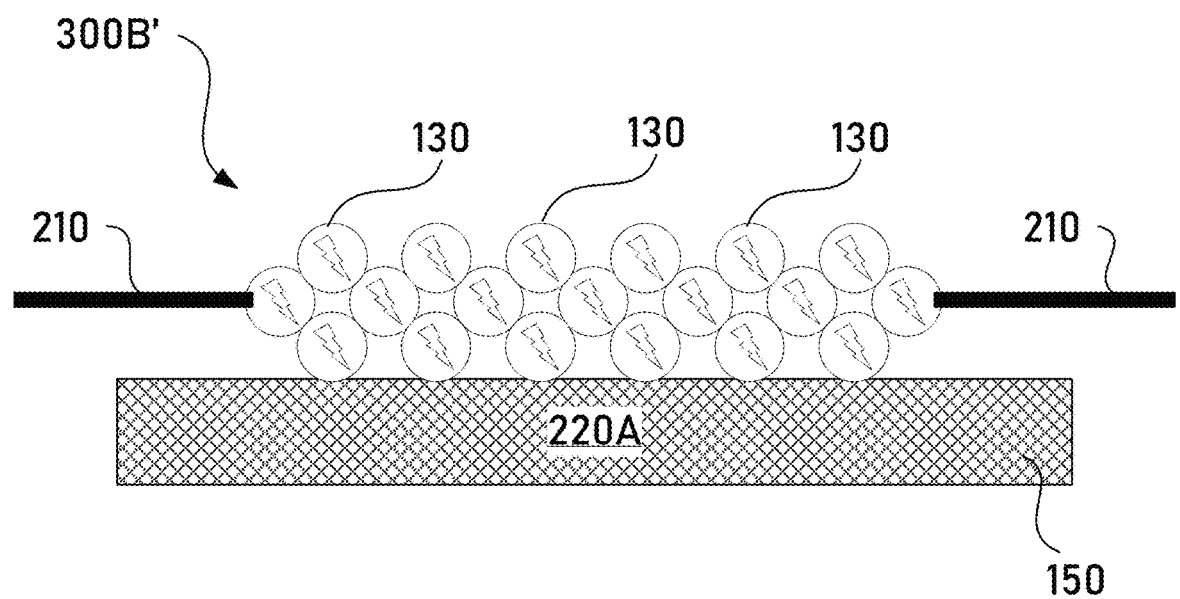

FIGS. 11A-11B illustrate a second embodiment of the activation indicator component 300B, according to embodiments of the present disclosure. The activation indicator component 300B is configured to transition from a nonconductive state to a conductive state, responsive to the application of an activation action.

As illustrated in FIGS. 11A-11B, the second embodiment of the activation indicator component 300B, among other embodiments of the activatable environmental exposure indicator 200 may include a plurality of microcapsules 100D, each microcapsule 100D including a conductive particle 130 contained suspended in the fluid 150, microencapsulated in a shell 110. The activation indicator component 300B further includes a first type of wick 220A. The activation indicator component 300B forms a portion of (e.g., physically couples two sections of) a wire/trace 210. The unactivated state of the activatable environmental exposure indicator 200D is a nonconductive state (e.g., indicator nonconductive state) and the activated state of the activation indicator component 300B is a conductive state (e.g., indicator conductive state). When the activation indicator component 300B is in the nonconductive state, the activation indicator component 300B does not conduct electricity through the wire/trace 210. According to some embodiments, when in the nonconductive state, the activation indicator component 300B blocks, impedes, resists, or otherwise prevents the conduction of electricity and electrical signals through the wire/trace 210. When the activation indicator component 300B is in the conductive state, the activatable environmental exposure indicator 200B forms an electrical connection across the wire/trace 210, and electricity flows through the activation indicator component 300B and through the wire/trace 210. Said differently, the activation indicator component 300B is an electrical switch that is operable to be opened or closed in response to an activation action. When the activation indicator component 300B is in the conductive state, the switch is closed, and when the activation indicator component 300B is in the nonconductive state, the switch is open. The wick 220A may disposed proximately, (e.g., adjacent) to both the wire/trace 210 and the microcapsules 100D. According to some embodiments, the wick 220A is permeable with respect to the fluid 150, but not permeable with respect to the conductive particles 130.

FIG. 11A illustrates the second embodiment of the activation indicator component 300B in the unactivated state, prior to the application of the activation action, according to embodiments of the present disclosure. In the unactivated state, the shells 110 of the microcapsules 100D are intact, and the fluid 150 and conductive particles 130 are contained. Prior to the application of the activation action, the activation indicator component 300B is in the nonconductive state (e.g., the switch is open).

FIG. 11B illustrates the first embodiment of the activation indicator component 300B' in the activated state, after the application of the activation action, according to embodiments of the present disclosure. As illustrated in FIG. 11B, the shells 110 of the microcapsules 100D have been ruptured responsive to the application of the activation action, and the fluid 150 and the conductive particles have been released from the shells 110, such that the conductive particles 130 are no longer blocked from migration. Once released, the conductive particles begin to form an electrical connection (e.g., first electrical connection, second electrical connection). In some examples, the conductive particles 130 may be drawn together, by magnetic, mechanical, chemical, and/or electrical forces, to begin to form the electrical connection across the wire/trace 210. The wick 220A draws the fluid 150 into the wick, leaving the conductive particles 130 on the exterior of the wick 220A, as the wick 220 is impermeable with respect to the conductive particles 130. In some embodiments, the wick 220A may improve the conductive quality of the electrical connection formed by the conductive particles 130. The fluid 150 may hinder or otherwise obstruct the formation of the electrical connection by the conductive particles 130. The wick 220A draws the fluid 150 away from the conductive particles 130 (e.g., into the wick) such that the conductive particles 130 are unhindered in the formation of the electrical connection. By drawing the fluid 150 into the wick 220A, the transition to the component conductive state is made irreversible.

Microcapsule: Fifth Embodiment

Figure 12:
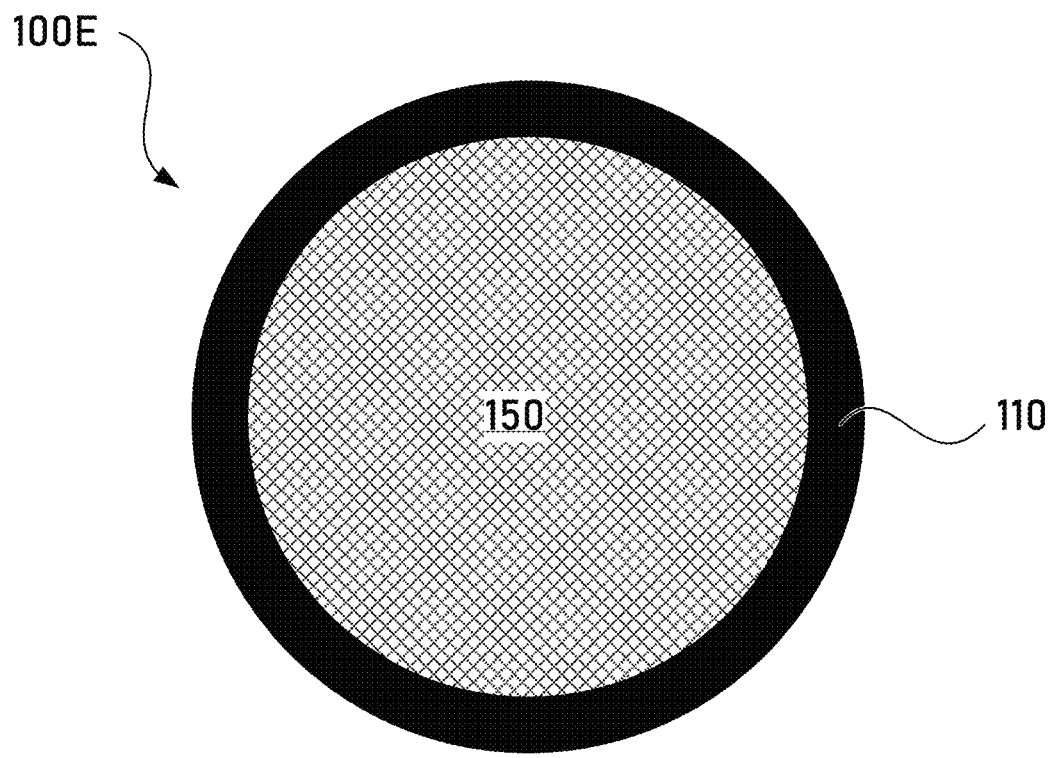
FIG. 12 illustrates a fifth embodiment of a microcapsule, and a conductive particle, according to embodiments of the present disclosure.

FIG. 12 illustrates a cross-sectional view of a microcapsule 100E, where the microcapsule 100E is a fifth embodiment of an activatable microcapsule 100, according to embodiments of the present disclosure. As shown in FIG. 12, the microcapsule can be devoid of conductive particles (e.g., conductive particles 130). The microcapsule 100E may be a component employed in various embodiments of the activation indicator component 300, including the fourth embodiment of the activation indicator component 300D, according to embodiments of the present disclosure. According to some embodiments, the microcapsule 100E (e.g. microsphere) contains the fluid 150. The fluid 150 can be electrically nonconductive. The fluid 150 is microencapsulated in a shell 110. The shell 110 of the microcapsule 100E may include any of the features and properties of the frangible shells discussed above in Section I.

The microcapsule 100D includes the fluid 150, according to embodiments of the present disclosure. The fluid 150 may be any such fluid of sufficiently low viscosity as to facilitate the movement of the conductive particles 130 therethrough.

According to some embodiments, the microcapsule 100E is separate from the conductive particle 130.

Activation Indicator Component: Third Embodiment

Figure 13A:
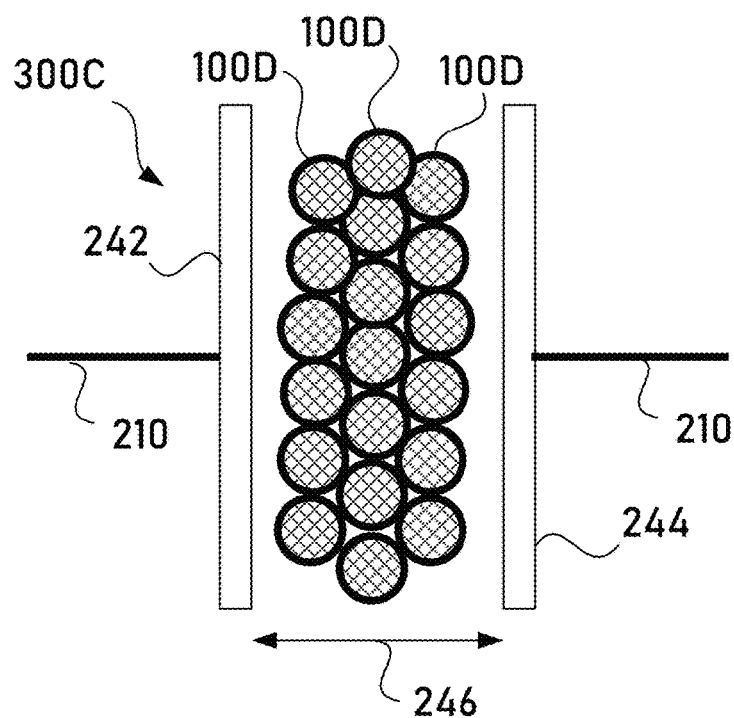
FIGS. 13A-13B illustrate various stages of a third embodiment of an activation indicator component employing the microcapsule of FIG. 12, according to embodiments of the present disclosure.
Figure 13B:
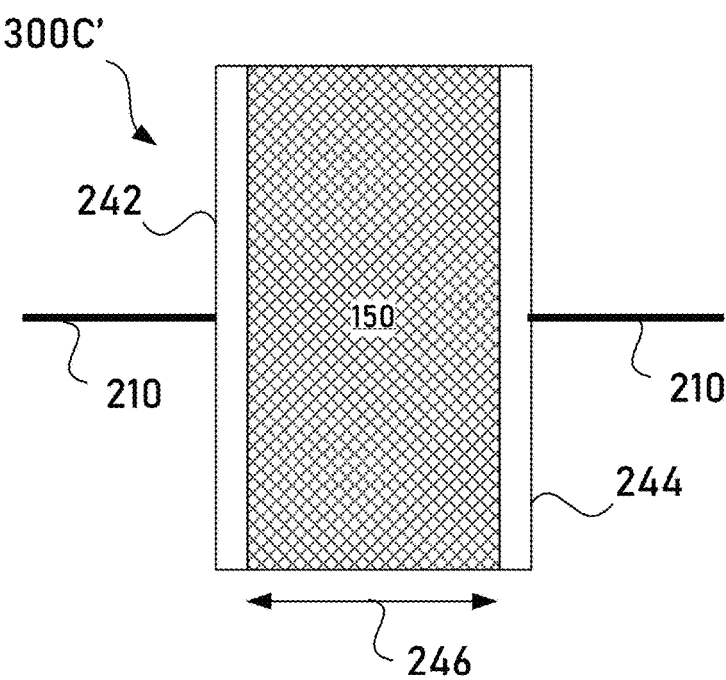

FIGS. 13A-13B illustrate a third embodiment of the activation indicator component 300C, according to embodiments of the present disclosure. The activation indicator component 300C is configured to transition from a state where the activation indicator component 300C has a first capacitance to a state where the activation indicator component 300C has a second capacitance, responsive to the application of an activation action.

The third embodiment of the activation indicator component 300C, among other embodiments of the activation indicator component 300 may include a plurality of microcapsules 100E, each microcapsule 100E including a fluid 150, microencapsulated in a shell 110. In some examples, conductive and/or nonconductive particles can be contained in the microcapsules 100E with the fluid 150. In some examples, the microcapsules 100E can be devoid of conductive and/or nonconductive particles. The activation indicator component 300C includes a first electrical contact 242 (e.g., a first electrode) connected to a first portion of the wire/trace 210, and a second electrical contact 244 (e.g., a second electrode) connected to a second portion of the wire/trace 210, where a gap 246 is formed between the first electrical contact 242 and the second electrical contact 244. The plurality of microcapsules 100E are disposed within the gap 246. The first electrical contact 242 and the second electrical contact 244 form a capacitor, where the plurality of microcapsules 100E form at least a portion of the dielectric of the capacitor. The activation indicator component 300C has a first capacitance in the first state, and a second capacitance in the second state. In some examples, the microcapsules 100E are disposed outside of the gap 246 and after an activation event and exposure to a predetermined environmental condition, the fluid 150 migrates into the gap 246, e.g., via a wick, to change a dielectric value between the first and second electrical contacts 242 and 244 and a capacitance value of the activation indicator component 300C. In some examples, the microcapsules 100E are disposed in the gap 246 and after an activation event and exposure to a predetermined environmental condition, the fluid 150 migrates out of the gap 246, e.g., via a wick, to change a dielectric value between the first and second electrical contacts 242 and 244 and a capacitance value of the activation indicator component 300C.

FIG. 13A illustrates the third embodiment of the activation indicator component 300C in the unactivated state, prior to the application of the activation action and prior to the predetermined environmental exposure. In the first stage, the activation indicator component 300C is in the first state and has a first capacitance.

According to some embodiments, the first capacitance may be in a range of from about 0 picofarads (pF) to about 0.5 pF, from about 0.5 pF to about 1.0 pF, from about 1.0 pF to about 1.5 pF, from about 1.5 pF to about 2.0 pF, from about 2.0 pF to about 2.5 pF, or from about 2.5 pF to about 3.0 pF. The first capacitance may be in a range of from about 30 pF to about 50 pF, from about 50 pF to about 70 pF, from about 70 pF to about 90 pF, from about 90 pF to about 110 pF, from about 110 pF to about 130 pF, or from about 130 pF to about 150 pF. The first capacitance may be zero. In other examples, the first capacitance may have any other suitable capacitance value.

FIG. 13B illustrates the third embodiment of the activation indicator component 300C' in the activated state after the application of the activation action, according to embodiments of the present disclosure. In the activated state, the microcapsules 100E have been ruptured responsive to the application of the activation action, releasing the fluid 150. Once released, the fluid 150 changes the dielectric between the first electrical contact 242 and the second electrical contact 244, such that the activation indicator component 300C' transitions to the second state, having a second capacitance.

According to some embodiments, the second capacitance may be greater than the first capacitance. According to some embodiments, the second capacitance may be less than the first capacitance. According to some embodiments, the second capacitance may be in a range of from about 0 pF to about 0.5 pF, from about 0.5 pF to about 1.0 pF, from about 1.0 pF to about 1.5 pF, from about 1.5 pF to about 2.0 pF, from about 2.0 pF to about 2.5 pF, or from about 2.5 pF to about 3.0 pF. The second capacitance may be in a range of from about 30 pF to about 50 pF, from about 50 pF to about 70 pF, from about 70 pF to about 90 pF, from about 90 pF to about 110 pF, from about 110 pF to about 130 pF, or from about 130 pF to about 150 pF. The second capacitance may be zero. In other examples, the second capacitance may have any other suitable capacitance value.

Activation Indicator Component: Fourth Embodiment

Figure 14A:
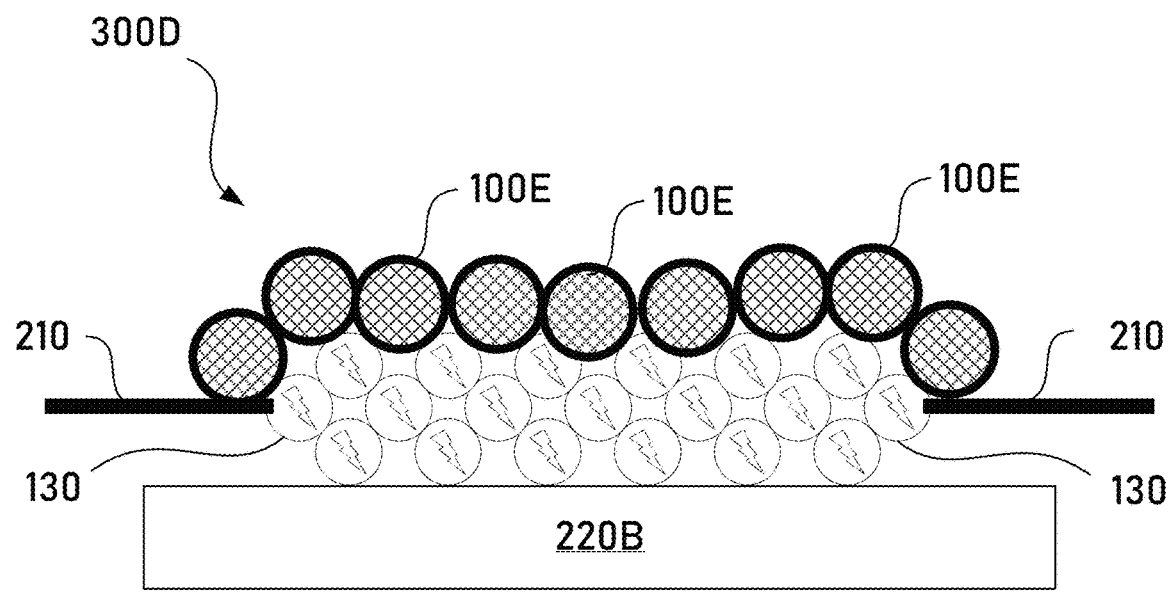
FIGS. 14A-14B illustrate various stages of a fourth embodiment of an activation indicator component employing the microcapsule and conductive particle, of FIG. 12, according to embodiments of the present disclosure.
Figure 14B:
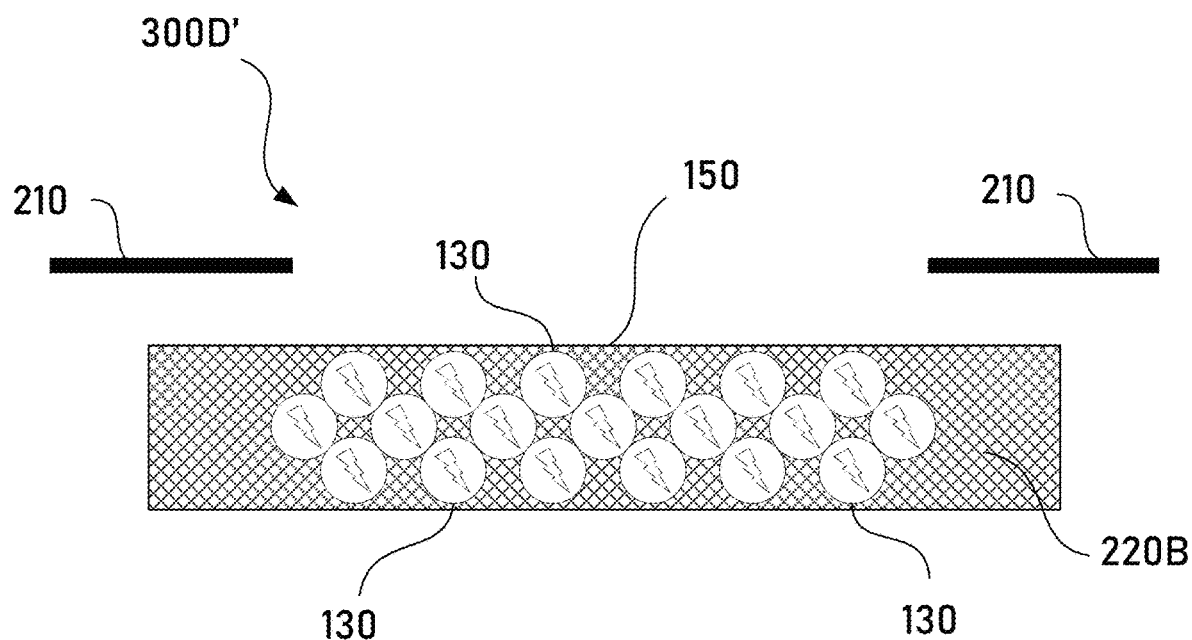

FIGS. 14A-14B illustrate various states of a fourth embodiment of the activation indicator component 300D, according to embodiments of the present disclosure. The activation indicator component 300D is configured to transition from a conductive state to a nonconductive state, responsive to the application of an activation action.

The fourth embodiment of the activation indicator component 300D among other embodiments of the activation indicator component 300 may include a plurality of microcapsules 100E, each microcapsule 100E including a fluid 150 microencapsulated in a shell 110. The activation indicator component 300D further includes a plurality of conductive particles 130, and a second type of wick 220B. The activation indicator component 300D forms a portion of (e.g., physically couples two sections of) a wire/trace 210. The unactivated state of the activation indicator component 300D is a conductive state (e.g., component conductive state), and the activated state of the activation indicator component 300D is a nonconductive state (e.g., component nonconductive state). When the activation indicator component 300A is in the component nonconductive state, the activation indicator component 300D does not conduct electricity through the wire/trace 210. According to some embodiments, when in the component nonconductive state, the activation indicator component 300D blocks, impedes, resists, or otherwise prevents the conduction of electricity and electrical signals through the wire/trace 210. When the activation indicator component 300D is in the component conductive state, the activatable environmental exposure indicator 200D forms an electrical connection across the wire/trace 210, and electricity flows through the activation indicator component 300D and through the wire/trace 210. Said differently, the activation indicator component 300D is an electrical switch that is operable to be opened in response to an activation action. When the activation indicator component 300D is in the component conductive state, the switch is closed, and when the activation indicator component 300A is in the component nonconductive state, the switch is open.

According to some embodiments, the second type of wick 220B is permeable with respect to both the fluid 150 and conductive particles 130.

FIG. 6A illustrates the fourth embodiment of the activation indicator component 300D in the unactivated state, prior to the application of the activation action, according to embodiments of the present disclosure. In the unactivated state, the activation indicator component 300D is in the component conductive state. The plurality of conductive particles 130 form an electrical connection through the activation indicator component 300D, such that the electrical switch is closed. The conductive particles 130 are disposed relative to the wire/trace 210 such that the electrical connection therethrough is supported. The plurality of microcapsules 100E are disposed proximately to the plurality of conductive particles 130. The wick 220B is disposed proximately to the plurality of conductive particles 130. According to some embodiments, the plurality of conductive particles 130 is sandwiched between the plurality of microcapsules 100E and the wick 220B. In the first stage, the shells 110 of the microcapsules 100E are intact, and the fluid 150 is isolated from the environment.

FIG. 6B illustrates the fourth embodiment of the activation indicator component 300B' in the activated state, after the application of the activation action, according to embodiments of the present disclosure. In the activated state, the microcapsules 100E have been ruptured responsive to the application of the activation action, and the fluid 150 is released from the shells 110 and is drawn into the wick 220B. The fluid 150 flows into the plurality conductive particles 130 as the fluid 150 is drawn into the wick 220B, and the fluid 150 begins to disrupt electrical conduction through the plurality of conductive particles 130. In some examples, the viscosity of the fluid 150 is sufficient to move the conductive particles 130 and contract the conductive particles 130 into the flow of fluid 150. The wick 220B, which is permeable with respect to both the fluid 150 and the conductive particles 130, draws the fluid 150 into the wick 220B, and also draws the conductive particles 130 into the wick 220B, as the conductive particles 130 are contracted into the flow of fluid 150. When the conductive particles are drawn into the wick 220B by the fluid 150, the electrical connection through the activation indicator component 300D is disengaged, and the activation indicator component 300D' is in the component nonconductive state.

Microcapsule: Sixth Embodiment

Figure 15:
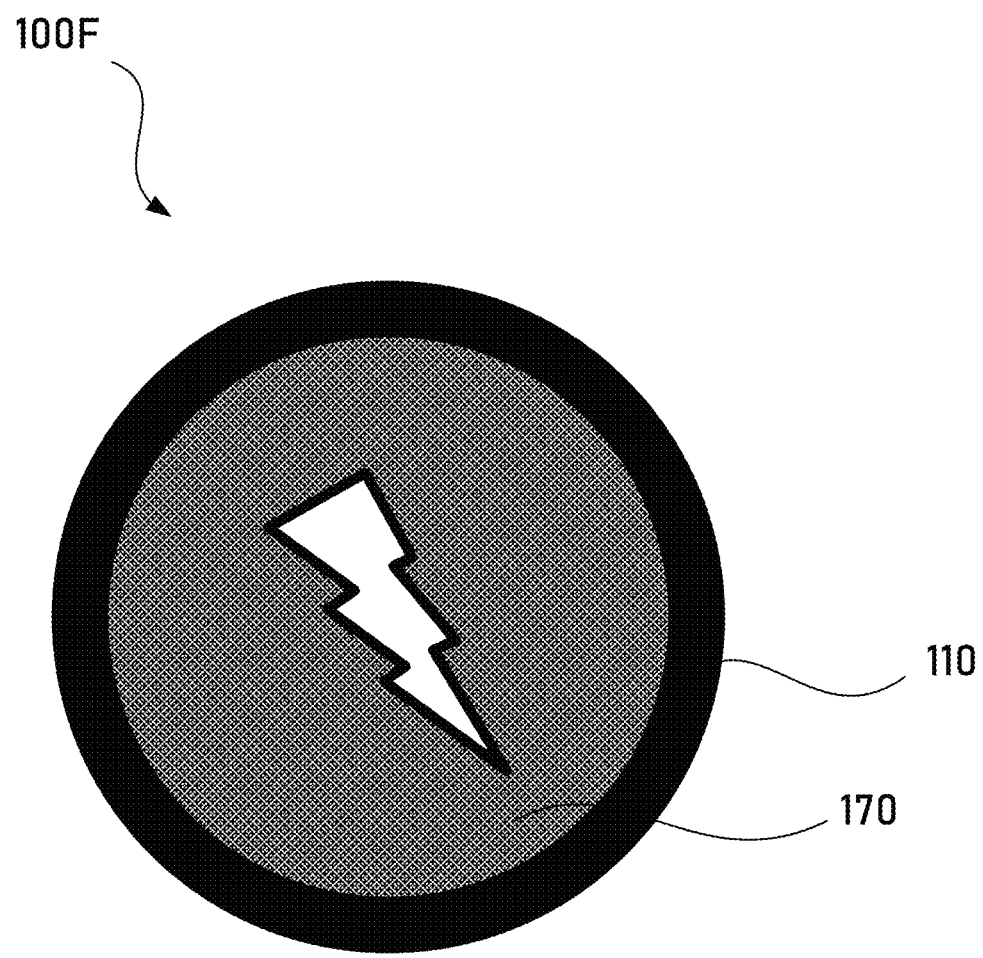
FIG. 15 illustrates a sixth embodiment of a microcapsule, according to embodiments of the present disclosure.

FIG. 15 illustrates a cross-sectional view of a microcapsule 100F, where the microcapsule 100F is a sixth embodiment of an activatable microcapsule 100, according to embodiments of the present disclosure. The microcapsule 100F may be a component employed in various embodiments of the activatable environmental exposure indicator 200, including the fifth embodiment of the activatable environmental exposure indicator 200E, according to embodiments of the present disclosure. The microcapsule 100F contains a conductive adhesive fluid 170 microencapsulated in a shell 110. The shell 110 of the microcapsule 100B may include any of the features and properties of the frangible shells discussed above in Section I.

The microcapsule 100F includes a conductive adhesive fluid 170, according to embodiments of the present disclosure. The conductive adhesive fluid 170 may be any such material having conductive properties in the liquid phase. In some examples, the conductive adhesive fluid 170 includes an adhesive fluid blended with conductive materials to form a liquefiable conductive substance. In some examples, the conductive adhesive fluid 170 may include any of the features and properties of the liquefiable materials described above in Section I. Furthermore, the conductive adhesive fluid 170 may exhibit adhesive properties. In some examples, the conductive adhesive fluid 170 may cure, e.g., permanently transitioning to a solid phase.

The shell 110 of the microcapsule 100F may be utilized in order to prevent wicking, or migration, of the conductive adhesive fluid 170 prior to the application of the activation action. In some embodiments, the conductive adhesive fluid 170 is a liquefiable material configured to be in a liquid state throughout the range of expected operating temperatures of the microcapsule 100F.

Activation Indicator Component: Fifth Embodiment

Figure 16A:
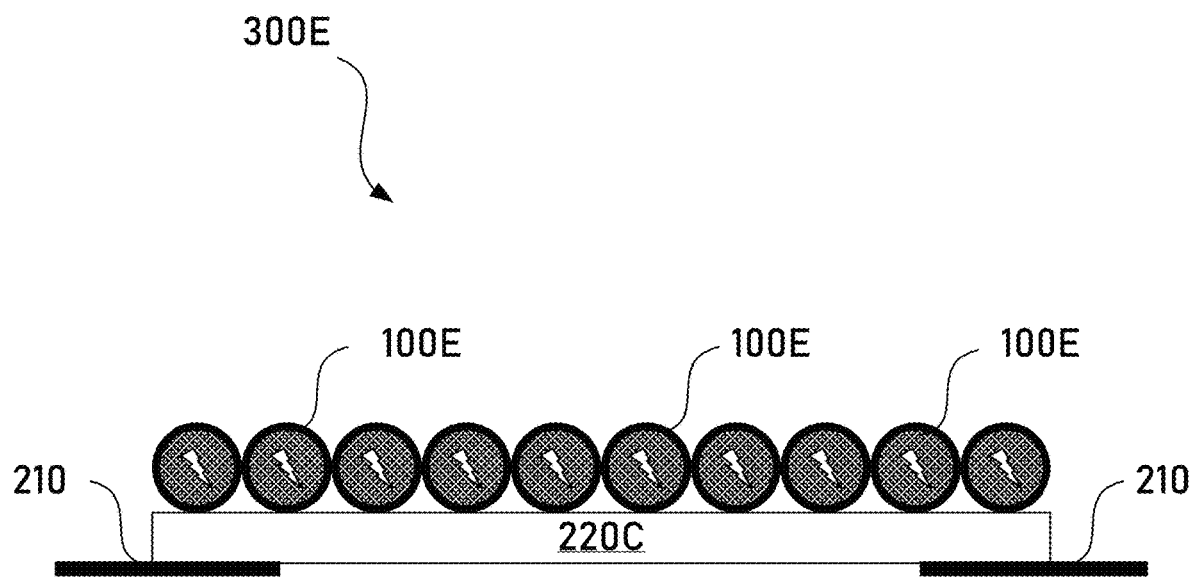
FIGS. 16A-16B illustrates various stages of a fifth embodiment of an activation indicator component employing the microcapsule of FIG. 15, according to embodiments of the present disclosure.
Figure 16B:
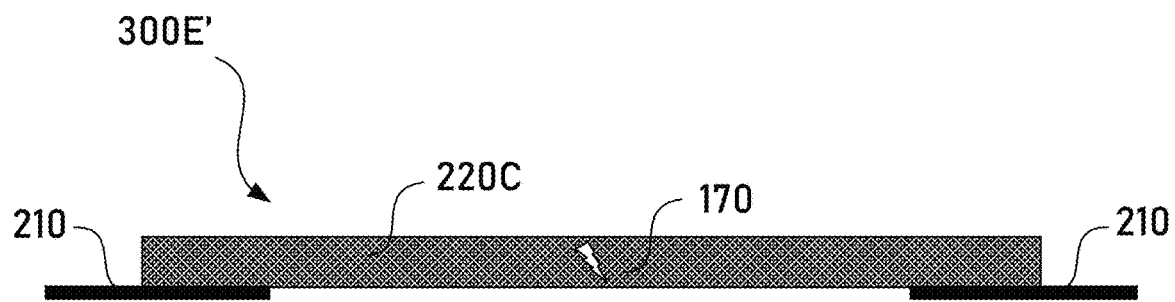

FIGS. 16A-16B illustrate various stages of a fifth embodiment of an activation indicator component 300E, according to embodiments of the present disclosure. The activation indicator component 300E is configured to transition from a nonconductive state to a conductive state, responsive to the application of an activation action.

The fifth embodiment of the activation indicator component 300E, among other embodiments of the activatable environmental exposure indicator 200, may include a plurality of microcapsules 100F, each microcapsule 100F including a conductive adhesive fluid 170 microencapsulated in a shell 110. The activation indicator component 300E further includes a third type of wick 220C. The activation indicator component 300E forms a portion of (e.g., physically couples two sections of) a wire/trace 210. The unexposed state of the activation indicator component 300E is a nonconductive state (e.g., component nonconductive state), and the exposed state of the activation indicator component 300E is a conductive state, (e.g., component conductive state). When the activation indicator component 300E is in the component nonconductive state, the activation indicator component 300E does not conduct electricity through the wire/trace 210. According to some embodiments, when in the component nonconductive state, the activation indicator component 300E blocks, impedes, resists, or otherwise prevents the conduction of electricity and electrical signals through the wire/trace 210. When the activation indicator component 300E is in the component conductive state, the activation indicator component 300E forms an electrical connection across the wire/trace 210, and electricity flows through the activation indicator component 300E and through the wire/trace 210. Said differently, the activation indicator component 300E is an electrical switch that is operable to be closed in response to an activation action. When the activation indicator component 300E is in the component conductive state, the switch is closed, and when the activation indicator component 300E is in the component nonconductive state, the switch is open.

According to some embodiments, the third type of wick 220C is permeable with respect to the conductive adhesive fluid 170. The wick 220C is disposed adjacent to the wire/trace 210, such that the wick 220C bridges the gap between two sections of the wire/trace 210. The microcapsules 100D are disposed adjacent to the wick 220C, opposite from the wire.

FIG. 16A illustrates the fourth embodiment of the activation indicator component 300E in the unexposed state, prior to the application of the activation action, according to embodiments of the present disclosure. In the first stage, the shells 110 of the microcapsules 100F are intact, and the conductive adhesive fluid 170 is contained. In the first stage, the activation indicator component 300E is in the component nonconductive state (e.g., the switch is open).

FIG. 16B illustrates the fifth embodiment of the activation indicator component 300E' in the exposed state, after the application of the activation action, according to embodiments of the present disclosure. In the second state, the microcapsules 100F have been ruptured responsive to the application of the activation action, and the conductive adhesive fluid 170 is drawn into the wick 220C, where the conductive adhesive fluid 170 begins to permeate the wick 220C. When the wick 220C is saturated with conductive adhesive fluid 170, the wick 220C becomes conductive, such that the wick 220C conducts electricity across the wire/trace 210 via the conductive adhesive fluid 170 contained in the wick 220C. When the wick 220C becomes conductive, the activation indicator component 300E''' completes the transitions to the component conductive state.

In some embodiments, after a predetermined period of time, the conductive adhesive fluid 170 may cure, such that the wick 220C is secured to the wire/trace 210 by the conductive adhesive fluid 170, and the transition to the component conductive state is made substantially permanent.

Figure 17A:
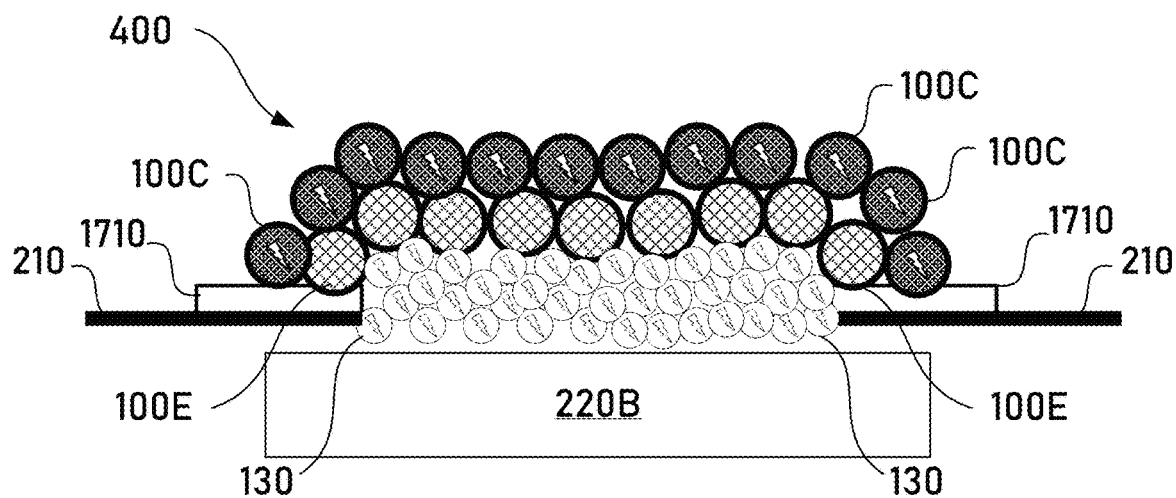
FIGS. 17A-17C illustrate various stages of an embodiments of a combined activation and exposure indicator employing the microcapsules of FIG. 7 and FIG. 12, according to embodiments of the present disclosure.
Figure 17B:
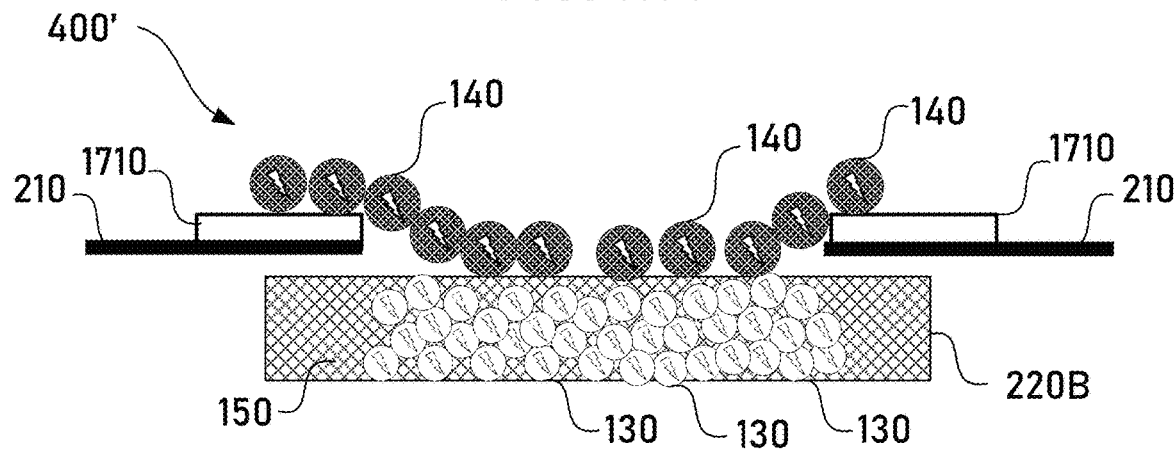
Figure 17C:
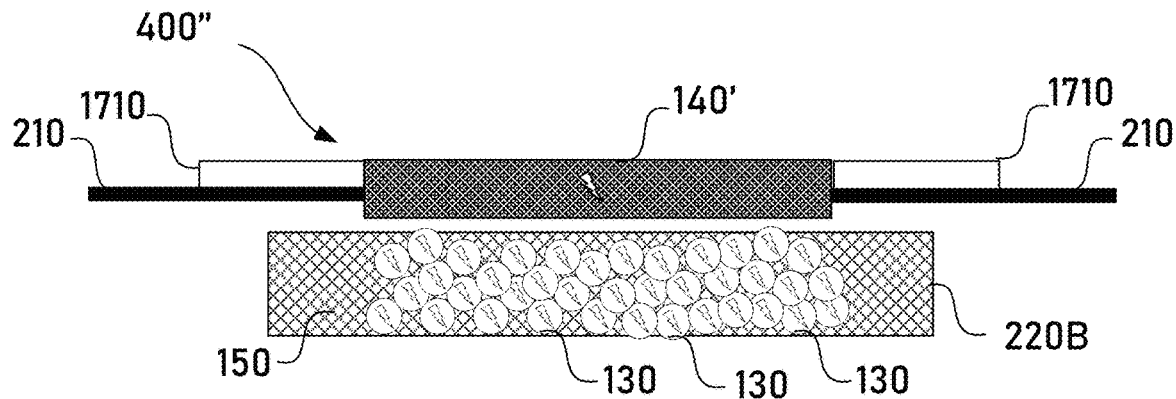

Combined Activation Indicator Component and Activatable Environmental Exposure Indicator FIGS. 17A-17C illustrate various stages of an activation and exposure indicator 400, e.g., a combined activation indicator component and activatable environmental exposure indicator, according to embodiments of the present disclosure. The activation and exposure indicator is configured to transition from a conductive state to a nonconductive state responsive to the application of the activation action, and transition from the nonconductive state to the conductive state responsive to an exposure to the predetermined environmental exposure occurring subsequently to the activation action.

The activation and exposure indicator 400 includes the second type of wick 220B, a plurality of conductive particles forming an electrical connection across a wire/trace 210, a plurality of microcapsules 100E (e.g., containing fluid 150) and a plurality of microcapsules 100C (e.g., containing conductive adhesive 140). The activation and exposure indicator 400 further includes an insulating layer 1710, which is configured to prevent premature contact of the microcapsule 100C with the wire/trace 210.

FIG. 17A illustrates the unactivated and unexposed state of the activation and exposure indicator 400. Prior to an application of an activation action, the activation and exposure indicator 400 is in the conductive state. The conductive particles are initially in such a configuration as to support an electrical connection across the wire/trace 210. The wick 220B is oriented such that the wick is adjacent to, and in some examples, abutting the plurality of conductive particles 130. The microcapsules 100F are disposed in a layer adjacent to the plurality of conductive particles 130, opposite to the wick 220B. The microcapsules 100C are disposed in a layer overlaying the microcapsules 100F. In some examples, the insulating layer 1710 may block contact between the microcapsules 100C and the wire/trace 210.

FIG. 17B illustrates the activated and unexposed state of the activation and exposure indicator 400', according to embodiments of the present disclosure. Responsive to the application of the activation action, the frangible shells 110 of both the microcapsules 100C and microcapsules 100F are disengaged, and the payloads thereof released. When the fluid 150 contained in the microcapsules 100F is released responsive to the application of the activation action, the fluid 150 flows through the conductive particles 130, and draws the conductive particles 130 into the wick 220B, disengaging the electrical connection, and transitioning the activation and exposure indicator 400' to the non-conductive state. When activated, the microcapsules 100C release the conductive adhesive 140 contained therein. Prior to exposure to the predetermined environmental exposure, the conductive adhesive 140 is in the solid phase, and is blocked from establishing an electrical connection via the insulating layer, which substantially prevents the solid phase conductive adhesive 140 from contacting the wire/trace 210.

FIG. 17C illustrates the activated and exposed state of the activation and exposure indicator 400'', according to embodiments of the present disclosure. Responsive to an exposure to the predetermined environmental exposure occurring subsequently to the application of the activation action, the conductive adhesive 140 liquefies, and forms an electrical connection across the wire/trace 210, transitioning the activation and exposure indicator 400 to the conductive state. The insulating layer 1710 is configured to permit the liquefied conductive adhesive 140' to contact the wire/trace 210. In some examples, the wick 220B and the fluid 150 are configured such that the wick 220B is entirely saturated by the fluid 150 following activation, such that upon exposure to the predetermined environmental exposure, the wick 220B does not draw the liquefied conductive adhesive 140' into the wick 220B and potentially impair the formation or re-formation of the electrical connection across the wire/ trace 210. In some examples, magnetic, mechanical, chemical, and/or electrical forces can aid in drawings the conductive particles 130 into the wick. In some examples, the conductive adhesive 140 may be drawn between the terminal ends of the trace 210 by magnetic, mechanical, chemical, and/or electrical forces, to aid in forming the electrical connection across the wire/trace 210.

Section IV: Embodiments of Activatable
Environmentally Sensitive RF Tags

Section IV discusses various embodiments of RF tags 1000 (e.g., activatable environmentally sensitive RF tags, environmentally sensitive RF tags, RFID tags, near-field communication (NFC) tags, Ultra-high frequency (UHF) tags). FIGS. 18-27 illustrate various embodiments of RF tags 1000A-J according to embodiments of the present disclosure. In a generic embodiment, an RF tag 1000 includes an integrated circuit 1010 which is electrically connected to an antenna 1020 (e.g., an inductive loop and pair of antennas 1020). The antennas 1020 may be configured to send and receive radiofrequency (RF) signals to an RF reader, e.g., an RFID reader and/or an NFC reader (not shown). The RF tag 1000 further includes an electrical circuit 1015 which is electrically connected to the integrated circuit 1010. The integrated circuit 1010 is configured, responsive to the antenna 1020 receiving an interrogation signal in a predetermined radiofrequency band, to cause the antenna 1020 to emit a response signal. In some examples, the integrated circuit 1010 may query the electrical circuit 1015 as to a condition of the electrical circuit 1015, such that the condition of the electrical circuit 1015 changes the response emitted by the antenna 1020.

In some examples, the integrated circuit 1010 includes a microchip configured to query the circuit and determine whether the electrical circuit 1015 is open, whether the electrical circuit 1015 is closed, or measure an electrical property (e.g., capacitance, resistance) of the electrical circuit 1015.

In some examples, the RF tag 1000 is a passive tag, such that the radiofrequency (RF) signals received by the antennas 1020 may be used to provide power to the RF tag 1000 and allow the RF tag 1000 to transmit an RF signal, via the antennas 1020, in response to the received RF signal. In other embodiments, e.g., an active RF tag, the integrated circuit 1010 may include an electrical connection to a battery, or other power source capable of powering the RF tag 1000 to transmit an RF signal without having first received an interrogative RF signal. The integrated circuit 1010 may contain a variety of circuitry components, which may include a memory in which data is stored, such that the RF tag 1000 is capable of transmitting the data contained in the memory to an RF reader. The integrated circuit 1010 may sense data indicative of an electrical property or value of the electric circuit 1015, such that the RF tag 1000 is capable of transmitting the sensed data to an RF reader, where the sensed data may or may not be stored in the memory.

The RF tags 1000 of the present disclosure are activatable and environmentally sensitive. As such, each embodiment of the RF tag 1000 includes at least a one activatable environmental exposure indicator 200, and at least one activation indicator component 300, with the exception of the ninth embodiment of the RF tag 1000I, which employs the activation and exposure indicator 400. Each RF tag 1000 is configured to have a first response behavior (e.g., responsive to an interrogation signal) prior to an application of an activation action to the RF tag 1000 (e.g., applied to at least the activatable environmental exposure indicator 200 and the activation indicator component 300), to have a second response behavior after the application of the activation action, and to have a third response behavior after a predetermined environmental exposure occurring after the application of the activation action. In some examples, the third response behavior is a reversion to the first response behavior.

In some examples, the set of response behaviors includes the RF tag 1000 emitting a first distinct RF signal, emitting a second distinct RF signal, emitting a third distinct RF signal, e.g., transmitting a different value, or transmitting on a different frequency. In some examples a first distinct RF signal may have a first frequency, the second RF signal may have a second frequency, distinct from the first frequency, and/or the third RF signal may have a third frequency distinct from both the first frequency and the second frequency. In some examples a first distinct RF signal may include first sensed data representative of a first electrical property or value associated with the electric circuit 1015, the second RF signal may include second sensed data representative of a second electrical property or value associated with the electric circuit 1015, distinct from the first data, and/or the third RF signal may include third sensed data representative of a third electrical property or value of the electric circuit 1015, distinct from both the first data and the second data, where the data can be sensed, for example by the integrated circuit upon being powered by energy harvested from an interrogation signal. In some examples the integrated circuit 1010 may include a memory configured to store one or more data, and the first distinct RF signal may contain a first data stored in the memory of the integrated circuit 1010, and the second distinct RF signal may contain a second data, distinct from the first data, stored in the memory of the integrated circuit 1010, contain the first data stored in the memory of the integrated circuit 1010, or omit the first data stored in the memory of the integrated circuit 1010. According to some embodiments, the set of response behaviors may include other behaviors than those described above, and combinations of and with the above behaviors.

As shown in FIGS. 18-27, the RF tag 1000 can include a substrate 1005. The substrate 1005 can support the integrated circuit 1010, the electric circuit(s) 1015, the antennas 1020, the activatable environmental exposure indicator 200, the activation indicator component 300, and/or the activation and exposure indicator 400. The substrate 1005 may be, for example, paper such as a cellulose paper, a natural or synthetic polymer, or other materials. In some examples, the substrate 1005 may provide a surface upon which indicia can be printed. In some examples, the substrate 1005 may have a thickness in a range of about 10 mm to about 20 mm, from about 1 mm to about 10 mm or from about 10 mm to about 20 mm. As a non-limiting example, the substrate 1005 may be one of a Polyolefin, polyamide, polypropylene, polyester Polyimide, Polyart synthetic paper, nylon, or PPG Teslin paper. In an example, there may be a topcoat applied to the substrate 1005. Optionally, the substrate 1005 may further include a release liner and/or an adhesive backing to allow the substrate 1005 to be selectively attached to surfaces, e.g., as a label.

Activatable Environmentally Sensitive RF Tag: First Embodiment

Figure 18:
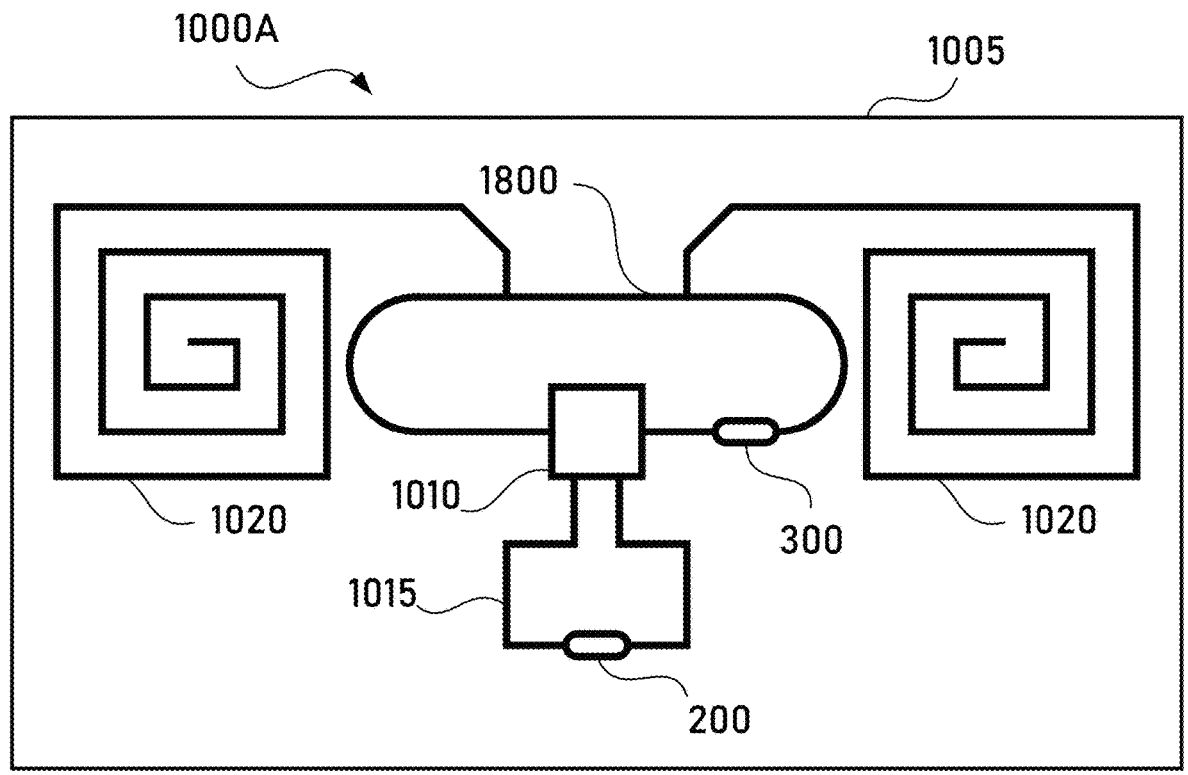
FIG. 18 illustrates a first embodiment of an activatable environmentally sensitive RF tag, according to embodiments of the present disclosure.

FIG. 18 illustrates a first embodiment of an environmentally sensitive RF tag 1000A, according to embodiments of the present disclosure. In the first embodiment of the RF tag 1000A, the activatable environmental exposure indicator 200 is disposed on the electrical circuit 1015, and the activation indicator component 300 is disposed on an activation circuit 1800, such that the activation indicator component 300 connects the integrated circuit 1010 and the antenna 1020. When the activation indicator component 300 is in the component nonconductive state, the activation circuit 1800 is an open circuit, and the antenna 1020 is electrically disconnected from at least one terminal of the integrated circuit 1010 (e.g., the open circuit can prevent the integrated circuit 1010 from receiving an interrogation signal and/or power from the interrogation signal (e.g., from an RF encoder/reader). When the activation indicator component 300 is in the component conductive state, the activation circuit 1800 is closed and facilitates an electrical connection between the integrated circuit 1010 and the antenna 1020, such that the antenna 1020 is electrically connected to the integrated circuit 1010 (e.g., the closed circuit can enable the integrated circuit 1010 to receive an interrogation signal from another RF device, such as an RF encoder/reader).

The activatable environmental exposure indicator 200 is disposed on the electrical circuit 1015, such that in some embodiments, after an activation event, when the activatable environmental exposure indicator 200 transitions from the unexposed state to the exposed state, an electrical property of the electrical circuit 1015 is changed, resulting in a change to the response behavior of the RF tag 1000A.

The first embodiment of the RF tag 1000A may employ any of the embodiments of the activation indicator components 300 in which the activation indicator component 300 is in the component conductive state when in the activated state, and in the component nonconductive state when in the unactivated state (e.g., first embodiment of the activation indicator component 300A, second embodiment of the activation indicator component 300B, and fifth embodiment of the activation indicator component 300E). Prior to an activation action being applied to the RF tag 1000A, the RF tag 1000A has a first predetermined response behavior. When the RF tag 1000A employs an embodiment of the activation indicator component 300 where the unactivated state is a component nonconductive state, and the activated state is a component conductive state, the first response behavior is to not emit a response signal when interrogated. As the electrical connection between the antenna 1020 and the integrated circuit 1010 is facilitated by the activation indicator component 300 in the component conductive state, when the activation indicator component 300 is in the component nonconductive state, the antenna 1020 is substantially prevented from electrical communication with the integrated circuit 1010 and thus cannot emit a response when interrogated.

According to some embodiments, the first embodiment of the RF tag 1000A may employ any of the embodiments of activatable environmental exposure indicators 200.

When the activation action is applied to the RF tag 1000A, the activation indicator component 300 and the activatable environmental exposure indicator 200 are activated, and the activation indicator component 300 transitions to the activated state and to the component conductive state, such that the antenna 1020 is electrically connected to the integrated circuit 1010, and the RF tag 1000A harvests power from and/or emits a response to an interrogation signal.

When the RF tag 1000A employs the first embodiment of the activatable environmental exposure indicator 200A, the electrical circuit 1015 is open when the activatable environmental exposure indicator 200A is in the unexposed state, and the electrical circuit 1015 is closed when the activatable environmental exposure indicator 200A is in the exposed state. Thus, the second response behavior corresponds to the electrical circuit 1015 being open, and the third response behavior corresponds to the electrical circuit 1015 being closed.

When the RF tag 1000A employs the second embodiment of the activatable environmental exposure indicator 200B, the electrical circuit 1015 is open when the activatable environmental exposure indicator 200B is in the unexposed state, and the electrical circuit 1015 is closed when the activatable environmental exposure indicator 200B is in the exposed state. Thus, the second response behavior corresponds to the electrical circuit 1015 being open, and the third response behavior corresponds to the electrical circuit 1015 being closed.

When the RF tag 1000A employs the third embodiment of the activatable environmental exposure indicator 200C, the electrical circuit 1015 has a first capacitance when the activatable environmental exposure indicator 200C is in the unexposed state and has a second capacitance when the activatable environmental exposure indicator 200C is in the exposed state. Thus, the second response behavior corresponds to the electrical circuit 1015 having the first capacitance, and the third response behavior corresponds to the electrical circuit 1015 having the second capacitance.

When the RF tag 1000A employs the fourth embodiment of the activatable environmental exposure indicator 200D, the electrical circuit 1015 is closed when the activatable environmental exposure indicator 200D is in the unexposed state, and the electrical circuit 1015 is open when the activatable environmental exposure indicator 200D is in the exposed state. Thus, the second response behavior corresponds to the electrical circuit 1015 being open, and the third response behavior corresponds to the electrical circuit 1015 being closed.

When the RF tag 1000A employs the fifth embodiment of the activatable environmental exposure indicator 200E, the electrical circuit 1015 is open when the activatable environmental exposure indicator 200E is in the unexposed state, and the electrical circuit 1015 is closed when the activatable environmental exposure indicator 200E is in the exposed state. Thus, the second response behavior corresponds to the electrical circuit 1015 being open, and the third response behavior corresponds to the electrical circuit 1015 being closed.

In at least one aspect of the present disclosure, method of forming an RF tag, such as the RF tag 1000A, is provided. Initially, an activation circuit (e.g., activation circuit 1800) is formed, including an activation indicator component (e.g., activation indicator component 300), the activation circuit being connectively disposed between an integrated circuit (e.g., integrated circuit 1010) and an antenna (e.g., antenna 1020) of an RF tag.

The activation indicator component is formed such that the activation indicator component has a component conductive state and a component nonconductive state, and the activation indicator component defines an activation open circuit between an integrated circuit and an antenna when in the nonconductive component state and an activation closed circuit between the integrated circuit and the antenna when in the conductive component state. The integrated circuit is configured, responsive to being interrogated by an interrogation signal in a predetermined radiofrequency range which is received by the antenna, to cause the antenna to emit a response signal when the activation circuit forms the activation closed circuit but not emit the response signal when the activation circuit forms the activation open circuit.

In some examples, forming the activation circuit includes depositing a first plurality of microcapsules at a first location on a substrate proximate to a first trace configured to electrically couple the integrated circuit and the antenna, each microcapsule in the first plurality of microcapsules including a frangible shell containing a conductive material that is responsive to an activation action to transition the activation circuit from the activation open circuit to the activation closed circuit.

Next, an indicator circuit (e.g. electrical circuit 1015) is formed and connected to the integrated circuit. The indicator circuit includes an activatable environmental exposure indicator (e.g., activatable environmental exposure indicator 200) configured to define a first indicator electrical state for the indicator circuit and a second indicator electrical state for the indicator circuit, the response signal from the integrated circuit is a first distinct response signal when the indicator circuit is in the first indicator electrical state and is a second distinct response signal when the indicator circuit is in the second indicator electrical state. In the case of the RF tag 1000A, the first electrical state is one of an indicator conductive state and an indicator nonconductive state, and the second electrical state is the other of the indicator conductive state and the indicator nonconductive state. In some examples, forming the indicator circuit includes depositing a second plurality of microcapsules at a second location on the substrate proximate to a second trace configured to form a closed loop with the integrated circuit, each of the second plurality of microcapsules including a frangible shell containing a liquefiable material that is responsive to the activation action to cause the indicator circuit to be environmentally sensitive to a predetermined environmental exposure.

Activatable Environmentally Sensitive RF Tag: Second Embodiment

Figure 19:
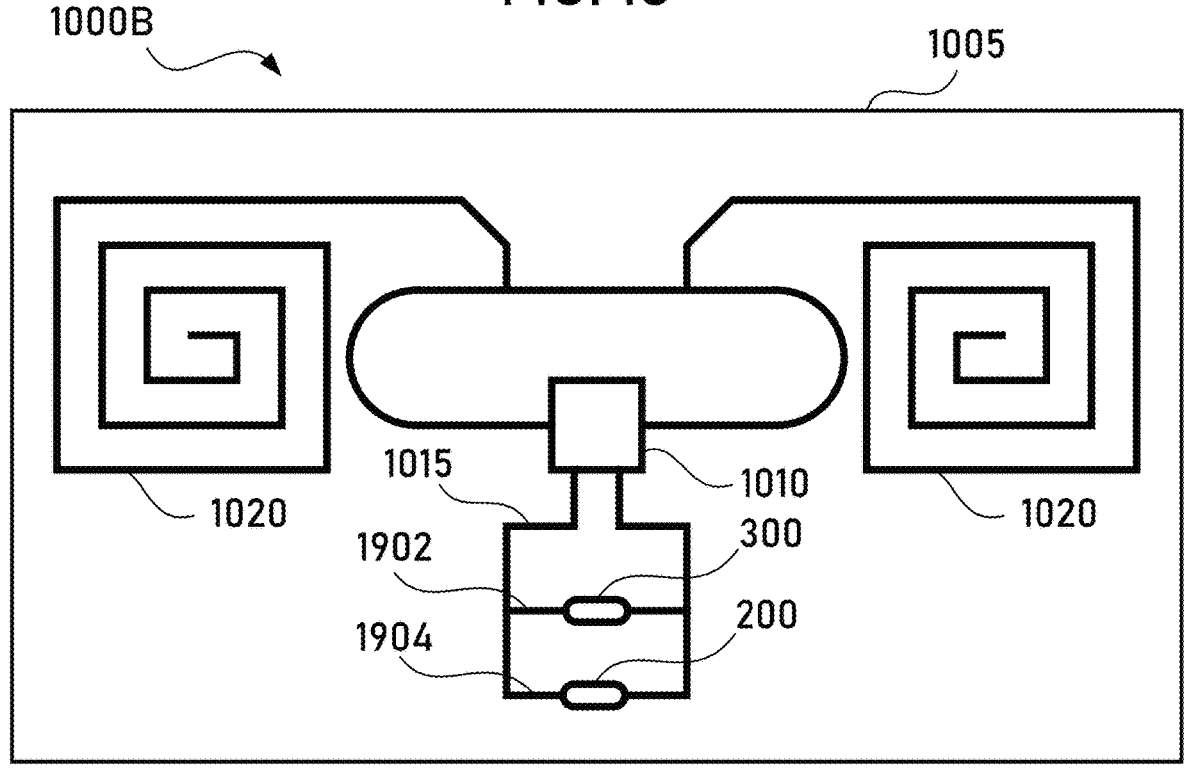
FIG. 19 illustrates a second embodiment of an activatable environmentally sensitive RF tag, according to embodiments of the present disclosure.

FIG. 19 illustrates a second embodiment of an environmentally sensitive RF tag 1000B, according to embodiments of the present disclosure. In the second embodiment of the RF tag 1000B, both the activatable environmental exposure indicator 200 and the activation indicator component 300 are disposed on the electrical circuit 1015. The activation indicator component 300 may be disposed on an activation branch 1902 of the electrical circuit 1015, and the activatable environmental exposure indicator 200 is disposed on an indicator branch 1904 of the electrical circuit 1015. The activation branch 1902 and the indicator branch 1904 are wired in parallel.

When the activation indicator component 300 is in the component nonconductive state, the activation branch 1902 is open, and when the activation indicator component 300 is in the component conductive state, the activation branch 1902 is closed. When the activatable environmental exposure indicator 200 is in the indicator nonconductive state the indicator branch 1904 is open, and when the activatable environmental exposure indicator 200 is in the indicator conductive state, the indicator branch 1904 is closed. When one or both of the indicator branch 1904 and the activation branch 1902 is closed, the electrical circuit 1015 is closed. When both the indicator branch 1904 and the activation branch 1902 are open, the electrical circuit 1015 is open.

In some examples, the RF tag 1000B employs the fourth embodiment of the activation indicator component 300D, where the activation indicator component 300B is in the component conductive state when in the unactivated state. In such examples, the RF tag 1000B may employ embodiments of the activatable environmental exposure indicator 200 where the activatable environmental exposure indicator 200 is in the indicator nonconductive state when in the unexposed state and in the indicator conductive state when in the exposed state. In this manner, the first response behavior corresponds to the electrical circuit 1015 being closed (e.g., via the activation indicator component 300), the second response behavior corresponds to the electrical circuit 1015 being open, and the third response behavior is a reversion to the first response behavior, corresponding to the electrical circuit 1015 being closed (e.g., via the activatable environmental exposure indicator 200). As an example, the first response behavior can include response data indicative of the electric circuit 1015 being in the closed state (which can be used to determine that the environmental indicator was unactivated and unexposed if in response to an activation event, the electric circuit 1015 is determined to be in the open state), the second behavior can include response data indicative of the electric circuit 1015 being in the open state (activated and unexposed), and the third response behavior can include response data indicative of the electric circuit 1015 being in the closed state (which can be used to determine that the environmental indicator has been activated and exposed subsequent to the second response behavior).

In at least one aspect of the present disclosure, method of forming an RF tag, such as the RF tag 1000B, is provided. Initially, an electrical circuit is formed, the electrical circuit having an activation branch (e.g., activation branch 1902) and an indicator branch (e.g., indicator branch 1904), which are in parallel with one another, such that when one or both of the activation branch and the indicator branch is closed, the electrical circuit is in a closed circuit with the integrated circuit, and when both the indicator branch and the activation branch are open, the electrical circuit is an open circuit.

The activation branch is formed to include an activation indicator component (e.g., activation indicator component 300). The activation indicator component is formed such that the activation indicator component has a component conductive state and a component nonconductive state. The activation indicator component may be initially formed in the conductive state, such that the activation indicator component transitions the activation branch to an open circuit.

In some examples, forming the activation branch includes depositing a first plurality of microcapsules at a first location on a substrate proximate to a first trace configured to electrically couple the integrated circuit and the antenna, each microcapsule in the first plurality of microcapsules including a frangible shell containing a material (e.g., fluid 150) that is responsive to an activation action to open the activation branch.

Next, the indicator branch is formed to include an activatable environmental exposure indicator (e.g., activatable environmental exposure indicator 200). The activatable environmental exposure indicator is formed such that the activatable environmental exposure indicator has an indicator conductive state and an indicator nonconductive state, such that the activatable environmental exposure indicator opens the activation branch in the indicator nonconductive state and closes the activation branch in the indicator conductive state. The activatable environmental exposure indicator is initially formed in the nonconductive state, such that the activatable environmental exposure indicator transitions the indicator branch to a closed circuit.

In some examples, forming the indicator circuit includes depositing a second plurality of microcapsules at a second location on the substrate proximate to a second trace configured to form a closed loop with the integrated circuit, each of the second plurality of microcapsules including a frangible shell containing a liquefiable material that is responsive to the activation action to cause the indicator circuit to be environmentally sensitive to a predetermined environmental exposure.

The integrated circuit is configured, responsive to being interrogated by an interrogation signal in a predetermined radiofrequency range which is received by the antenna, to cause the antenna to emit a response signal which differs based on whether the electrical circuit is open or closed.

Activatable Environmentally Sensitive RF Tag: Third Embodiment

Figure 20:
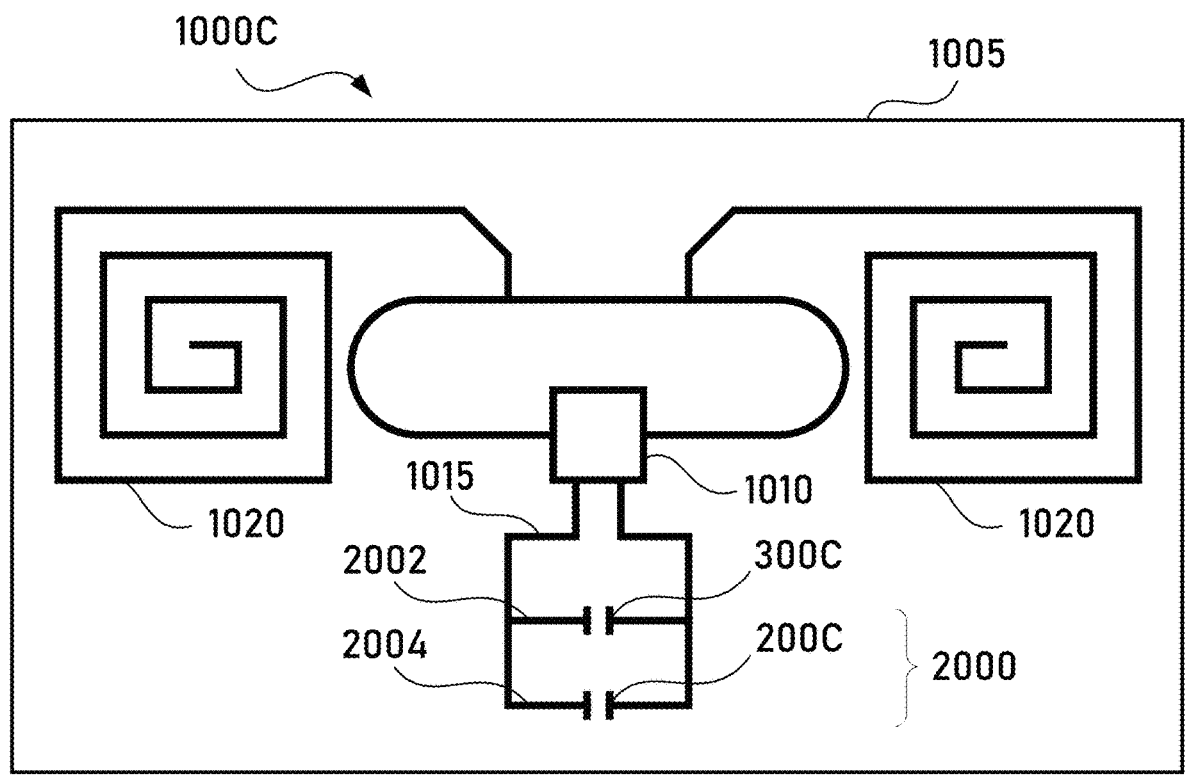
FIG. 20 illustrates a third embodiment of an activatable environmentally sensitive RF tag, according to embodiments of the present disclosure.

FIG. 20 illustrates a third embodiment of the environmentally sensitive RF tag 1000C, according to embodiments of the present disclosure. The RF tag 1000C includes a variable capacitance structure 2000 as a part of the electrical circuit 1015. The variable capacitance structure 2000 includes a first branch 2002, and a second branch 2004, wired in parallel with one another. The first branch 2002 (e.g., activation branch) includes an activation indicator component 300C having a first capacitance $C_1$ in the unactivated state, and a second capacitance $C_2$ in the activated state. The second branch includes 2004 (e.g., indicator branch) an activatable environmental exposure indicator 200C having a third capacitance $C_3$ in the nonactivated or unexposed state, and a fourth capacitance $C_4$ in the activated and exposed state.

In some examples, the first response behavior corresponds to the total capacitance of the variable capacitance structure 2000 being $C_1+C_3$, e.g., in the unactivated configuration. In some examples the second response behavior corresponds to the total capacitance of the variable capacitance structure 2000 being $C_2+C_3$, e.g., in the activated and unexposed configuration. In some examples the third response behavior corresponds to the total capacitance of the variable capacitance structure 2000 being $C_2+C_4$, e.g., in the activated and exposed configuration.

In at least one aspect of the present disclosure, method of forming an RF tag, such as the RF tag 1000C, is provided. Initially, an electrical circuit (e.g., electrical circuit 1015) is formed, the electrical circuit including a capacitance structure (e.g., variable capacitance structure 2000) including activation branch (e.g., first branch 2002) and an indicator branch (e.g., second branch 2004) in parallel with one another, such that the capacitance of the variable capacitance structure is the sum of the capacitance of the activation branch and the capacitance of the indication branch.

The activation branch is formed, including an activation indicator component (e.g., activation indicator component 300C). The activation indicator component is formed such that the activation indicator component has an unactivated state in which the activation indicator component has a first activation capacitance and an activated state on which the activation indicator component has a second activation capacitance.

In some examples, forming the activation branch includes depositing a first plurality of microcapsules at a first location on a substrate proximate to a pair of electrodes forming a capacitor, each microcapsule in the first plurality of microcapsules including a frangible shell containing a material that is responsive to an activation action to transition the activation indicator component from the unactivated state and the first activation capacitance to the activated state and the second activation capacitance.

Next, the indicator branch is formed. The indicator branch includes an activatable environmental exposure indicator (e.g., activatable environmental exposure indicator 200C) which is formed such that the activatable environmental exposure indicator has an unexposed state in which the activatable environmental exposure indicator has a first indication capacitance and an exposed state in which the activatable environmental exposure indicator has a second indication capacitance.

In some examples, forming the indicator circuit includes depositing a second plurality of microcapsules at a second location on the substrate proximate to a second pair of electrodes forming a capacitor each of the second plurality of microcapsules including a frangible shell containing a liquefiable material that is responsive to the activation action to cause the indicator circuit to be environmentally sensitive to a predetermined environmental exposure.

The integrated circuit is configured, responsive to being interrogated by an interrogation signal in a predetermined radiofrequency range which is received by the antenna, to cause the antenna to emit a response signal which differs based on the capacitance of the variable capacitance structure.

Activatable Environmentally Sensitive RF Tag: Fourth Embodiment

Figure 21:
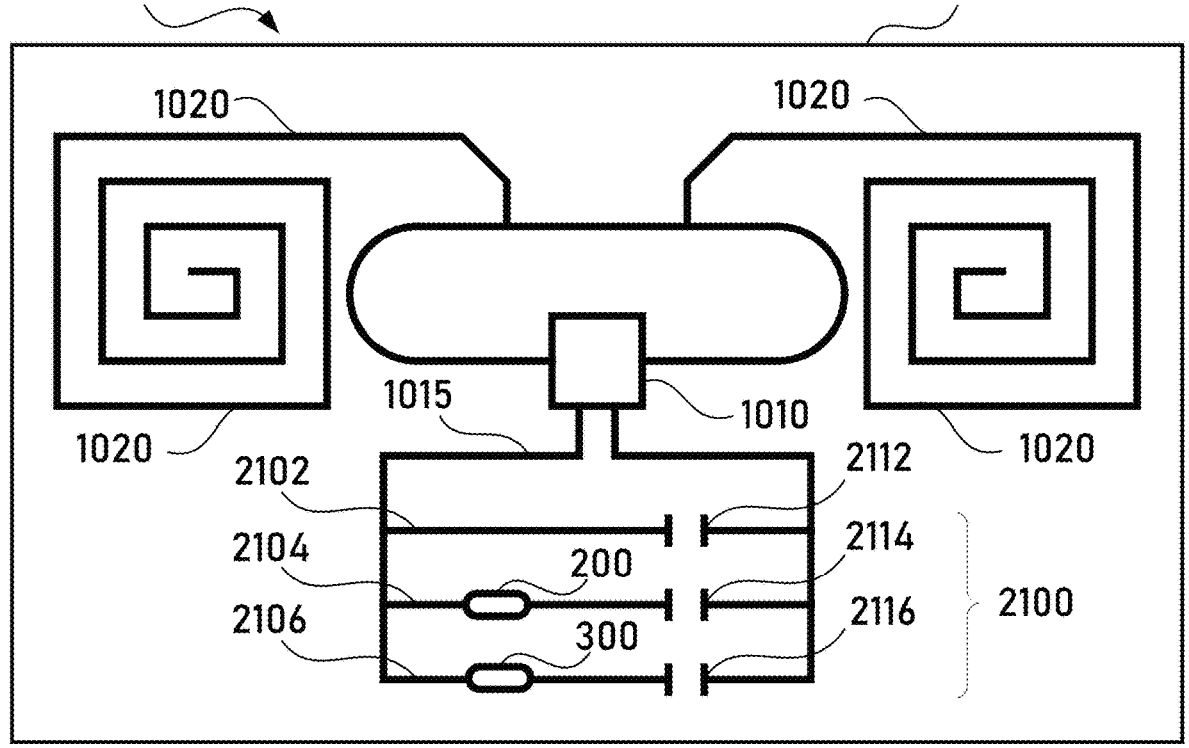
FIG. 21 illustrates a fourth embodiment of an activatable environmentally sensitive RF tag, according to embodiments of the present disclosure.

FIG. 21 illustrates a fourth embodiment of the environmentally sensitive RF tag 1000D, according to embodiments of the present disclosure. The RF tag 1000D includes a variable capacitance structure 2100 as a part of the electrical circuit 1015. The variable capacitance structure 2100 includes a first branch 2102, a second branch 2104 and a third branch 2106, each in parallel with one another. The first branch 2102 (e.g., constant capacitance branch) includes a first capacitor 2112 having a first capacitance $C_1$. The second branch 2104 (e.g., activation branch) includes a second capacitor 2114 having a second capacitance $C_2$, wired in series with an activation indicator component 300. The third branch 2106 (e.g., indicator branch) includes a third capacitor 2116 having a third capacitance $C_3$, wired in series with an activatable environmental exposure indicator 200.

In some examples, the activation indicator component 300 is in the component nonconductive state when in the unactivated state and the activatable environmental exposure indicator 200 is in the indicator nonconductive state when in the unactivated or unexposed state.

In such examples, the first response behavior corresponds to the total capacitance of the variable capacitance structure 2100 being $C_1$ (e.g., unactivated). The second response behavior corresponds to the total capacitance of the variable capacitance structure 2100 being $C_1+C_2$ (e.g., activated and unexposed). The third response behavior corresponds to the total capacitance of the variable capacitance structure 2100 being $C_1+C_2+C_3$ (e.g., activated and exposed).

In some examples, the activation indicator component 300 is in the component conductive state when in the unactivated state and the activatable environmental exposure indicator 200 is in the indicator nonconductive state when in the unexposed state. In such examples, the first response behavior corresponds to the total capacitance of the variable capacitance structure 2100 being $C_1+C_2$ (e.g., unactivated). The second response behavior corresponds to the total capacitance of the variable capacitance structure 2100 being $C_1$ (e.g., activated and unexposed). The third response behavior corresponds to the total capacitance of the variable capacitance structure 2100 being $C_1+C_3$ (e.g., activated and exposed).

In some examples, the activation indicator component 300 is in the component nonconductive state when in the unactivated state and the activatable environmental exposure indicator 200 is in the indicator conductive state when in the unexposed state. In such examples, the first response behavior corresponds to the total capacitance of the variable capacitance structure 2100 being $C_1+C_3$ (e.g., unactivated). The second response behavior corresponds to the total capacitance of the variable capacitance structure 2100 being $C_1+C_2+C_3$ (e.g., activated and unexposed). The third response behavior corresponds to the total capacitance of the variable capacitance structure 2100 being $C_1+C_2$ (e.g., activated and exposed).

In some examples, the activation indicator component 300 is in the component conductive state when in the unactivated state and the activatable environmental exposure indicator 200 is in the indicator conductive state when in the unexposed state. In such examples, the first response behavior corresponds to the total capacitance of the variable capacitance structure 2100 being $C_1+C_2+C_3$ (e.g., unactivated). The second response behavior corresponds to the total capacitance of the variable capacitance structure 2100 being $C_1+C_3$ (e.g., activated and unexposed). The third response behavior corresponds to the total capacitance of the variable capacitance structure 2100 being $C_1$ (e.g., activated and exposed).

In at least one aspect of the present disclosure, method of forming an RF tag, such as the RF tag 1000D, is provided. Initially, electrical circuit (e.g., electrical circuit 1015) is formed, the electrical circuit having a variable capacitance structure (e.g., variable capacitance structure 2100) including activation branch (e.g., second branch 2104) and an indicator branch (e.g., third branch 2106) in parallel with one another, such that the capacitance of the variable capacitance structure is the sum of at least the capacitance of the activation branch and the capacitance of the indication branch. The activation branch is formed, including an activation indicator component (e.g. activation indicator component 300) in series with a first capacitor. The activation indicator component is formed such that the activation indicator component has a component conductive state and a component nonconductive state, such that the activation indicator component opens the activation branch in the nonconductive component state and closes the activation branch in the conductive component state.

In some examples, forming the activation branch includes depositing a first plurality of microcapsules at a first location on a substrate proximate to a first trace configured to electrically couple the integrated circuit and the antenna, each microcapsule in the first plurality of microcapsules including a frangible shell containing a conductive material that is responsive to an activation action to open or close the activation branch.

Next, the indicator branch is formed. The indicator branch includes an activatable environmental exposure indicator (e.g., activatable environmental exposure indicator 200) in series with a second capacitor. The activatable environmental exposure indicator is formed such that the activatable environmental exposure indicator has an indicator conductive state and an indicator nonconductive state, such that the activatable environmental exposure indicator opens the activation branch in the indicator nonconductive state and closes the activation branch in the indicator conductive state.

In some examples, forming the indicator circuit includes depositing a second plurality of microcapsules at a second location on the substrate proximate to a second trace configured to form a closed loop with the integrated circuit, each of the second plurality of microcapsules including a frangible shell containing a liquefiable material that is responsive to the activation action to cause the indicator circuit to be environmentally sensitive to a predetermined environmental exposure.

The integrated circuit is configured, responsive to being interrogated by an interrogation signal in a predetermined radiofrequency range which is received by the antenna, to cause the antenna to emit a response signal which differs based on the capacitance of the variable capacitance structure.

Activatable Environmentally Sensitive RF Tag: Fifth Embodiment

Figure 22:
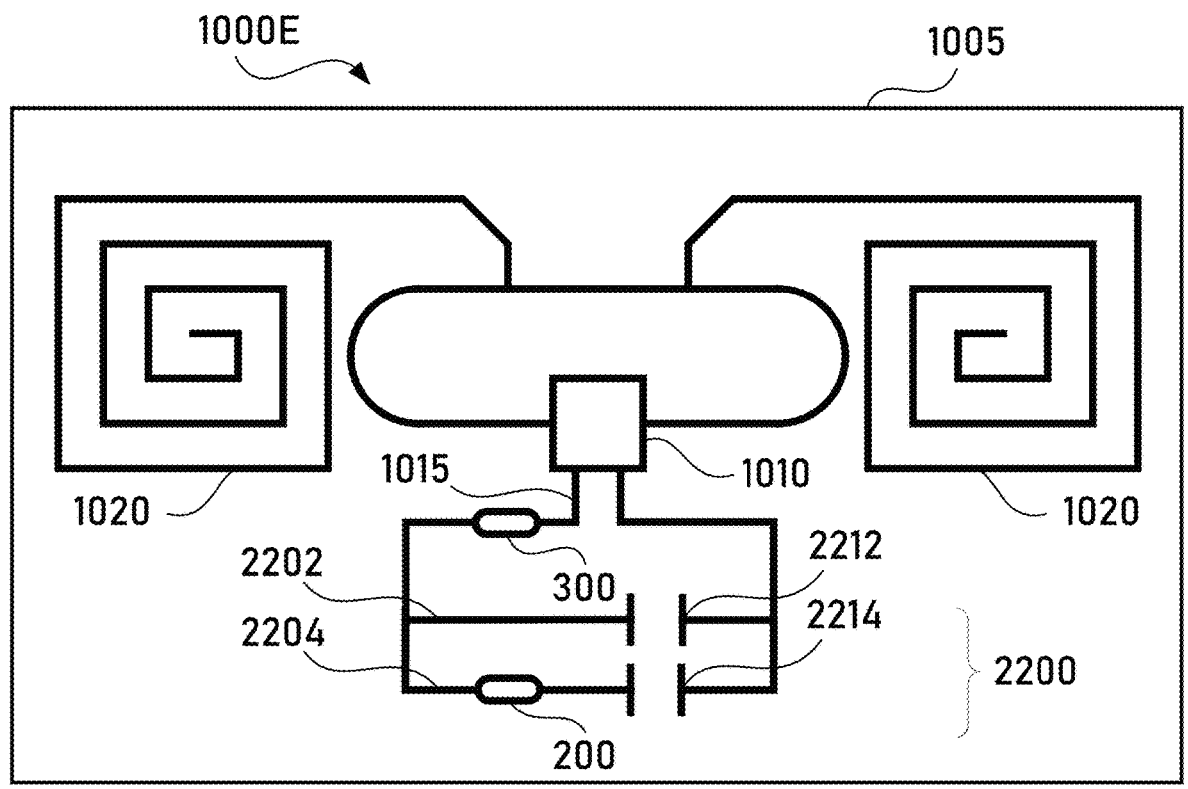
FIG. 22 illustrates a fifth embodiment of an activatable environmentally sensitive RF tag, according to embodiments of the present disclosure.

FIG. 22 illustrates a fifth embodiment of the environmentally sensitive RF tag 1000E, according to embodiments of the present disclosure. The RF tag 1000E includes a variable capacitance structure 2200 as a part of the electrical circuit 1015. The variable capacitance structure 2200 includes a first branch 2202, and a second branch 2204 in parallel with the first branch 2202. The first branch 2202 (e.g., constant capacitance branch) includes a first capacitor 2212 having a first capacitance $C_1$. The second branch 2204 (e.g., indicator branch) includes a second capacitor 2214 having a second capacitance $C_2$, wired in series with an activatable environmental exposure indicator 200. The electrical circuit 1015 includes an activation indicator component 300 wired in series with the variable capacitance structure 2200.

In some examples, the activation indicator component 300 is in the component nonconductive state when in the unactivated state, such that the first response behavior corresponds to the electrical circuit 1015 being open, and the second and third response behaviors corresponds to the capacitance of the variable capacitance structure 2200.

In some examples, the activatable environmental exposure indicator 200 is in the indicator nonconductive state when in the unexposed state. In such examples, the second response behavior corresponds to the capacitance of the variable capacitance structure 2200 being $C_1$ (e.g., activated and unexposed), and the third response behavior corresponds to the capacitance of the variable capacitance structure 2200 being $C_1+C_2$ (e.g., activated and exposed).

In some examples, the activatable environmental exposure indicator 200 is in the indicator conductive state when in the unexposed state. In such examples, the second response behavior corresponds to the capacitance of the variable capacitance structure 2200 being $C_1+C_2$ (e.g., activated and unexposed), and the third response behavior corresponds to the capacitance of the variable capacitance structure 2200 being $C_1$ (e.g., activated and exposed).

In at least one aspect of the present disclosure, method of forming an RF tag, such as the RF tag 1000E, is provided. Initially, an electrical circuit is formed (e.g., electrical circuit 1015), the electrical circuit having an activation circuit and a variable capacitance structure (e.g., variable capacitance structure 2200) including an indicator branch (e.g., second branch 2204).

The activation circuit is formed to include an activation indicator component (e.g., activation indicator component 300) in series with the variable capacitance structure. The activation indicator component is formed such that the activation indicator component has a component conductive state and a component nonconductive state, such that the activation indicator component opens the electrical circuit in the nonconductive component state and closes the electrical circuit in the conductive component state.

In some examples, forming the activation circuit includes depositing a first plurality of microcapsules at a first location on a substrate proximate to a first trace configured to electrically couple the integrated circuit and the variable capacitance structure, each microcapsule in the first plurality of microcapsules including a frangible shell containing a conductive material that is responsive to an activation action to transition the activation circuit from the activation open circuit to the activation closed circuit.

Next, the indicator branch is formed. The indicator branch includes an activatable environmental exposure indicator (e.g., activatable environmental exposure indicator 200) in series with a capacitor. The activatable environmental exposure indicator is formed such that the activatable environmental exposure indicator has an indicator conductive state and an indicator nonconductive state, such that the activatable environmental exposure indicator opens the activation branch in the indicator nonconductive state and closes the activation branch in the indicator conductive state.

In some examples, forming the indicator circuit includes depositing a second plurality of microcapsules at a second location on the substrate proximate to a second trace configured to form a closed loop with the integrated circuit, each of the second plurality of microcapsules including a frangible shell containing a liquefiable material that is responsive to the activation action to cause the indicator branch to be environmentally sensitive to a predetermined environmental exposure.

The integrated circuit is configured, responsive to being interrogated by an interrogation signal in a predetermined radiofrequency range which is received by the antenna, to cause the antenna to emit a response signal which differs based on the capacitance of the variable capacitance structure and whether the electrical circuit is open or closed.

Activatable Environmentally Sensitive RF Tag: Sixth Embodiment

Figure 23:
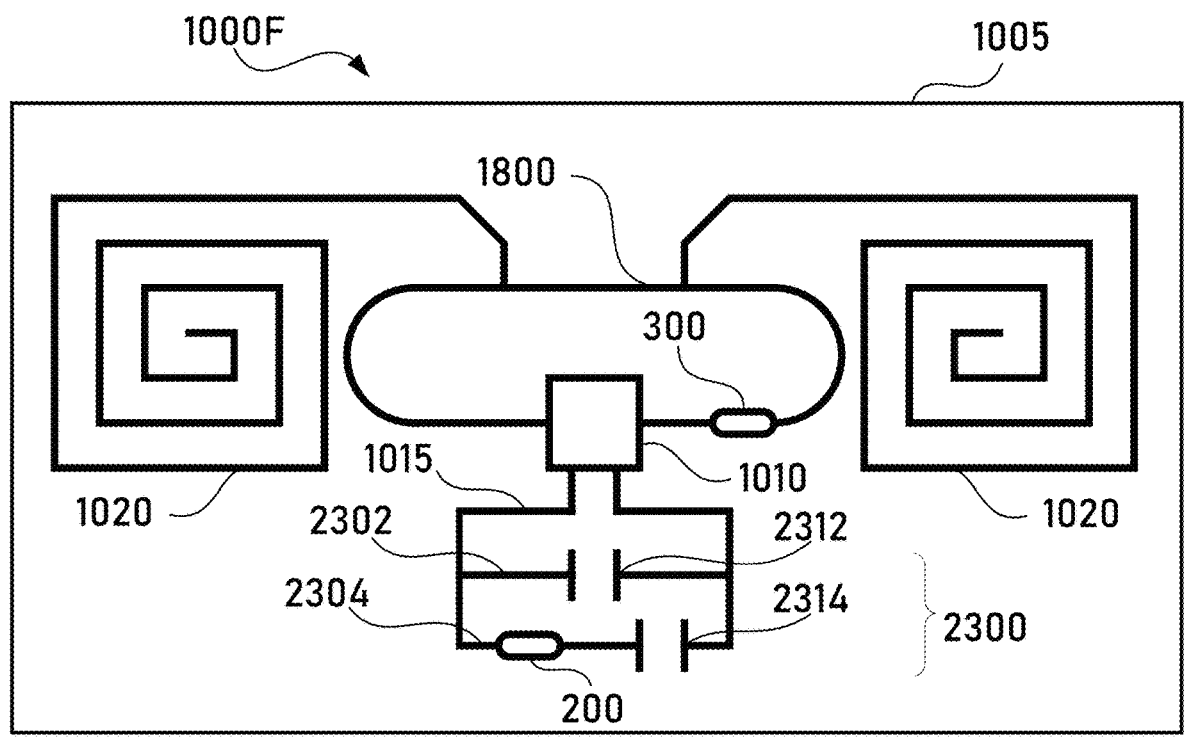
FIG. 23 illustrates a sixth embodiment of an activatable environmentally sensitive RF tag, according to embodiments of the present disclosure.

FIG. 23 illustrates a sixth embodiment of the environmentally sensitive RF tag 1000F, according to embodiments of the present disclosure. The RF tag 1000F includes a variable capacitance structure 2300 as a part of the electrical circuit 1015. The variable capacitance structure 2300 includes a first branch 2302, and a second branch 2304 in parallel with the first branch 2302. The first branch 2302 (e.g., constant capacitance branch) includes a first capacitor 2312 having a first capacitance $C_1$. The second branch 2304 (e.g., indicator branch) includes a second capacitor 2314 having a second capacitance $C_2$, wired in series with an activatable environmental exposure indicator 200. The RF tag 1000F includes an activation indicator component 300 disposed on an activation circuit 1800, such that the activation indicator component 300 connects the integrated circuit 1010 and the antenna 1020. When the activation indicator component 300 is in the component nonconductive state, the activation circuit 1800 is an open circuit, and the antenna 1020 is electrically disconnected from at least one terminal of the integrated circuit 1010. When the activation indicator component 300 is in the component conductive state, the activation circuit 1800 is closed and facilitates an electrical connection between the integrated circuit 1010 and the antenna 1020, such that the antenna 1020 is electrically connected to the integrated circuit 1010 and the integrated circuit can harvest energy from an interrogation signal to power the integrated circuit and/or can respond to the interrogation signal. Thus, the first response behavior is to not emit a response (e.g., an unactivated configuration), and the second response behavior is to emit a response corresponding to the capacitance of the variable capacitance structure 2300 (e.g., activated and unexposed configuration or an activated and exposed configuration).

In some examples, the activatable environmental exposure indicator 200 is in the indicator nonconductive state when in the unexposed state. In such examples, the second response behavior corresponds to the capacitance of the variable capacitance structure 2300 being $C_1$ (e.g., activated and unexposed), and the third response behavior corresponds to the capacitance of the variable capacitance structure 2300 being $C_1+C_2$ (e.g., activated and exposed).

In some examples, the activatable environmental exposure indicator 200 is in the indicator conductive state when in the unexposed state. In such examples, the second response behavior corresponds to the capacitance of the variable capacitance structure 2300 being $C_1+C_2$ (e.g., activated and unexposed), and the third response behavior corresponds to the capacitance of the variable capacitance structure 2300 being $C_1$ (e.g., activated and exposed).

In at least one aspect of the present disclosure, method of forming an RF tag, such as the RF tag 1000F, is provided. Initially, an activation circuit is formed, including an activation indicator component (e.g., activation indicator component 300), the activation circuit being connectively disposed between an integrated circuit (e.g., integrated circuit 1010) and an antenna (e.g., antenna 1020) of an RF tag.

The activation indicator component is formed such that the activation indicator component has a component conductive state and a component nonconductive state, such that the activation indicator component defines an activation open circuit between an integrated circuit and an antenna in the nonconductive component state and an activation closed circuit between the integrated circuit and the antenna in the conductive component state. The integrated circuit is configured, responsive to being interrogated by an interrogation signal in a predetermined radiofrequency range which is received by the antenna, to cause the antenna to emit a response signal when the activation circuit forms the activation closed circuit but not emit the response signal when the activation circuit forms the activation open circuit.

In some examples, forming the activation circuit includes depositing a first plurality of microcapsules at a first location on a substrate proximate to a first trace configured to electrically couple the integrated circuit and the antenna, each microcapsule in the first plurality of microcapsules including a frangible shell containing a conductive material that is responsive to an activation action to transition the activation circuit from the activation open circuit to the activation closed circuit.

Next, an indicator circuit (e.g., electrical circuit 1015) is formed. The indicator circuit includes an activatable environmental exposure indicator (e.g., activatable environmental exposure indicator 200) in series with a capacitor. The activatable environmental exposure indicator is formed such that the activatable environmental exposure indicator has an indicator conductive state and an indicator nonconductive state, such that the activatable environmental exposure indicator opens the activation branch in the indicator nonconductive state and closes the activation branch in the indicator conductive state. In some examples, forming the indicator circuit includes depositing a second plurality of microcapsules at a second location on the substrate proximate to a second trace configured to form a closed loop with the integrated circuit, each of the second plurality of microcapsules including a frangible shell containing a liquefiable material that is responsive to the activation action to cause the indicator circuit to be environmentally sensitive to a predetermined environmental exposure.

The integrated circuit is configured, responsive to being interrogated by an interrogation signal in a predetermined radiofrequency range which is received by the antenna, to cause the antenna to emit a response signal which differs based on the capacitance of the variable capacitance structure.

Activatable Environmentally Sensitive RF Tag: Seventh Embodiment

Figure 24:
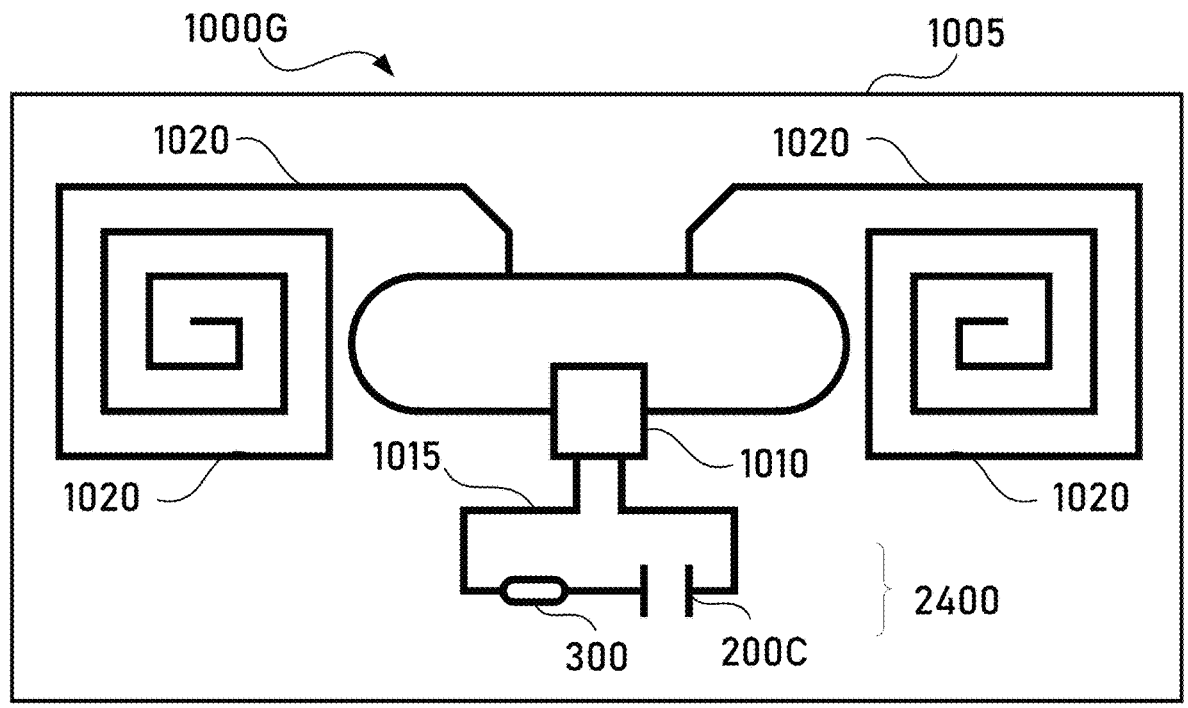
FIG. 24 illustrates a seventh embodiment of an activatable environmentally sensitive RF tag, according to embodiments of the present disclosure.

FIG. 24 illustrates a seventh embodiment of the environmentally sensitive RF tag 1000G, according to embodiments of the present disclosure. The RF tag 1000G includes a variable capacitance structure 2400 as a part of the electrical circuit 1015. The variable capacitance structure 2400 includes an activation indicator component 300 in series with an activatable environmental exposure indicator 200C, having a first capacitance $C_1$ in the unexposed state and a second capacitance $C_2$ in the exposed state. The activation indicator component 300 is in the component nonconductive state when in the unactivated state, and in the component conductive state when in the activated state.

In some examples, the first response behavior corresponds to the electrical circuit 1015 being open (e.g., unactivated). The second response behavior corresponds to the electrical circuit 1015 being closed capacitance structure having the first capacitance $C_1$ (e.g., activated and unexposed). The third response behavior corresponds to the electrical circuit 1015 being closed and the variable capacitance structure having the second capacitance $C_2$ (e.g., activated and exposed).

In at least one aspect of the present disclosure, method of forming an RF tag, such as the RF tag 1000G, is provided. Initially, an electrical circuit (e.g., electrical circuit 1015) is formed, the electrical circuit having a variable capacitance structure including an activation indicator component (e.g., activation indicator component 300) in series with an activatable environmental exposure indicator (e.g., activatable environmental exposure indicator 200C). The activation indicator component is formed such that the activation indicator component has a component conductive state and a component nonconductive state, such that the activation indicator component opens the electrical circuit in the nonconductive component state and closes the electrical circuit in the conductive component state.

In some examples, forming the activation circuit includes depositing a first plurality of microcapsules at a first location on a substrate proximate to a first trace configured to electrically couple the integrated circuit and the antenna, each microcapsule in the first plurality of microcapsules including a frangible shell containing a conductive material that is responsive to an activation action to transition the activation circuit from the activation open circuit to the activation closed circuit.

Next, the indicator branch is formed. The indicator branch includes an activatable environmental exposure indicator (e.g., activatable environmental exposure indicator 200C) which is formed such that the activatable environmental exposure indicator has an unexposed state in which the activatable environmental exposure indicator has a first indication capacitance and an exposed state in which the activatable environmental exposure indicator has a second indication capacitance.

In some examples, forming the activatable environmental exposure indicator includes depositing a second plurality of microcapsules at a second location on the substrate proximate to a second pair of electrodes forming a capacitor each of the second plurality of microcapsules including a frangible shell containing a liquefiable material that is responsive to the activation action to cause the indicator circuit to be environmentally sensitive to a predetermined environmental exposure.

The integrated circuit is configured, responsive to being interrogated by an interrogation signal in a predetermined radiofrequency range which is received by the antenna, to cause the antenna to emit a response signal which differs based on the capacitance of the variable capacitance structure and whether the electrical circuit is open or closed.

Activatable Environmentally Sensitive RF Tag: Eighth Embodiment

Figure 25:
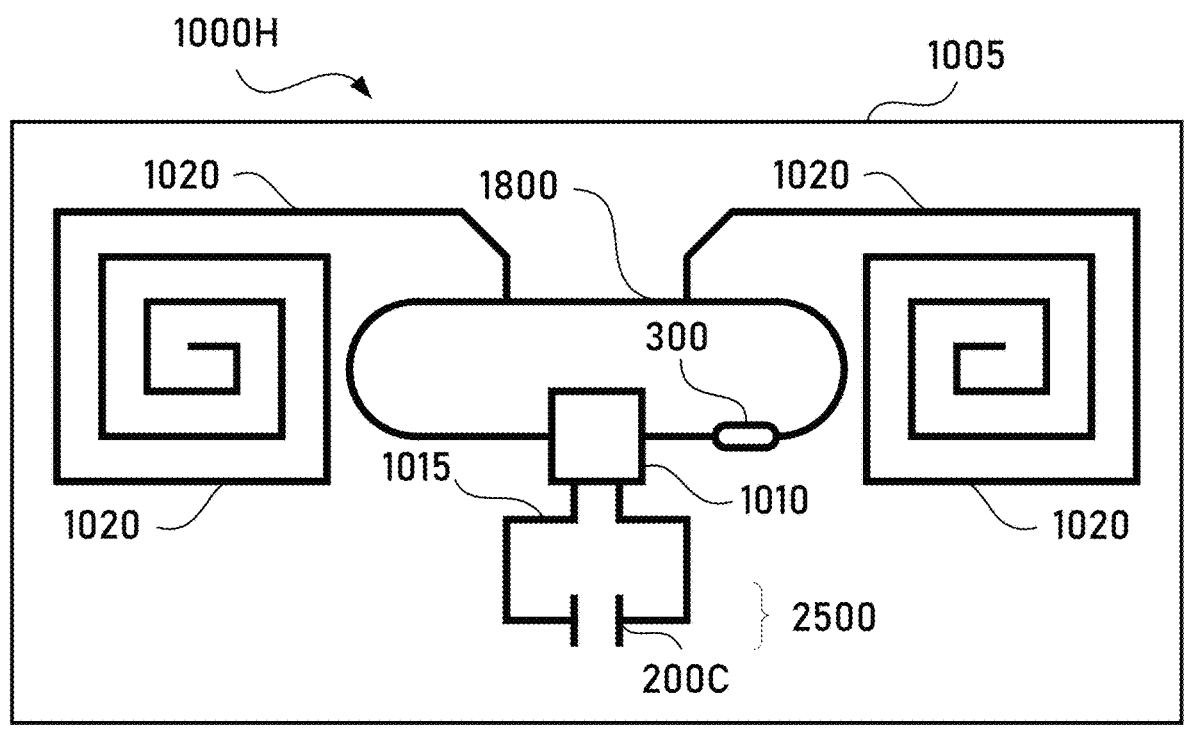
FIG. 25 illustrates an eighth embodiment of an activatable environmentally sensitive RF tag, according to embodiments of the present disclosure.

FIG. 25 illustrates an eighth embodiment of the environmentally sensitive RF tag 1000H, according to embodiments of the present disclosure. The RF tag 1000H includes a variable capacitance structure 2500 as a part of the electrical circuit 1015. The variable capacitance structure 2500 includes an activatable environmental exposure indicator 200C, having a first capacitance $C_1$ in the unexposed state and a second capacitance $C_2$ in the exposed state. The RF tag 1000F includes an activation indicator component 300 disposed on an activation circuit 1800, such that the activation indicator component 300 connects the integrated circuit 1010 and the antenna 1020. When the activation indicator component 300 is in the component nonconductive state, the activation circuit 1800 is an open circuit, and the antenna 1020 is electrically disconnected from at least one terminal of the integrated circuit 1010. When the activation indicator component 300 is in the component conductive state, the activation circuit 1800 is closed and facilitates an electrical connection between the integrated circuit 1010 and the antenna 1020, such that the antenna 1020 is electrically connected to the integrated circuit 1010 and the integrated circuit can harvest energy from an interrogation signal to power the integrated circuit and/or can respond to the interrogation signal. Thus, the first response behavior is to not emit a response (e.g., an unactivated configuration), and the second response behavior is to emit a response corresponding to the capacitance of the variable capacitance structure 2500 (e.g., activated and unexposed configuration or an activated and exposed configuration). In the activated and unexposed state, the capacitance of the variable capacitance structure 2500 may be $C_1$. In the activated and exposed state, the capacitance of the variable capacitance structure 2500 may be $C_2$.

In at least one aspect of the present disclosure, method of forming an RF tag, such as the RF tag 1000H, is provided. Initially, an activation circuit is formed (e.g., activation circuit 1800), including an activation indicator component (e.g., activation indicator component 300), the activation circuit being connectively disposed between an integrated circuit (e.g., integrated circuit 1010) and an antenna (e.g., antenna 1020) of an RF tag.

The activation indicator component is formed such that the activation indicator component has a component conductive state and a component nonconductive state, such that the activation indicator component defines an activation open circuit between an integrated circuit and an antenna in the nonconductive component state and an activation closed circuit between the integrated circuit and the antenna in the conductive component state. The integrated circuit is configured, responsive to being interrogated by an interrogation signal in a predetermined radiofrequency range which is received by the antenna, to cause the antenna to emit a response signal when the activation circuit forms the activation closed circuit but not emit the response signal when the activation circuit forms the activation open circuit.

In some examples, forming the activation circuit includes depositing a first plurality of microcapsules at a first location on a substrate proximate to a first trace configured to electrically couple the integrated circuit and the antenna, each microcapsule in the first plurality of microcapsules including a frangible shell containing a conductive material that is responsive to an activation action to transition the activation circuit from the activation open circuit to the activation closed circuit.

Next, the indicator circuit is formed. The indicator circuit includes an activatable environmental exposure indicator which is formed such that the activatable environmental exposure indicator has an unexposed state in which the activatable environmental exposure indicator has a first indication capacitance and an exposed state in which the activatable environmental exposure indicator has a second indication capacitance. In some examples, forming the indicator circuit includes depositing a second plurality of microcapsules at a second location on the substrate proximate to a second pair of electrodes forming a capacitor each of the second plurality of microcapsules including a frangible shell containing a liquefiable material that is responsive to the activation action to cause the indicator circuit to be environmentally sensitive to a predetermined environmental exposure.

The integrated circuit is configured, responsive to being interrogated by an interrogation signal in a predetermined radiofrequency range which is received by the antenna, to cause the antenna to emit a response signal which differs based on the capacitance of the variable capacitance structure.

Activatable Environmentally Sensitive RF Tag: Ninth Embodiment

Figure 26:
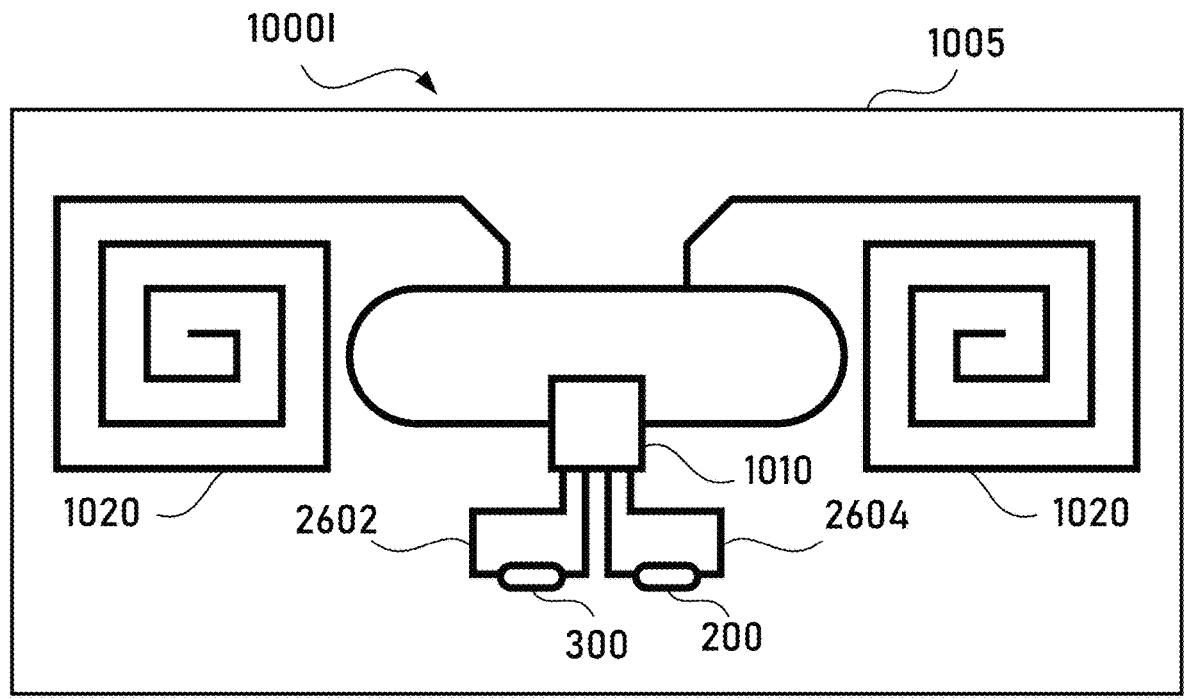
FIG. 26 illustrates a ninth embodiment of an activatable environmentally sensitive RF tag, according to embodiments of the present disclosure.

FIG. 26 illustrates an eighth embodiment of the environmentally sensitive RF tag 1000I, according to embodiments of the present disclosure. The RF tag 1000I includes an activation circuit 2602, including an activation indicator component 300, electrically connected to the integrated circuit 1010, and an indicator circuit 2604 including an activatable environmental exposure indicator 200, electrically connected to the integrated circuit 1010, independently from the activation circuit 2602.

When the activation indicator component 300 is in the component nonconductive state, the activation circuit 2602 is open, and when the activation indicator component 300 is in the component conductive state, the activation circuit 2602 is closed. When the activatable environmental exposure indicator 200 is in the indicator nonconductive state the indicator circuit 2604 is open, and when the activatable environmental exposure indicator 200 is in the indicator conductive state, the indicator circuit 2604 is closed.

In some examples, the RF tag 1000I employs embodiments of the activation indicator component 300 where the activation indicator component 300 is in the component nonconductive state when in the unactivated state (e.g., activation indicator component 300A, activation indicator component 300B, activation indicator component 300D), and employs embodiments of the activatable environmental exposure indicator 200 where the activatable environmental exposure indicator 200 is in the indicator nonconductive state when the activatable environmental exposure indicator 200 is in the unactivated or unexposed state (e.g., activatable environmental exposure indicator 200A, activatable environmental exposure indicator 200B, activatable environmental exposure indicator 200D). In such embodiments, the first response behavior corresponds to the activation circuit 2602 being open and the indicator circuit 2604 being open (e.g., unactivated), the second response behavior corresponds to the activation circuit 2602 being closed and the indicator circuit 2604 being open (e.g., activated and unexposed), and the third response behavior corresponds to the activation circuit 2602 being closed and the indicator circuit 2604 being closed (e.g., activated and exposed).

In some examples, the RF tag 1000I employs embodiments of the activation indicator component 300, where the activation indicator component 300 is in the component conductive state when in the unactivated state (e.g., 300C). In such examples, the RF tag 1000I may employ embodiments of the activatable environmental exposure indicator 200 where the activatable environmental exposure indicator 200 is in the indicator nonconductive state when in the unactivated or unexposed state (e.g., 200A, 200B, 200D). In this manner, the first response behavior corresponds to the activation circuit 2602 being closed and the indicator circuit 2604 being open (e.g., unactivated), the second response behavior corresponds to the activation circuit 2602 being open and the indicator circuit 2604 being open (e.g., activated and unexposed), and the third response behavior corresponds to the activation circuit 2602 being open and the indicator circuit 2604 being closed (e.g., activated and exposed).

In some examples, the RF tag 1000I employs embodiments of the activation indicator component 300, where the activation indicator component 300 is in the component conductive state when in the unactivated state (e.g., 300C). In such examples, the RF tag 1000I may employ embodiments of the activatable environmental exposure indicator 200 where the activatable environmental exposure indicator 200 is in the indicator conductive state when in the unactivated or unexposed state (e.g., 200C). In this manner, the first response behavior corresponds to the activation circuit 2602 being closed and the indicator circuit 2604 being closed (e.g., unactivated), the second response behavior corresponds to the activation circuit 2602 being open and the indicator circuit 2604 being closed (e.g., activated and unexposed), and the third response behavior corresponds to the activation circuit 2602 being open and the indicator circuit 2604 being open (e.g., activated and exposed).

In at least one aspect of the present disclosure, method of forming an RF tag, such as the RF tag 1000I, is provided. Initially, an activation circuit (e.g., activation circuit 2602) is formed, including an activation indicator component (e.g., activation indicator component 300), the activation circuit connected to an integrated circuit of an RF tag. The activation indicator component is configured to define a first activation electrical state for the activation circuit and a second activation electrical state for the activation circuit, In some examples, forming the activation circuit includes depositing a first plurality of microcapsules at a first location on a substrate proximate to a first trace configured to electrically couple the integrated circuit and the antenna, each microcapsule in the first plurality of microcapsules including a frangible shell containing a conductive material that is responsive to an activation action to transition the activation circuit from the activation open circuit to the activation closed circuit.

Next, an indicator circuit (e.g., indicator circuit 2604) is formed and connected to the integrated circuit. The indicator circuit includes an activatable environmental exposure indicator (e.g., activatable environmental exposure indicator 200) configured to define a first indicator electrical state for the indicator circuit and a second indicator electrical state for the indicator circuit.

In some examples, forming the indicator circuit includes depositing a second plurality of microcapsules at a second location on the substrate proximate to a second trace configured to form a closed loop with the integrated circuit, each of the second plurality of microcapsules including a frangible shell containing a liquefiable material that is responsive to the activation action to cause the indicator circuit to be environmentally sensitive to a predetermined environmental exposure.

The integrated circuit is configured, responsive to receiving an interrogation signal which is received by the antenna, to cause the antenna to emit a response signal which varies according to whether the activation circuit is in the first activation electrical state or the second activation electrical state, and whether the indicator circuit is in the first indicator electrical state or the second indicator electrical state.

Activatable Environmentally Sensitive RF Tag: Tenth Embodiment

Figure 27:
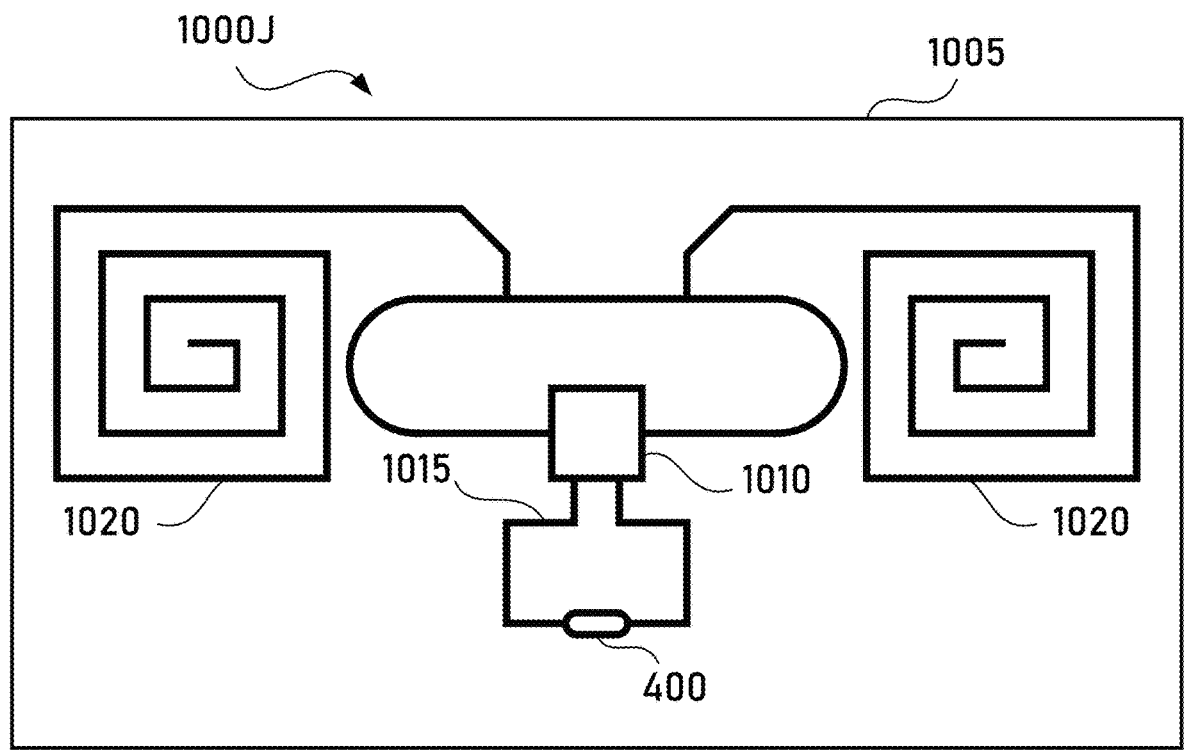
FIG. 27 illustrates a tenth embodiment of an activatable environmentally sensitive RF tag, according to embodiments of the present disclosure.

FIG. 27 illustrates a ninth embodiment of an activatable environmentally sensitive RF tag 1000J, according to embodiments of the present disclosure. The RF tag 1000J includes an electrical circuit 1015 including an activation and exposure indicator 400. When the activation and exposure indicator 400 is in the conductive state, the electrical circuit 1015 is closed. When the activation and exposure indicator 400 is in the non-conductive state, the electrical circuit is open. The response behavior of the RF tag 1000J varies based on whether the electrical circuit is open or closed. Prior to activation, the activation and exposure indicator 400 is in the conductive state, and the electrical loop is closed. After activation and prior to exposure (activated and unexposed), the activation and exposure indicator 400 is in the non-conductive state the electrical circuit 1015 is open. After activation and after exposure (activated and exposed), the activation and exposure indicator 400 is in the conductive state, and the electrical loop is closed.

In this manner, the first response behavior corresponds to the electrical circuit 1015 being closed, and the second response behavior corresponds to the electrical circuit 1015 being open. The third response behavior is a reversion to the first response behavior responsive to the electrical circuit 1015 being closed.

In at least one aspect of the present disclosure, method of forming an RF tag, such as the RF tag 1000J, is provided. Initially, an electrical circuit (e.g., electrical circuit 1015) is formed, including an activation and exposure indicator (e.g., activation and exposure indicator 400), the electrical circuit connected to an integrated circuit (e.g., integrated circuit 1010) of an RF tag. The activation and exposure indicator is formed such that the activation and exposure indicator has a conductive state in which the electrical circuit is closed and a nonconductive state in which the electrical circuit is open.

In some examples, forming the electrical circuit includes first depositing a first plurality of microcapsules at a first location on a substrate proximate to a first trace, each microcapsule in the first plurality of microcapsules including a frangible shell containing a fluid, each microcapsule is responsive to an activation action to transition the activation and exposure indicator to the nonconductive state. In some examples, forming the electrical circuit further includes depositing a second plurality of microcapsules at a second location on the substrate proximate to a second trace configured to form a closed loop with the integrated circuit, each of the second plurality of microcapsules including a frangible shell containing a liquefiable conductive material that is responsive to the activation action to cause the electrical circuit to be environmentally sensitive to a predetermined environmental exposure.

The integrated circuit is configured, responsive to being interrogated by an interrogation signal in a predetermined radiofrequency range which is received by the antenna, to cause the antenna to emit a response signal which varies based on whether the electrical circuit is open or closed.

SECTION V: METHODS AND SYSTEMS OF VERIFYING ACTIVATION OF RF TAGS

Section V discusses methods for verifying the activation of activatable environmentally sensitive RF tags, (e.g., RF tags 1000).

Figure 28:
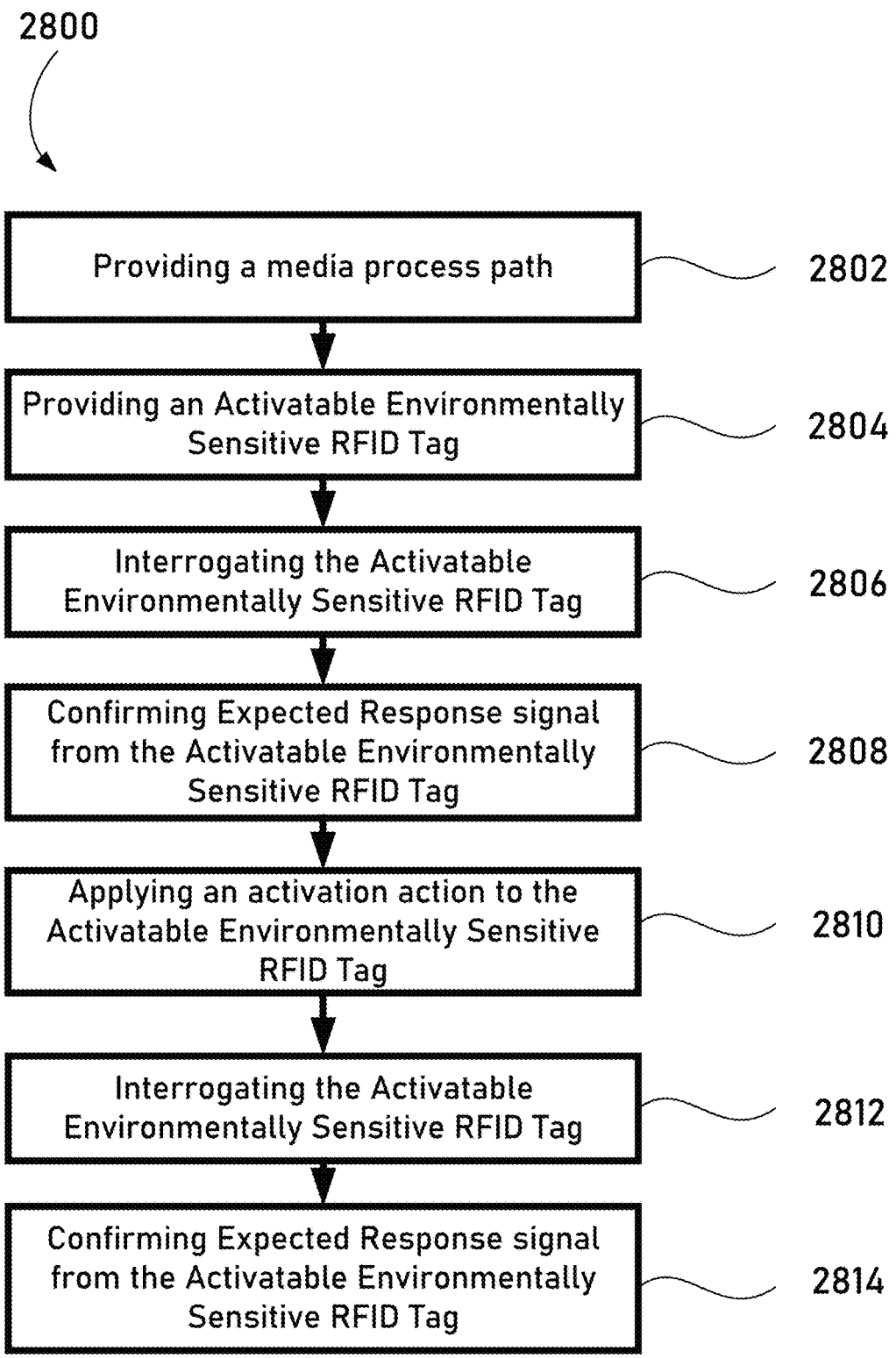
FIG. 28 illustrates flowchart of a method for confirming activation of an activatable environmentally sensitive RF tag, according to embodiments of the present disclosure.

FIG. 28 illustrates a flowchart of a method 2800, for verifying the activation of activatable environmentally sensitive RF tags. The activatable environmentally sensitive RF tags may be one of various embodiments of RF tags 1000. Each activatable environmentally sensitive RF tag is configured to include an activation indicator component (e.g., activation indicator component 300), and an activatable environmental exposure indicator (e.g., activatable environmental exposure indicator 200). Each activatable environmentally sensitive RF tag is configured to have a first response behavior (e.g., responsive to an interrogation signal) prior to an application of an activation action to the RF tag (e.g., applied to at least an activatable environmental exposure indicator and an activation indicator component 300), to have a second response behavior after the application of the activation action, and to have a third response behavior after a predetermined environmental exposure occurring after the application of the activation action. In some examples, the third response behavior is a reversion to the first response behavior.

Block 2802 of the method 2800, describes providing a media process branch, according to embodiments of the present disclosure. In some examples, the media process path includes at least a first process point and second process point, the second process point being downstream on the media process path relative to the first process point.

Block 2804 of the method describes providing an activatable environmentally sensitive RF tag, according to embodiments of the present disclosure. The activatable environmentally sensitive RF tag may be one of various embodiments of RF tags 1000. The activatable environmentally sensitive RF tag is configured to include an activation indicator component (e.g., activation indicator component 300), and an activatable environmental exposure indicator (e.g., activatable environmental exposure indicator 200). According to some embodiments, block 2804 of the method 2800 occurs at or before the first process point.

Block 2806 of the method 2800 describes interrogating the activatable environmentally sensitive RF tag, according to embodiments of the present disclosure. The activatable environmentally sensitive RF tag is interrogated by an interrogation signal in a predetermined radiofrequency band at a predetermined and/or adjustable power level. The interrogation signal may be emitted by an interrogating device, such as an RF reader, RF encoder, a combined RF encoder/reader, or other device capable of emitting interrogative RF signals. According to some embodiments, block 2806 of the method 2800 occurs at the first process point.

Block 2808 of the method 2800 describes confirming (e.g., verifying) an expected response signal from the activatable environmentally sensitive RF tag, according to embodiments of the present disclosure. When interrogated, the activatable environmentally sensitive RF tag should engage in the expected first response behavior. In some examples, the first response behavior is to not emit a response signal. In some examples, the first response behavior corresponds to whether an electrical circuit (e.g., electrical circuit 1015) included in activatable environmentally sensitive RF tag is open or closed. In some examples, the first response behavior corresponds to a capacitance value of the electrical circuit. The first response behavior corresponds to the activation indicator component being in the unactivated state, and the activatable environmental exposure indicator being in the unactivated or unexposed state. If the response behavior of the activatable environmentally sensitive RF tag is not the expected first response behavior, the response behavior may be indicative of a malfunction. According to some embodiments, block 2808 of the method 2800 occurs at or after the first process point, but before the second process point.

Block 2810 describes applying an activation action to the activatable environmentally sensitive RF tag, according to embodiments of the present disclosure. In some examples, the activation action is applied at the second process point of the media process path. In some examples, the activation action is applied by a thermal printhead. In some examples, the activation action may be applied by a pair of opposing surfaces, where such surfaces can be formed by of rollers, plates, or other structures. The activation action may be applied to the entire activatable environmentally sensitive RF tag but is at least applied to the activation indicator component and the activatable environmental exposure indicator.

In some examples, the activation action is thermal stress with a predetermined activation threshold selected from a group consisting of: a temperature exceeding 35 degrees Celsius (C.), a temperature exceeding 40 degrees C., a temperature exceeding 45 degrees C., a temperature exceeding 50 degrees C., a temperature exceeding 55 degrees C., a temperature exceeding 60 degrees C., a temperature exceeding 65 degrees C., a temperature exceeding 70 degrees C., a temperature exceeding 75 degrees C., a temperature exceeding 80 degrees C., a temperature exceeding 85 degrees C., a temperature exceeding 90 degrees C., a temperature exceeding 95 degrees C., and a temperature exceeding 100 degrees C. In some examples, the activation action is a compression stress with a predetermined activation threshold selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi. In some examples the activation action is a shear stress with a predetermined activation threshold selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi.

According to some embodiments, the activation action transitions the activation indicator component from the unactivated state to the activated state and primes the activatable environmental exposure indicator to begin environmental sensing.

Block 2812 of the method 2800 describes interrogating the activatable environmentally sensitive RF tag, according to embodiments of the present disclosure. The activatable environmentally sensitive RF tag may be interrogated in a similar, or identical manner as described in Block 2806. According to some embodiments, block 2812 of the method 2800 occurs at a third process point or at least after the second process point.

Block 2814 of the method 2800 describes (e.g., verifying) an expected response signal from the activatable environmentally sensitive RF tag, according to embodiments of the present disclosure. When interrogated, the activatable environmentally sensitive RF tag should engage in the expected second response behavior. In some examples, the second response behavior corresponds to whether the electrical circuit included in activatable environmentally sensitive RF tag is open or closed. In some examples, the second response behavior corresponds to a capacitance value of the electrical circuit. The second response behavior corresponds to the activation indicator component being in the activated state, and the activatable environmental exposure indicator being in the unexposed state. If the response behavior of the activatable environmentally sensitive RF tag is not the expected second response behavior, the response behavior may be indicative of a malfunction. According to some embodiments, block 2814 of the method 2800 occurs at a third process point or at least after the second process point.

After block 2814, the method 2800 may be concluded. Alternatively, the method 2800 can include monitoring, via one or more interrogation devices, the RF tag after the activation indicator is activated and the activatable environmental indicator is primed to determine when the environmental indicator is exposed to the predetermined environmental condition. For example, in response to an interrogation signal from the one or more interrogation devices, the RF tag may continue to respond with the second response behavior indicating no exposure or may respond with the third response behavior indicating the activatable environmental indicator was exposed to the predetermined environmental condition.

Figure 29:
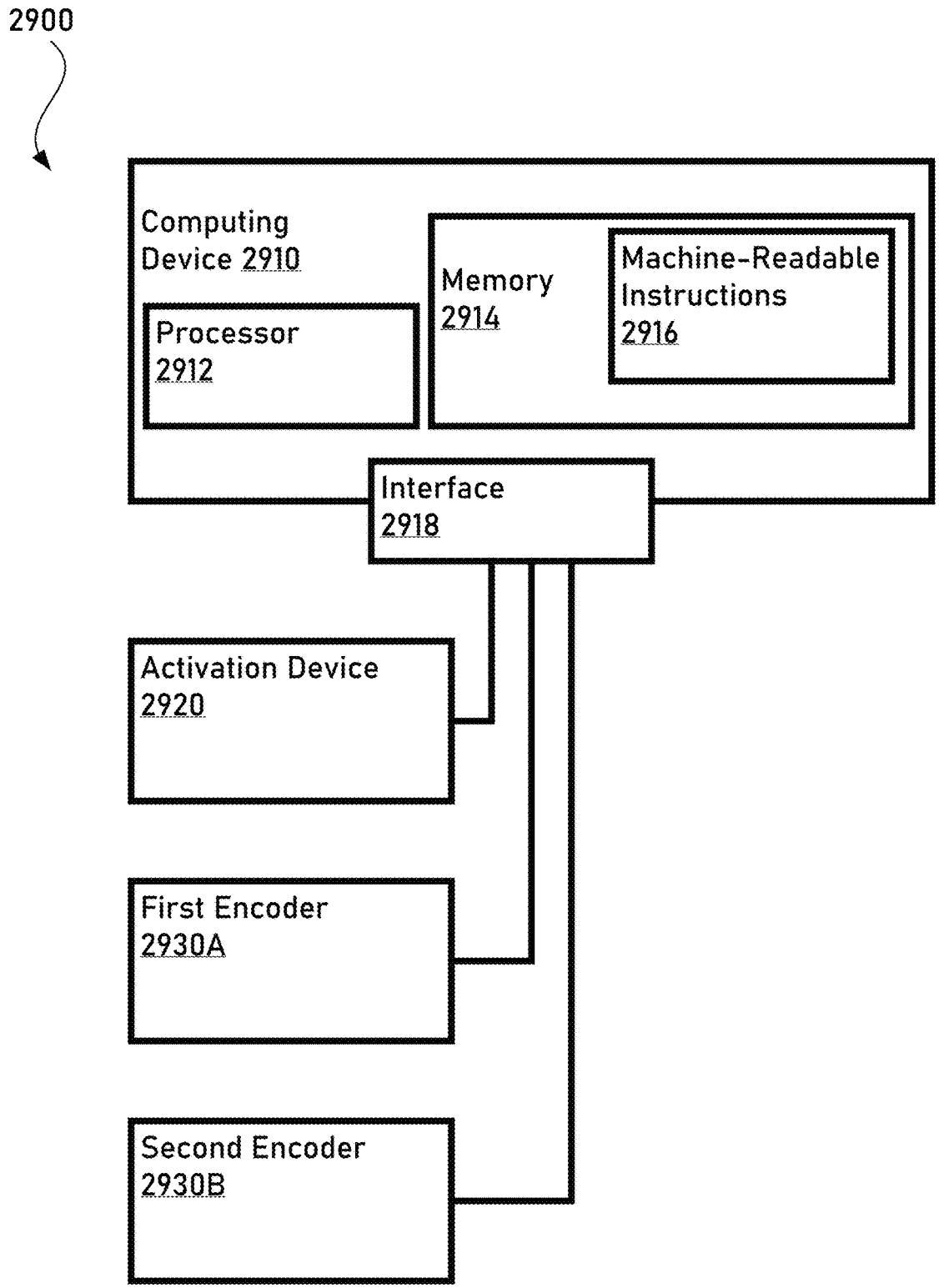
FIG. 29 illustrates a block diagram of an example system capable of implementing the method of FIG. 28, according to embodiments of the present disclosure.

FIG. 29 is a block diagram representative of an example system 2900 capable of implementing, for example, performing the method 2800, according to embodiments of the present disclosure. The example system 2900 includes a computing device 2910 capable of executing instructions to, for example, implement operations of the method 2800, as may be represented by the flowcharts of the FIG. 28. Other example computing devices may include logic circuits capable of, for example, implementing operations of the example methods described herein include field programmable gate arrays (FPGAs) and application specific integrated circuits (ASICs). In one or more examples, the system 2900 may be embodied as a media processing device, such as a printer and/or media applicator, or as components in an automated labeling environment.

The example computing device 2910 of FIG. 29 includes a processor 2912 such as, for example, one or more microprocessors, controllers, and/or any suitable type of processor. The example computing device 2910 of FIG. 29 includes memory (e.g., volatile memory, non-volatile memory) 2914 accessible by the processor 2912 (e.g., via a memory controller). The example processor 2912 interacts with the memory 2914 to obtain, for example, machine-readable instructions 2916 stored in the memory 2914 corresponding to, for example, the operations represented by the flowcharts of this disclosure. Additionally, or alternatively, machine-readable instructions 2916 corresponding to the example operations described herein may be stored on one or more removable media (e.g., a compact disc, a digital versatile disc, removable flash memory, etc.) that may be coupled to the computing device 2910 to provide access to the machine-readable instructions 2916 stored thereon.

The example computing device 2910 of FIG. 29 also includes an interface 2918, including a network interface to enable communication with other machines via, for example, one or more networks. The example network interface includes any suitable type of communication interface(s) (e.g., wired and/or wireless interfaces) configured to operate in accordance with any suitable protocol(s).

The example interface 2918 of the computing device 2910 of FIG. 29 may also include input/output (I/O) interfaces to enable receipt of user input and communication of output data to the user.

The system 2900 further includes an activation device 2920, according to embodiments of the present disclosure. The activation device 2920 is configured to apply an activation action to am activatable environmentally sensitive RF tag (e.g., RF tag 1000). In one or more examples, the activation device is a thermal printhead.

The activation device 2920 is configured to apply an activation action, as discussed above in reference to the microcapsules 100. In some examples, the activation device 2920 may be configured to produce and apply a source of heat to an RF tag, the heat source having a temperature exceeding about 35 degrees C., a temperature exceeding about 40 degrees C., a temperature exceeding about 45 degrees C., a temperature exceeding about 50 degrees C., a temperature exceeding about 55 degrees C., a temperature exceeding about 60 degrees C., a temperature exceeding about 65 degrees C., a temperature exceeding about 70 degrees C., a temperature exceeding about 75 degrees C., a temperature exceeding about 80 degrees C., a temperature exceeding about 85 degrees C., a temperature exceeding about 90 degrees C., a temperature exceeding about 95 degrees C., and a temperature exceeding about 100 degrees C. The activation heat ranges given are purely exemplary and the activation device can be formed to produce other temperature ranges.

In some examples, the activation device 2920 may be configured to apply a pressure to an RF tag. In such embodiments, the activation device applies a shear stress or a compressive stress (e.g., to the microcapsules of the RF tags), where the stress is a stress exceeding about 0.1 pounds per square inch (psi), a stress exceeding about 0.5 psi, a stress exceeding about 1 psi, a stress exceeding about 2 psi, a stress exceeding about 5 psi, a stress exceeding about 10 psi, or a stress exceeding about 15 psi.

In some examples, the activation device may be configured to apply both a source of heat and a shear or compressive stress to the RF tag(s) simultaneously or consecutively.

The system 2900 further includes a first encoder 2930A and a second encoder 2930B (generally or collectively encoders 2930, RFID/NFC readers, readers), according to embodiments of the present disclosure. The encoders 2930 are configured to emit interrogation signals in a predetermined radiofrequency band. The interrogation signals are configured to cause certain RF tags to engage in predetermined response behaviors according to the state of activation and exposure of the RF tag. The encoders 2930 are further configured to receive the response signal(s) emitted from the RF tags and communicate with the computing device 2910. Various embodiments of the system 2900 may include more encoders 2930, or fewer encoders 2930 without departing from the scope of the disclosure.

The system 2900 may be configured as a media process system or device, capable of executing one or more steps of the method 2800. In some embodiments, the system 2900 includes or provides a media process path, where unactivated RF tags are introduced to the media process path at a first process point. The first encoder 2930A may be oriented and configured such that the first encoder 2930 emits an interrogation signal received by an RF tag at the first process point. The RF tags provided at the first process point are expected to be unactivated and engage in a first predetermined response behavior when interrogated. Depending on the first predetermined response behavior of the RF tag, the first encoder 2930A may receive a response signal. The computing device 2910 may be configured to determine, based on the response signal received by the encoder 2930A (or lack thereof), whether the RF tag is in the expected state (unactivated state). For example, the first response behavior may be to emit a first response signal. The computing device 2910 is operable to execute instructions to confirm that the RF tag has engaged in the expected response behavior, indicating that the RF tag is in the expected state. The computing device may also determine that the RF tag has not engaged in the expected response behavior, indicating that the RF tag in not in the expected state.

In some examples, the system 2900 may include mechanisms for transporting RF tags which are in the expected state and removing RF tags which are not in the expected state, or simply provide indication to other systems configured to perform this task. The system 2900 may be configured to only transport a given RF tag along the media process path the given RF tag is in the expected state.

The activation device 2920 may be disposed at second process point on the media process path, downstream of the first process point, where the activation device 2920 is configured to apply an activation action to RF tags passed along the media process path.

The second encoder 2930B may be disposed along the media process path at a third process point and emits an interrogation signal received by RF tags passed along the media process path from the activation device. The RF tags at the third process point are expected to be activated and unexposed and engage in a corresponding second predetermined response behavior. The computing device 2910 is operable to execute instructions to confirm that the RF tag has engaged in the expected response behavior, indicating that the RF tag is in the expected state. The computing device may also determine that the RF tag has not engaged in the expected response behavior, indicating that the RF tag in not in the expected state. In some examples, the second encoder 2930B can be independent of the computing device 2910 and may be controlled by and communicator with a different computing device.

In some examples, the system further includes a third encoder (not shown), which is configured to monitor activated RF tags, and such that the computing device 2910 may determine when an RF tag begins to engage in a third response behavior, indicating that the RF tag is in an activated and exposed state, corresponding to the exposure of the RF tag to a predetermined environmental exposure. Embodiments of the system 2900 including a third encoder may include the third encoder at a fourth process point, or at a location separate from the media process path.

In the foregoing specification, specific embodiments have been described. However, one of ordinary skill in the art appreciates that various modifications and changes can be made without departing from the scope of the technology as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any manner. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed technology is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain manner is configured in at least that manner but may also be configured in manners that are not listed.

The Abstract of the Disclosure is provided to allow the reader to quickly ascertain the nature of the technical disclosure. The abstract is submitted with the understanding that the abstract will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A radiofrequency (RF) tag, comprising:
an antenna;
an integrated circuit;
an activation circuit connecting the integrated circuit to the antenna,
   wherein the integrated circuit is configured, responsive to the RF tag being interrogated by an interrogation signal in a predetermined radiofrequency range which is received by the antenna, to cause the antenna to emit a response signal when the activation circuit is closed but not emit a response signal when the activation circuit is open;
an activation indicator component forming at least a portion of the activation circuit, the activation indicator component having a component conductive state and a component nonconductive state, such that the activation circuit is closed when the activation indicator component is in the component conductive state and the activation circuit is open when the activation indicator component is in the component nonconductive state;
   wherein the activation indicator component transitions from the component nonconductive state to the component conductive state responsive to an application of an activation action to the RF tag;
an indicator circuit electrically connected to the integrated circuit;
   wherein when the indicator circuit is open, the response signal is a first distinct response signal, and when the indicator circuit is closed, the response signal is a second distinct response signal; and
an activatable environmental exposure indicator coupled to the indicator circuit and having an indicator conductive state and an indicator nonconductive state, such that the indicator circuit is closed when the activatable environmental exposure indicator is in the indicator conductive state and the indicator circuit is open when the activatable environmental exposure indicator is in the indicator nonconductive state,
wherein the activatable environmental exposure indicator becomes environmentally sensitive responsive to the activation action, such that when the RF tag is subsequently exposed to a predetermined environmental exposure, the activatable environmental exposure indicator transitions from a first of the indicator nonconductive state and the indicator conductive state to a second of the indicator nonconductive state and the indicator conductive state.

2. The RF tag of claim 1, wherein the activation indicator component includes a plurality of microcapsules, each having a frangible shell containing a conductive material.

3. The RF tag of claim 2, wherein the conductive material includes at least one selected from a group consisting of a plurality of conductive particles suspended in a fluid, and a conductive fluid.

4. The RF tag of claim 3, wherein the plurality of conductive particles is selected from a group consisting of: particles containing copper, particles containing silver, particles containing graphite, particles containing carbon black, particles containing graphene, particles containing graphene oxide, particles containing other functionalized graphenes, particles containing conductive metals, particles containing conductive non-metal materials, and combinations thereof.

5. The RF tag of claim 2, wherein the application of the activation action activates the plurality of microcapsules such that the conductive material is released from the frangible shells of the plurality of microcapsules, and the conductive material facilitates a formation of an electrical connection across the activation indicator component, transitioning the activation indicator component to the component conductive state and closing the activation circuit.

6. The RF tag of claim 1, wherein the activatable environmental exposure indicator includes a plurality of activable microcapsules, each having a frangible shell containing a liquefiable material configured to liquefy responsive to a predetermined environmental exposure.

7. The RF tag of claim 6, wherein the application of the activation action activates the plurality of activable microcapsules such that the liquefiable material is released from the frangible shells of the plurality of activable microcapsules.

8. The RF tag of claim 7, wherein the activatable environmental exposure indicator is initially in the indicator nonconductive state, and the predetermined environmental exposure causes the liquefiable material to liquefy, such that the liquefiable material facilitates a formation of an electrical connection across the activatable environmental exposure indicator, transitioning the activatable environmental exposure indicator to the indicator conductive state, and closing indicator circuit.

9. The RF tag of claim 8, wherein the electrical connection is formed by one selected from a group consisting of a plurality of conductive particles embedded in a matrix formed by the liquefiable material in a solid state, and the liquefiable material comprising a liquefiable conductive material.

10. The RF tag of claim 7, wherein an electrical connection is initially provided across the activatable environmental exposure indicator by a plurality of conductive particles disposed proximately to a wick, such that the activatable environmental exposure indicator is initially in the indicator conductive state, and the predetermined environmental exposure causes the liquefiable material to liquefy, such that the liquefiable material draws the plurality of conductive particles into the wick, disengaging the electrical connection, transitioning the activatable environmental exposure indicator to the indicator nonconductive state and opening the indicator circuit.

11. The RF tag of claim 10, wherein the plurality of conductive particles is selected from a group consisting of: particles containing copper, particles containing silver, particles containing graphite, particles containing carbon black, particles containing graphene, particles containing graphene oxide, particles containing other functionalized graphenes, particles containing conductive metals, particles containing conductive non-metal materials, and combinations thereof.

12. The RF tag of claim 1, wherein the first distinct response signal is transmitted in a first radiofrequency band, and the second distinct response signal is transmitted in a second radiofrequency band.

13. The RF tag of claim 1, wherein the integrated circuit contains a memory, and the first distinct response signal contains a first data stored in the memory, and the second distinct response signal contains a second data stored in the memory.

14. The RF tag of claim 1, further comprising a battery, wherein the integrated circuit is electrically connected to the battery and powered by the battery.

15. The RF tag of claim 1, wherein the activation action is thermal stress with a predetermined activation threshold selected from a group consisting of: a temperature exceeding 35 degrees Celsius (C), a temperature exceeding 40 degrees C., a temperature exceeding 45 degrees C., a temperature exceeding 50 degrees C., a temperature exceeding 55 degrees C., a temperature exceeding 60 degrees C., a temperature exceeding 65 degrees C., a temperature exceeding 70 degrees C., a temperature exceeding 75 degrees C., a temperature exceeding 80 degrees C., a temperature exceeding 85 degrees C., a temperature exceeding 90 degrees C., a temperature exceeding 95 degrees C., and a temperature exceeding 100 degrees C.

16. The RF tag of claim 1, wherein the activation action is a compression stress or a shear stress with a predetermined activation threshold selected from a group consisting of: a stress exceeding 0.1 pounds per square inch (psi) a stress exceeding 0.5 psi, a stress exceeding 1 psi, a stress exceeding 2 psi, a stress exceeding 5 psi, a stress exceeding 10 psi, and a stress exceeding 15 psi.

17. The RF tag of claim 1, wherein the predetermined environmental exposure is selected from a group consisting of: a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time.

18. The RF tag of claim 1, wherein a transition of the activation circuit from the component conductive state to the component conductive state is irreversible.

19. An RF tag, comprising;
an antenna;
an integrated circuit;
an activation circuit connecting the integrated circuit to the antenna;
an activation indicator component forming a portion of the activation circuit, the activation indicator component having a component conductive state and a component nonconductive state,
   wherein the activation circuit is closed when the activation indicator component is in the component conductive state and the activation circuit is open when the activation indicator component is in the component nonconductive state,
   wherein the activation indicator component transitions from the component nonconductive state to the component conductive state responsive to an application of an activation action to the RF tag,
   wherein the RF tag is configured, responsive to the antenna receiving an interrogation signal in a predetermined radiofrequency range, to emit a response signal via the antenna when the activation circuit is closed, and not emit the response signal when the activation circuit is open;
an electrical circuit electrically connected to the integrated circuit;
a variable capacitance structure included as a portion of the electrical circuit, including a plurality of parallel paths;
an indicator path included as one of the plurality of parallel paths; and
an activatable environmental exposure indicator included as a portion of the indicator path, wired in series with a first capacitor having a first capacitance,
   wherein the activatable environmental exposure indicator has an indicator conductive state and an indicator nonconductive state, such that when the activatable environmental exposure indicator is in the indicator conductive state the indicator path is closed and the indicator path has the first capacitance, and when the activatable environmental exposure indicator is in the indicator nonconductive state, the indicator path is open and the indicator path has no capacitance, wherein when the indicator path has the first capacitance, the response signal is a first distinct response signal, and when the indicator path has no capacitance, the response signal is a second distinct response signal, and wherein the activatable environmental exposure indicator becomes environmentally sensitive responsive to the activation action, such that when the RF tag is subsequently exposed to a predetermined environmental exposure, the activatable environmental exposure indicator transitions from a first of the indicator nonconductive state and the indicator conductive state to a second of the indicator nonconductive state and the indicator conductive state.

20. An RF tag, comprising:

an antenna;

an integrated circuit;

an activation circuit connecting the integrated circuit to the antenna;

an activation indicator component forming a portion of the activation circuit, the activation indicator component having a component conductive state and a component nonconductive state, wherein the activation circuit is closed when the activation indicator component is in the component conductive state and the activation circuit is open when the activation indicator component is in the component nonconductive state, wherein the activation indicator component transitions from the component nonconductive state to the component conductive state responsive to an application of an activation action to the RF tag, wherein the RF tag is configured, responsive to the antenna receiving an interrogation signal in a predetermined radiofrequency range, to emit a response signal via the antenna when the activation circuit is closed, and not emit the response signal when the activation circuit is open;

an electrical circuit electrically connected to the integrated circuit;

a variable capacitance structure, forming a portion of the electrical circuit;

an activatable environmental exposure indicator, included in the variable capacitance structure, having an unexposed state and an exposed state, the activatable environmental exposure indicator configured to become environmentally sensitive responsive to the activation action, such that when the RF tag is exposed to a predetermined environmental exposure subsequent to the activation action, the activatable environmental exposure indicator transitions from the unexposed state to the exposed state, the activatable environmental exposure indicator configured to not transition from the unexposed state to the exposed state prior to the activation action, wherein the variable capacitance structure has a first capacitive state when the activatable environmental exposure indicator is in the unexposed state, and a second capacitive state when the activatable environmental exposure indicator is in the exposed state, wherein the integrated circuit is configured, responsive to the antenna receiving an interrogation signal in a predetermined radiofrequency range, to cause the antenna to emit a response signal which varies depending on whether the variable capacitance structure is in the first capacitive state or the second capacitive state.

21. A method for verifying activation of an RF tag having an antenna, an integrated circuit, an activation circuit connecting the integrated circuit to the antenna, wherein the integrated circuit is configured, responsive to the RF tag being interrogated by an interrogation signal in a predetermined radiofrequency range which is received by the antenna, to cause the antenna to emit a response signal when the activation circuit is closed but not emit a response signal when the activation circuit is open, an activation indicator component forming at least a portion of the activation circuit, the activation indicator component having a component conductive state and a component nonconductive state, such that the activation circuit is closed when the activation indicator component is in the component conductive state and the activation circuit is open when the activation indicator component is in the component nonconductive state, wherein the activation indicator component transitions from the component nonconductive state to the component conductive state responsive to an application of an activation action to the RF tag, an indicator circuit electrically connected to the integrated circuit, wherein when the indicator circuit is open, the response signal is a first distinct response signal, and when the indicator circuit is closed, the response signal is a second distinct response signal, and an activatable environmental exposure indicator coupled to the indicator circuit and having an indicator conductive state and an indicator nonconductive state, such that the indicator circuit is closed when the activatable environmental exposure indicator is in the indicator conductive state and the indicator circuit is open when the activatable environmental exposure indicator is in the indicator nonconductive state, wherein the activatable environmental exposure indicator becomes environmentally sensitive responsive to the activation action, such that when the RF tag is subsequently exposed to a predetermined environmental exposure, the activatable environmental exposure indicator transitions from a first of the indicator nonconductive state and the indicator conductive state to a second of the indicator nonconductive state and the indicator conductive state, the method comprising:

providing a media process path including a first process point and a second process point, the second process point downstream of the first process point;

providing, at the first process point, the RF tag;

interrogating, at the first process point, the RF tag with an interrogation signal in a predetermined radiofrequency range;

confirming, at the first process point, that the RF tag does not emit a response signal responsive to the interrogation signal;

applying, at the second process point, the activation action to the RF tag;

interrogating, at the second process point, the RF tag with an interrogation signal in a predetermined radiofrequency range; and confirming the activatable environmental exposure indicator has been activated, at the second process point, based on the RF tag emitting the response signal responsive to the interrogation signal.

* * * * *